United States Patent [19]
Suzuki et al.

[11] Patent Number: 5,677,695
[45] Date of Patent: Oct. 14, 1997

[54] RADAR APPARATUS FOR DETECTING A DISTANCE/VELOCITY

[75] Inventors: Hiroshi Suzuki, Kawasaki; Masayoshi Shono; Osamu Isaji, both of Kobe, all of Japan

[73] Assignees: Fujitsu Limited, Kawasaki; Fujitsu Ten Limited, Kobe, both of Japan

[21] Appl. No.: 560,697

[22] Filed: Nov. 20, 1995

[30] Foreign Application Priority Data

Nov. 21, 1994 [JP] Japan ................................ 6-286340
Sep. 13, 1995 [JP] Japan ................................ 7-235851

[51] Int. Cl.$^6$ ............................. G01S 13/42; G01S 13/93
[52] U.S. Cl. .......................... 342/109; 342/112; 342/116; 342/70
[58] Field of Search ........................... 342/109, 111, 342/112, 116, 129, 131, 132, 135, 70

[56] References Cited

U.S. PATENT DOCUMENTS

| | | | |
|---|---|---|---|
| 3,735,402 | 5/1973 | Mosher | 342/109 |
| 3,823,399 | 7/1974 | Yamanaka | 342/111 |
| 5,046,010 | 9/1991 | Tomasi | 342/122 X |
| 5,233,351 | 8/1993 | Gregory et al. | 342/100 |
| 5,268,692 | 12/1993 | Grosch et al. | 342/70 |

Primary Examiner—John B. Sotomayor
Attorney, Agent, or Firm—Greer, Burns & Crain, LTD.

[57] ABSTRACT

A radar apparatus for detecting a distance/velocity has a transmitting system for transmitting a signal which is frequency-modulated with a modulating signal having a predetermined recurrence frequency, a receiving system for receiving a reflected wave signal, which is the modulated transmission signal transmitted from the transmitting system and reflected by an object, and which mixes the reflected wave signal and the modulated transmission signal from the transmitting system so as to detect a beat wave signal of the reflected wave signal and the modulated transmission signal. The apparatus also includes a high-pass filter for filtering the beat wave signal detected in the receiving system so as to cut off modulation frequency components of the modulated transmission signal with orders that are equal to or lower than a predetermined order, and a distance/velocity calculating unit which calculates the distance to and the relative velocity with respect to the object based on frequency information in the beat wave signal which has been passed through the high-pass filter. Accordingly, the radar apparatus effectively removes FM/AM conversion (reconversion) noise in a simple structure thereby to accurately detect the distance to and the relative velocity with respect to the object even with low transmitting power.

24 Claims, 54 Drawing Sheets

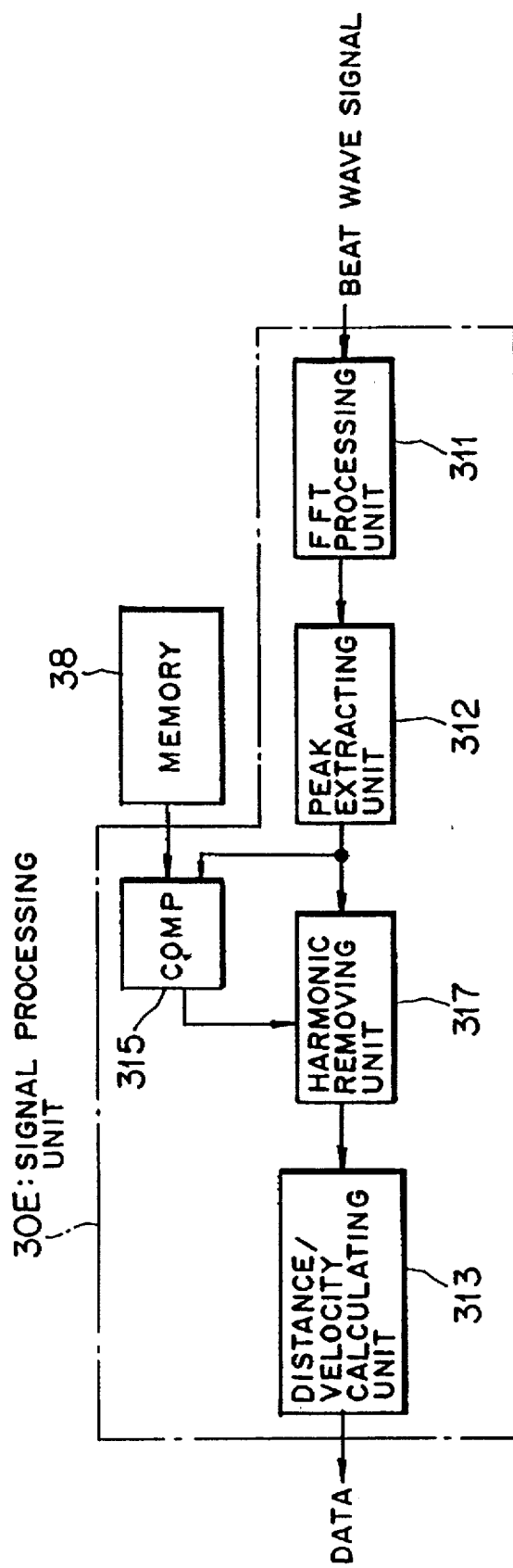

F I G. 32
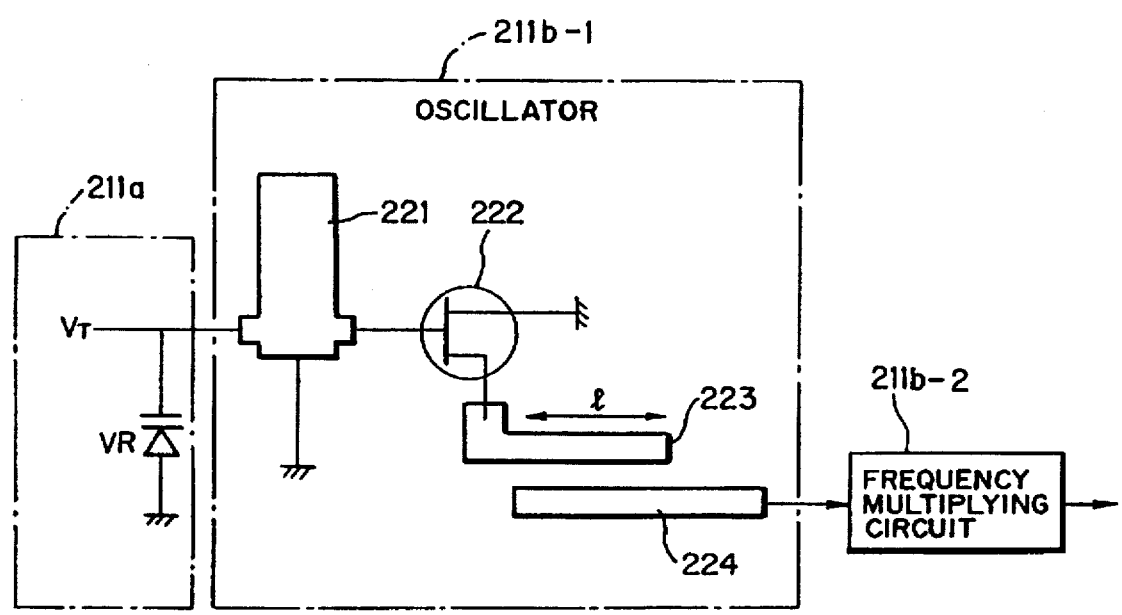

WAVEFORM OF FM VOLTAGE

T-Kv CHARCTERISTIC

TRANSMITTING / RECEIVING FREQUENCY

BEAT FREQUENCY

F I G. 58
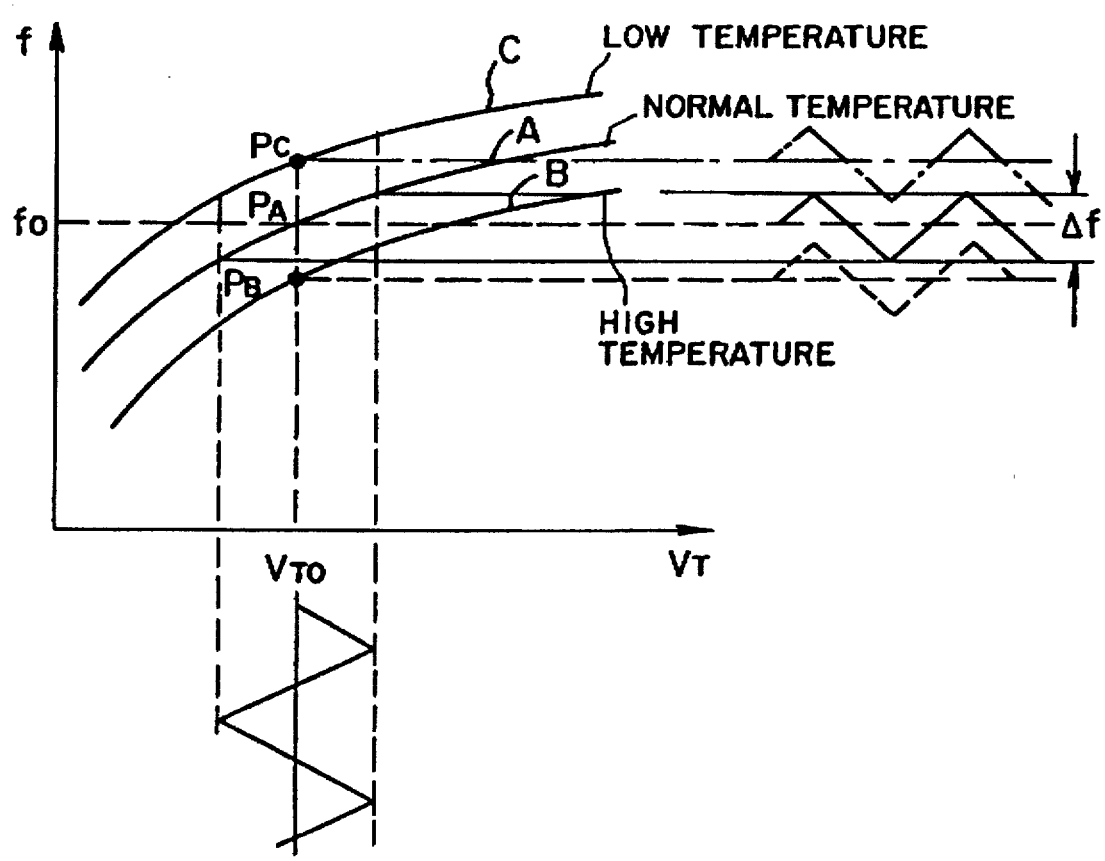

RADAR APPARATUS FOR DETECTING A DISTANCE/VELOCITY

BACKGROUND OF THE INVENTION

(1) Field of the Invention

The present invention relates to a radar apparatus for detecting distance/velocity wherein a signal which is frequency-modulated with a modulating signal having a predetermined recurrence frequency is transmitted and a reflected wave signal which is the transmitted signal (modulated transmission signal) reflected by an object is received and wherein the reflected wave signal and part of the modulated transmission signal are mixed to detect a beat wave signal thereby to detect a distance to and a relative velocity with respect to the object.

(2) Description of the Related Art

A typical radar apparatus for measuring a distance to and a relative velocity with respect to an object is a frequency-modulated continuous-wave radar apparatus (FM-CW radar apparatus). FIG. 44 is a block diagram showing the construction of a general FM-CW radar apparatus. In the apparatus of FIG. 44, a transmitting system is composed of a triangular wave signal generator 101, a voltage controlled oscillator 102, an amplifier (AMP) 103, and a transmitting antenna 104, and a receiving system is composed of a receiving antenna 106, a low noise amplifier (LNA) 107, a mixer 108, and a signal processing unit 109. Reference numeral 105 denotes a vehicle (object) a distance to/a relative velocity with respect to which is to be measured.

In the transmitting system, the triangular wave signal generator 101 generates a triangular wave signal (center voltage $v_o$) having a recurrence frequency as shown in FIG. 45 (a) for use as a modulating signal for frequency modulation. The voltage controlled oscillator 102 performs frequency modulation using the triangular signal from the triangular wave signal generator 101, whereby a signal having a waveform as shown in FIG. 45 (b) is outputted as a modulated transmission signal (center frequency $f_o$).

The amplifier 103 amplifies the modulated transmission signal to a required signal level. The transmitting antenna 104 sends out the thus amplified modulated signal to the space.

On the other hand, in the receiving system, the receiving antenna 106 receives a reflected wave signal, which is the modulated signal transmitted from the transmitting system and then reflected by the vehicle 105. The low noise amplifier 107 amplifies the received reflected wave signal.

The mixer 108 mixes the reflected wave signal from the vehicle 105 with part of the modulated transmission signal from the voltage controlled oscillator 102 so as to obtain a beat wave signal of the reflected wave signal and the modulated transmission signal, described later.

The signal processing unit 109 carries out a fast Fourier transform (FFT) or the like on the beat wave signal which is obtained at the mixer 108, thereby obtaining a distance to and a relative velocity with respect to the vehicle 105. The signal processing unit 109, therefore, is composed of an FFT processing unit 110, a peak extracting unit 111, and a distance/velocity calculating unit 112, as shown in FIG. 46.

The FFT processing unit 110 carries out a fast Fourier transform on the beat wave signal from the mixer 108. The peak extracting unit 111 extracts peak values from frequency information in the beat wave signal so as to detect a distance frequency fr dependent on a distance and a velocity frequency fd dependent on a relative velocity from the beat wave signal.

The distance/velocity calculating unit 112 calculates a distance to and a relative velocity with respect to the vehicle 105, as described later, using the distance frequency fr and the velocity frequency fd which are obtained at the peak extracting unit 111. The signal processing unit 109 is usually formed of a signal processor like a digital signal processor (DSP).

In a thus constructed FM-CW radar apparatus, a signal which is frequency-modulated at the voltage controlled oscillator 102 with the triangular wave signal from the triangular wave signal generator 101 is amplified to a required signal level at the amplifier 103, and then the thus amplified modulated signal is sent out from the transmitting antenna 104 to the space. The modulated transmission signal is reflected by the vehicle 105, and the reflected wave signal is received by the receiving antenna 106.

The reflected wave signal is amplified by the low noise amplifier 107 and then mixed with part of the modulated transmission signal from the voltage controlled oscillator 102 at the mixer 108.

For example, when the voltage controlled oscillator 102 in the transmitting system sends out a modulated transmission signal having a waveform (frequency) as represented by a solid line in FIG. 47 (a), the receiving antenna 106 receives a reflected wave signal which is subjected to a time lag corresponding to a distance to the vehicle 105 and a Doppler shift (fd) corresponding to a relative velocity, as represented by a dashed line.

When the transmitted signal (modulated transmission signal) and the received signal (reflected wave signal) are mixed at the mixer 108, a beat wave signal, which represents a frequency deviation (beat) between the transmitted signal and the received signal, is obtained as shown in FIG. 47 (b). The thus obtained beat wave signal enters the signal processing unit 109.

In the signal processing unit 109, the FFT processing unit 110 carries out a fast Fourier transform on the beat wave signal, and the peak extracting unit 111 extracts the peak values from the frequency information in the beat wave signal. As a result, a distance frequency fr dependent on the distance to the vehicle 105 and the velocity frequency fd dependent on the relative velocity are detected from frequency components (hereinafter referred to as beat frequency) fb of the beat wave signal.

When the center frequency of the frequency modulation is represented by $f_O$, the frequency deviation (modulation width) is represented by $\Delta F$, the recurrence frequency of the triangular wave is represented by fm, time is represented by t, the velocity of light is represented by c, the distance to the vehicle 105 is represented by R, and the relative velocity is represented by V, the frequency $f_T$ of a transmitted signal, the phase $\Phi_T$ of the transmitted signal, the phase $\Phi_R$ of a received signal, and the frequency $f_R$ of the received signal are expressed as follows:

$$f_T = f_O \pm 2 \Delta F \cdot fm \cdot \quad (1)$$

$$\Phi_T = 2\pi (f_O \pm \Delta F \cdot fm \cdot t) \cdot t \quad (2)$$

$$\Phi_R = 2\pi [f_O \pm \Delta F \cdot fm \cdot (t - 2R/c)] \cdot (t - 2R/c) \quad (3)$$

$$f_R = (1/2\pi) \cdot (d\Phi_R/dt) \quad (4)$$

$$= f_O (1 - 2V/c) \pm \Delta F \cdot fm \cdot 2(t - 2R/c) \cdot (1 - 2V/c)$$

The beat frequency fb, which is obtained by mixing the transmitted and received signals at the mixer 108 is expressed by $$fb = (4 \cdot \Delta F \cdot fm/c) \cdot R \pm 2 f_O (V/c) \quad (5)$$

In Eq. (5), since the first term is the distance frequency fr, and the second term is the velocity frequency fd, $$fr=(4 \cdot \Delta F \cdot fm/c) \cdot R \quad (6)$$

$$fd=2f_o(V/c) \quad (7)$$

As seen from the above, in the signal processing unit 109, the beat frequency fb expressed by Eq. (5) undergoes a fast Fourier transform at the FFT processing unit 110 and a peak extracting process at the peak extracting unit 111, whereby the distance frequency fr and the velocity frequency fd as expressed by Eq. (6) and Eq. (7), respectively, are detected.

The distance/velocity calculating unit 112 calculates the distance R to and the relative velocity V with respect to the vehicle 105 based on Eq. (6) and Eq. (7).

In the above-mentioned FM-CW radar apparatus, part of the modulated transmission signal (frequency-modulated wave) from the transmitting system is mixed with the received signal at the mixer 108. In this case, if the amplitude of the modulated transmission signal fluctuates due to the frequency characteristics therefore of the voltage controlled oscillator 102 and the amplifier 103, harmonic frequency components fm, 2fm, 3fm, etc., called FM/AM conversion noise, appear near the frequency of the true received signal at the mixer 108, as shown in FIG. 48.

As a result, the above-mentioned FM-CW radar apparatus fails to separate the FM/AM conversion noise from the frequency information of the true received signal, leading to a deterioration in the S/N ratio. As a result, there arises a large error in detecting a distance to and a relative velocity with respect to an object.

In this connection, for example, as shown in FIG. 49, a signal having a frequency fsw which is considerably greater than the modulation frequency fm of the transmitting frequency is inputted to the low noise amplifier 107 in the receiving system so as to modulate an output from the low noise amplifier 107 with the frequency fsw. As a result, the true received signal which is outputted from the low noise amplifier 107 is greatly separated from the aforesaid harmonic frequency components fm, 2fm, 3fm, etc. This minimizes the influence of the FM/AM conversion noise, thereby improving the S/N ratio.

In FIG. 49, reference numeral 113 denotes a high-pass filter (HPF), and reference numeral 114 denotes a mixer. The high-pass filter 113 and the mixer 114 are adapted to cut off the frequency components below the frequency fsw which is inputted to the low noise amplifier 107, thereby obtaining the spectrum of the received signal (reflected wave signal) as shown in FIG. 50 (b).

The above-mentioned FM-CW radar apparatus may fail to accurately obtain a distance to and a relative velocity with respect to an object (the vehicle 105) due to a change in oscillation frequency of the voltage controlled oscillator 102 caused by a change in ambient temperature. In recent years, an FM-CW radar apparatus has been proposed which can cope with a change in ambient temperature.

An FM-CW radar apparatus which copes with an influence of ambient temperature will now be described.

FIG. 51 is a block diagram showing a schematic construction of the FM-CW radar apparatus. In FIG. 51, reference numeral 100 denotes a variable frequency oscillator (voltage controlled oscillator, VCO) in which oscillation frequency varies with an input voltage, and reference numeral 200 denotes a frequency-modulation (FM) voltage generating unit which generates a frequency-modulation voltage (modulating signal), whose waveform periodically changes in a triangular form with a predetermined DC voltage component as a center. The thus generated frequency-modulation voltage is inputted to the variable frequency oscillator 100, whereby the variable frequency oscillator 100 oscillates at the center frequency $f_o$ (=59.5 GHz), for example.

Reference numeral 300 denotes a directional coupler which inputs to the receiving side part of the frequency-modulated signal outputted from the variable frequency oscillator 100. Reference numeral 400 denotes a transmitting antenna for radiating the frequency-modulated signal from the variable frequency oscillator 100 toward the object. Reference numeral 500 denotes a receiving antenna for receiving a reflected wave signal which has reflected from the object. Reference numeral 600 denotes a mixer (MIX) which mixes the reflected wave signal (received signal) received by the receiving antenna 500 and a transmitted signal (frequency-modulated signal) so as to output a beat signal of both signals. Reference numeral 700 denotes a signal processing unit which detects the beat frequency and calculates the distance R to and a relative velocity vr with respect to the object.

In the thus constructed FM-CW radar apparatus of FIG. 51, as in the apparatus which was described earlier with reference to FIG. 44 or 49, when frequency modulation is made with a modulating signal having a recurrence frequency in a triangular form, the frequency of the transmitted signal varies with time, as represented by a solid line of FIG. 52, and the frequency of the reflected wave signal reflected by the object. (assumed to be stationary) which is the distance R away varies with time, as represented by a dashed line of FIG. 52.

As a result, the beat frequency fr between the transmitted signal and the reflected wave signal also becomes as shown in FIG. 53. By measuring the beat frequency fr, the distance to the object is obtained. That is, when the recurrence frequency of the modulating signal is represented by fm and the frequency deviation is represented by $\Delta f$, the distance is given by aforesaid Eq. (6).

The above-description is for the case where the object is stationary. When the object is moving, the frequency-time relationships of the transmitted signal and the received signal change as shown in FIG. 54 due to the Doppler effect. That is, as shown in FIG. 55, the beat frequency fb is the superimposition of the beat frequency (fr) for a stationary object and the Doppler frequency (fd). Since the Doppler frequency fd alternates between positive and negative every modulation cycle, the beat frequency fb can also be expressed by the following equations, as in the case of aforesaid Eqs. (5) to (7).

$$fb=fr+fd \ldots \text{Positive} \quad (5)'$$

$$fb=fr-fd \ldots \text{Negative} \quad (6)'$$

$$fd=2vr \cdot f_o/c \quad (7)'$$

where vr in Eq. (7)' is the relative velocity with respect to the object. Accordingly, by measuring the positive beat frequency fb and the negative beat frequency fb every half a modulation cycle, fr and fd, i.e. the distance R to the object and the relative velocity vr with respect to the object, respectively, can be obtained.

FIG. 56 is a block diagram showing a detailed construction of the FM-CW radar apparatus of FIG. 51. In FIG. 56, the same portions as in FIG. 51 are denoted by common reference numerals. In the FM-CW radar apparatus, reference numerals 800a and 800b denote a high-frequency amplifier on the transmitting and receiving sides, respectively. Reference numeral 900 denotes a demodulating unit.

The frequency-modulation (FM) voltage generator 200 generates a frequency-modulation voltage $v_T$ whose recurrence frequency periodically changes in a triangular form with a predetermined DC voltage component ($V_{TO}$) as a center. The variable frequency oscillator 100 is composed of a variable capacitance unit 100a and an oscillating unit 100b so as to perform frequency modulation in accordance with frequency-modulation voltage $v_T$ from the FM voltage generating unit 200.

The variable capacitance unit 100a has a coil CL for cutting off the high-frequency components and a varactor diode (variable capacitance element) VR which exhibits a change in capacitance with a change in applied voltage. A resistance value, as viewed from the output side, depends on the FM voltage $v_T$ inputted from the FM voltage generating unit 200. The oscillating unit 100b oscillates at the high center frequency $f_O$ (=59.5 GHz) and is composed, for example, of a resonator, an FET, a strip line and the like, whereby the frequency deviates in accordance with a capacitance value of the output side of the variable capacitance unit 100a. In actuality, the oscillating unit 100b oscillates at 29.75 GHz, which is multiplied so as to output a signal having a center frequency of the 59.5 GHz.

In view of cost, it is not practical to use, as the above-mentioned variable frequency oscillator 100, a variable frequency oscillator having a small frequency drift caused by a change in ambient temperature. Accordingly, the variable frequency oscillator 100 exhibits a change in the characteristics of the input voltage $V_T$ vs. the oscillation frequency f with a change in the ambient temperature. FIG. 57 exemplifies the characteristic of the input voltage $V_T$ vs. the oscillation frequency f. In FIG. 57, A represents a characteristic at the normal temperature (for example, 25° C.), B represents a characteristic at a high temperature (for example, +75° C.), and C represents a characteristic at a low temperature (for example, −30° C.).

For example, when the DC voltage component $V_{TO}$ is 4.4 V, the variable frequency oscillator 100 oscillates at a center frequency of 29.75 GHz at the normal temperature with a frequency deviation Δf corresponding to the amplitude of the frequency-modulation voltage $V_T$. When the ambient temperature rises, the characteristic changes to B, and the operating point shifts from $P_A$ to $P_B$. As a result, the center frequency $f_O$ changes, for example, as represented by a dashed line in FIG. 58. This causes a failure to accurately measure the distance R and the relative velocity vr.

Likewise, when the ambient temperature drops, the characteristic changes from A to C, and the operating point shifts from $P_A$ to $P_C$. As a result, the center frequency $f_O$ changes, for example, as represented by a dot-and-dash line in FIG. 58. This causes a failure to accurately measure the distance R and the relative velocity vr.

To cope with the aforesaid influence of the change in ambient temperature (temperature dependency of the $V_T$-f characteristic), in recent years, an FM-CW radar apparatus has been provided with a temperature sensor, whereby each operating point ($P_A$ to $P_C$) is shifted horizontally (along the $V_T$ axis) in FIG. 58 in accordance with the actual ambient temperature so as to compensate the $V_T$-f characteristic in accordance with temperature.

As described above, when the ambient temperature rises, the $V_T$-f characteristic changes to B, and when the ambient temperature drops, the $V_T$-f characteristic changes to C. In these cases, the operating point is horizontally shifted from $P_A$ to $P_B'$ and from $P_A$ to $P_C'$, respectively, as shown in FIG. 59, thereby suppressing fluctuations in the center frequency $f_O$.

However, in the FM-CW radar apparatus which was described earlier with reference to FIG. 49, the modulated transmission signal from the transmitting system slightly leaks to the low noise amplifier 107, and the leaking signal is amplitude-modulated. As a result, harmonic frequency components fsw±fm, fsw±2fm, fsw±3fm, etc., called FM/AM reconversion noise, still emerge near the frequency fsw, as shown in FIG. 50 (a).

The magnitudes of the harmonic frequency components fsw±fm, fsw±2fm, fsw±3fm, etc. are smaller than those of the harmonic frequency components fm, 2fm, 3fm, etc. shown in FIG. 48 as may be expected, whereby the receiving S/N ratio improves considerably. However, when a more distant object is to be picked up, the FM/AM reconversion noise becomes unignorable.

In the FM-CW radar apparatus which was described earlier with reference to FIG. 56, the $V_T$-f characteristics A, B, and C are different in inclination at the respective operating points $P_A$, $P_B'$, and $P_C'$. Thus, when the above-mentioned method of performing temperature compensation is applied, a change in ambient temperature does not cause the center frequency $f_O$ to vary, but causes the frequency deviation Δf to greatly vary. Hence, the distance R and the relative velocity vr still cannot be measured accurately.

For example, in a 30 GHz oscillator having a modulation sensitivity of 1.0 at 25° C., the modulation sensitivity changes to 1.2–1.6 at an ambient temperature of −30° C. and to 0.6–0.8 at an ambient temperature of 70° C. In other words, it has been found by experiments that there arises a measurement error of 17% to 38% at an ambient temperature of −30° C. and a measurement error of 25% to 67% at an ambient temperature of 70° C. The modulation sensitivity is the quotient of dividing the modulation frequency Δf by the frequency-modulation voltage $\Delta V_T$ (=Δf/ΔVT).

SUMMARY OF THE INVENTION

The present invention has been accomplished in view of the above-mentioned problems. A first object of the present invention is to provide a radar apparatus for detecting a distance/velocity which effectively removes FM/AM conversion (reconversion) noise in a simple structure thereby to accurately detect a distance to and a relative velocity with respect to an object even with a smaller transmitting power.

A second object of the present invention is to provide a radar apparatus for detecting a distance/velocity which maintains a frequency deviation (modulation sensitivity) of a modulated transmission signal constant irrespective of a change in ambient temperature thereby to accurately measure a distance to and a relative velocity with respect to an object.

To attain the objective, a radar apparatus for detecting a distance/velocity of the present invention is composed of: a transmitting system for transmitting a signal which is frequency modulated with a modulating signal having a predetermined recurrence frequency;

a receiving system for receiving a reflected wave signal, which is the modulated transmission signal transmitted from the transmitting system and reflected by an object, and which mixes the reflected wave signal and the modulated transmission signal from the transmitting system so as to detect a beat wave signal of the reflected wave signal and the modulated transmission signal;

a high-pass filter for filtering the beat wave signal detected in the receiving system so as to cut off modulation frequency components of the modulated transmission signal the orders of which are equal to or lower than a predetermined order; and a distance/velocity calculating unit which calculates a distance to the object and a relative velocity between the object and an observer based on frequency information in the beat wave signal which has been passed through the high-pass filter.

Accordingly, in the radar apparatus for detecting a distance/velocity of the present invention, the beat wave signal which is detected by mixing the reflected wave signal from the object and the modulated transmission signal from the transmitting system is passed through the high-pass filter. With this structure, the distance/velocity calculating unit can calculate the distance to the object and the relative velocity between the object and the observer based on the frequency information in the beat wave signal which has been passed through the high-pass filter so as to cut off those modulation frequency components of orders which are equal to or lower than a predetermined order, which otherwise emerge near a frequency component of the reflected wave signal and make it difficult to extract frequency information of the received signal. Thus, the radar apparatus of the present invention can detect the distance to the object and the relative velocity between the object and the observer in a quite simple structure and with lower power requirements and high accuracy.

A radar apparatus for detecting a distance/velocity according to the present invention is composed of an FM-CW radar apparatus having a transmitting system for transmitting a signal which is frequency-modulated with a modulating signal having a predetermined recurrence frequency, a receiving system for receiving a reflected wave signal, which is the modulated transmission signal transmitted from the transmitting system and reflected by an object, and which mixes the reflected wave signal and the modulated transmission signal from the transmitting system so as to detect a beat wave signal of the reflected wave signal and the modulated transmission signal, a high-pass filter for filtering the beat wave signal detected in the receiving system so as to cut off modulation frequency components of the modulated transmission signal the orders of which are equal to or lower than a predetermined order, and a distance/velocity calculating unit which calculates the distance to the object and the relative velocity between the object and an observer based on frequency information in the beat wave signal which has been passed through the high-pass filter, and a radar apparatus for short distance which is different in type from the FM-CW radar apparatus.

Accordingly, in the radar apparatus for detecting a distance/velocity of the present invention, in obtaining the distance to the object and the relative velocity between the object and the observer, the radar apparatus for short distance complements frequency information of the received signal (mainly frequency information in the case of a short distance to the object) which is lost from the beat wave signal as a result of passing through the high-pass filter, whereby a required range of detection of a distance/relative velocity can be easily obtained in a simple structure which is implemented by adding the radar apparatus for short distance to the FM-CW radar apparatus.

Furthermore, a radar apparatus for detecting a distance/velocity of the present invention is composed of: a transmitting system for transmitting a signal which is frequency-modulated with a modulating signal having a predetermined recurrence frequency;

a receiving system for receiving a reflected wave signal, which is the modulated transmission signal transmitted from the transmitting system and reflected by an object, and which mixes the reflected wave signal and the modulated transmission signal from the transmitting system so as to detect a beat wave signal of the reflected wave signal and the modulated transmission signal;

a distance/velocity calculating unit which calculates a distance to the object and a relative velocity between the object and an observer based on frequency information in the beat wave signal which has been detected in the receiving system; and storage means for storing FM/AM conversion noise information which is outputted in the state that the reflected wave signal from the object is not received, wherein the distance/velocity calculating unit removes the FM/AM conversion noise information stored in the storage means from frequency information in the beat wave signal before calculating the distance to the object and the relative velocity between the object and the observer based on frequency information in the beat wave signal.

Accordingly, in the radar apparatus for detecting a distance/velocity of the present invention, the receiving S/N ratio of the apparatus can be greatly improved, whereby the aforesaid distance/velocity can be reliably detected with a small power and a high accuracy and can be easily detected even when the apparatus is in a poor receiving state.

Also, a radar apparatus for detecting a distance/velocity of the present invention is composed of: a transmitting system for transmitting a signal which is frequency-modulated with a modulating signal having a predetermined recurrence frequency;

a receiving system for receiving a reflected wave signal, which is the modulated transmission signal transmitted from the transmitting system and reflected by an object, and which mixes the reflected wave signal and the modulated transmission signal from the transmitting system so as to detect a beat wave signal of the reflected wave signal and the modulated transmission signal; and a distance/velocity calculating unit which calculates a distance to the object and a relative velocity between the object and an observer based on frequency information in the beat wave signal which has been detected in the receiving system, wherein the distance/velocity calculating unit removes modulation frequency components of the modulated transmission signal from frequency information in the beat wave signal before calculating the distance to the object and the relative velocity between the object and the observer based on frequency information in the beat wave signal.

Accordingly, in the radar apparatus for detecting a distance/velocity of the present invention, the distance to and the relative velocity with respect to the object can be obtained only on the basis of frequency information of the reflected wave signal from the object, whereby a distance/velocity can be reliably detected with a high accuracy and can be easily detected even when the apparatus is in a poor receiving state.

And further, a radar apparatus for detecting a distance/velocity of the present invention is composed of: a modulating signal generating unit which generates a modulating signal having a predetermined recurrence frequency;

a DC voltage compensating unit for compensating a DC voltage component of the modulating signal in accordance with ambient temperature;

an amplitude compensating unit for compensating an amplitude of the modulating signal in accordance with ambient temperature;

a variable frequency oscillator for generating a frequency-modulated signal by varying an oscillation frequency in accordance with the modulating signal having a voltage and an amplitude which have been compensated in accordance with ambient temperature at the DC voltage compensating unit and the amplitude compensating unit, respectively;

a transmitting unit for transmitting the frequency-modulated signal outputted from the variable frequency oscillator toward an object;

a receiving unit for receiving a reflected wave signal, which is the modulated transmission signal transmitted from the transmitting unit and reflected by the object, and which mixes the reflected wave signal and the modulated transmission signal from the transmitting unit so as to detect a beat wave signal of the reflected wave signal and the modulated transmission signal; and a distance/velocity calculating unit for calculating a distance to and a relative velocity with respect to the object based on frequency information in the beat wave signal which has been detected at the receiving unit.

Accordingly, in the radar apparatus for detecting a distance/velocity of the present invention, the DC voltage compensating unit can compensate the DC voltage component of the modulating signal in accordance with ambient temperature, and thus the center frequency of the variable frequency oscillator can be held fixed even when the ambient temperature rises above or drops below the normal temperature. Also, the amplitude compensating unit compensates the amplitude of the modulating signal in accordance with ambient temperature, whereby a frequency deviation (modulation sensitivity) can be maintained constant regardless of an ambient temperature. Accordingly, the center frequency and modulation sensitivity can be held fixed regardless of temperature, whereby the accuracy of measuring a distance to and a relative velocity with respect to an object can be improved.

BRIEF DESCRIPTION OF THE DRAWINGS

FIG. 29 is a block diagram showing the construction of a signal processing unit in the FM-CW radar apparatus according to the third modification of the fourth embodiment;

FIG. 32 is a block diagram showing the construction of an oscillator in the FM-CW radar apparatus according to the fifth embodiment;

FIG. 58 is a graph for illustrating the temperature dependency of the $V_T$-f characteristic in the general FM-CW radar apparatus.

DESCRIPTION OF THE PREFERRED EMBODIMENTS (a) Aspects of t the present invention:

Aspects of the present invention will now be described with reference to the drawings.

Figure 1:
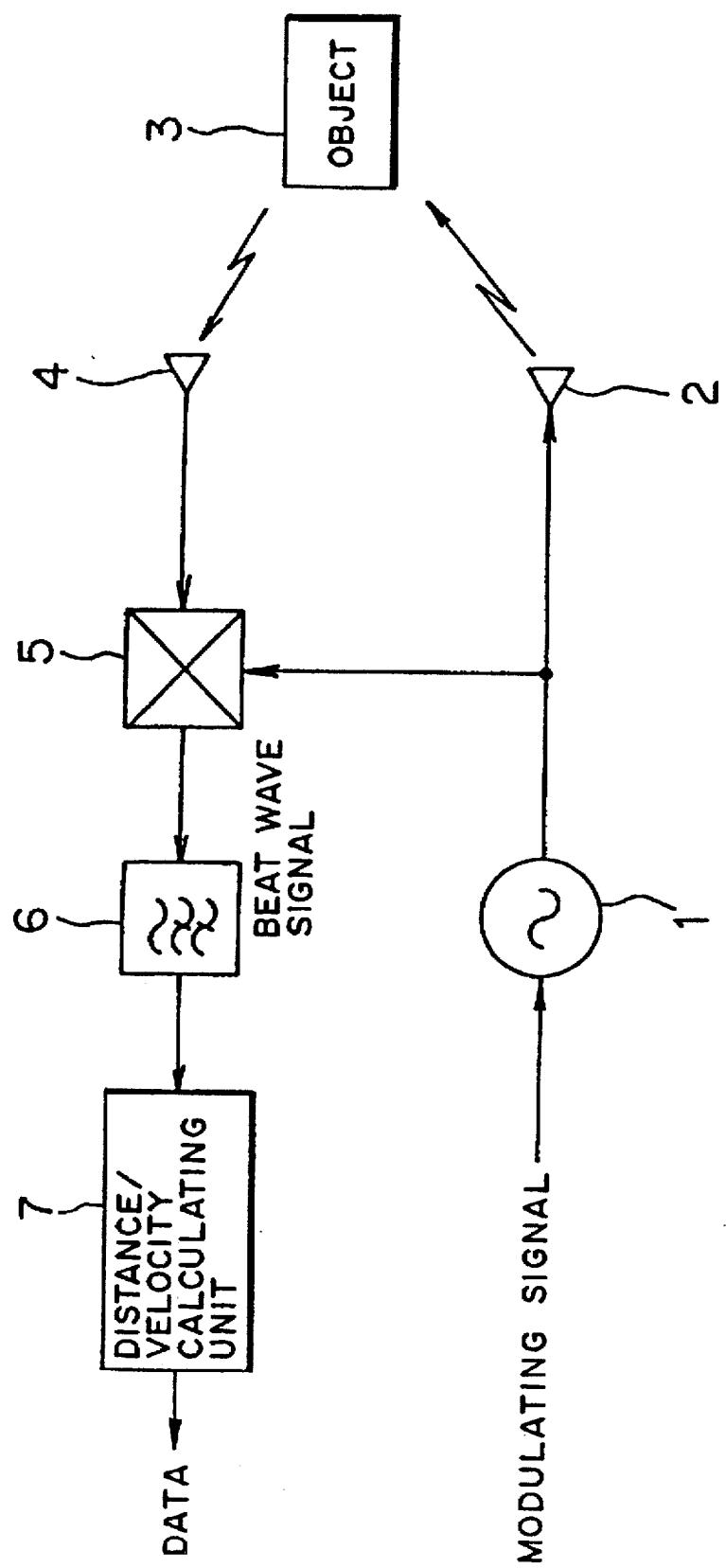
FIGS. 1 to 5 are block diagrams showing the aspects of the present invention.

FIG. 1 is a block diagram showing an aspect of the present invention. In FIG. 1, reference numeral 1 denotes a voltage controlled oscillator, 2 denotes a transmitting antenna, 3 denotes an object a distance to/a velocity of which is to be detected, 4 denotes a receiving antenna, 5 denotes a mixer, 6 denotes a high-pass filter, and 7 denotes a distance/velocity calculating unit. The voltage controlled oscillator 1 generates a signal which is frequency-modulated with a modulating signal having a predetermined recurrence frequency. The modulated signal outputted from the voltage controlled oscillator 1 is outputted as a modulated transmission signal from a transmitting system through the transmitting antenna 2.

The receiving antenna 4 mainly receives the modulated transmission signal which has been outputted from the transmitting system and reflected from the object 3, i.e. a reflected wave signal. The mixer 5 mixes the reflected wave signal which has been received by the receiving antenna 4 and the modulated transmission signal from the transmitting system, thereby detecting a beat wave signal of the reflected wave signal and the modulated transmission signal.

The high-pass filter 6 filters the beat wave signal detected in the receiving system so as to cut off the modulation frequency components of the modulated transmission signal with orders that are equal to or lower than a predetermined order. The distance/velocity calculating unit 7 calculates the distance to the object 3 and the relative velocity between the object 3 and an observer based on the frequency information in the beat wave signal which has passed through the high-pass filter 6.

In the thus constructed radar apparatus for detecting a distance/velocity, the voltage controlled oscillator 1 outputs a signal which is frequency-modulated with a modulating signal having a predetermined recurrence frequency, and the modulated signal is outputted, as a modulated transmission signal, from the transmitting system through the transmitting antenna. The modulated transmission signal is reflected by the object 3, and the reflected wave signal is received by the receiving antenna 4.

The mixer 5 mixes the reflected wave signal and the modulated transmission signal from the transmitting system, thereby detecting a beat wave signal of the reflected wave signal and the modulated transmission signal. Furthermore, the high-pass filter 6 filters the beat wave signal so as to cut off the modulation frequency components of the modulated transmission signal with orders that are equal to or lower than a predetermined order.

Thus, the distance/velocity calculating unit can calculate the distance to the object 3 and the relative velocity between the object 3 and the observer based on the frequency information in the beat wave signal which has been passed through the high-pass filter 6 so as to cut off those modulation frequency components which otherwise emerge near the frequency component of the received signal (reflected wave signal) and make it difficult to extract the frequency information of the received signal.

Accordingly, in the above-mentioned radar apparatus for detecting a distance/velocity of the present invention, the beat wave signal which is detected by mixing the reflected wave signal from the object 3 and the modulated transmission signal from the transmitting system is passed through the high-pass filter 6, whereby the distance/velocity calculating unit 7 can calculate the distance to the object 3 and the relative velocity between the object 3 and the observer based on the frequency information in the beat wave signal which has been passed through the high-pass filter 6 so as to cut off those modulation frequency components with orders that are equal to or lower than a predetermined order, which would otherwise emerge near a frequency component of the reflected wave signal and make it difficult to extract the frequency information of the received signal. Thus, the radar apparatus of the present invention can detect the distance to the object 3 and the relative velocity between the object 3 and the observer in a quite simple structure and with low power end high accuracy.

Figure 2:
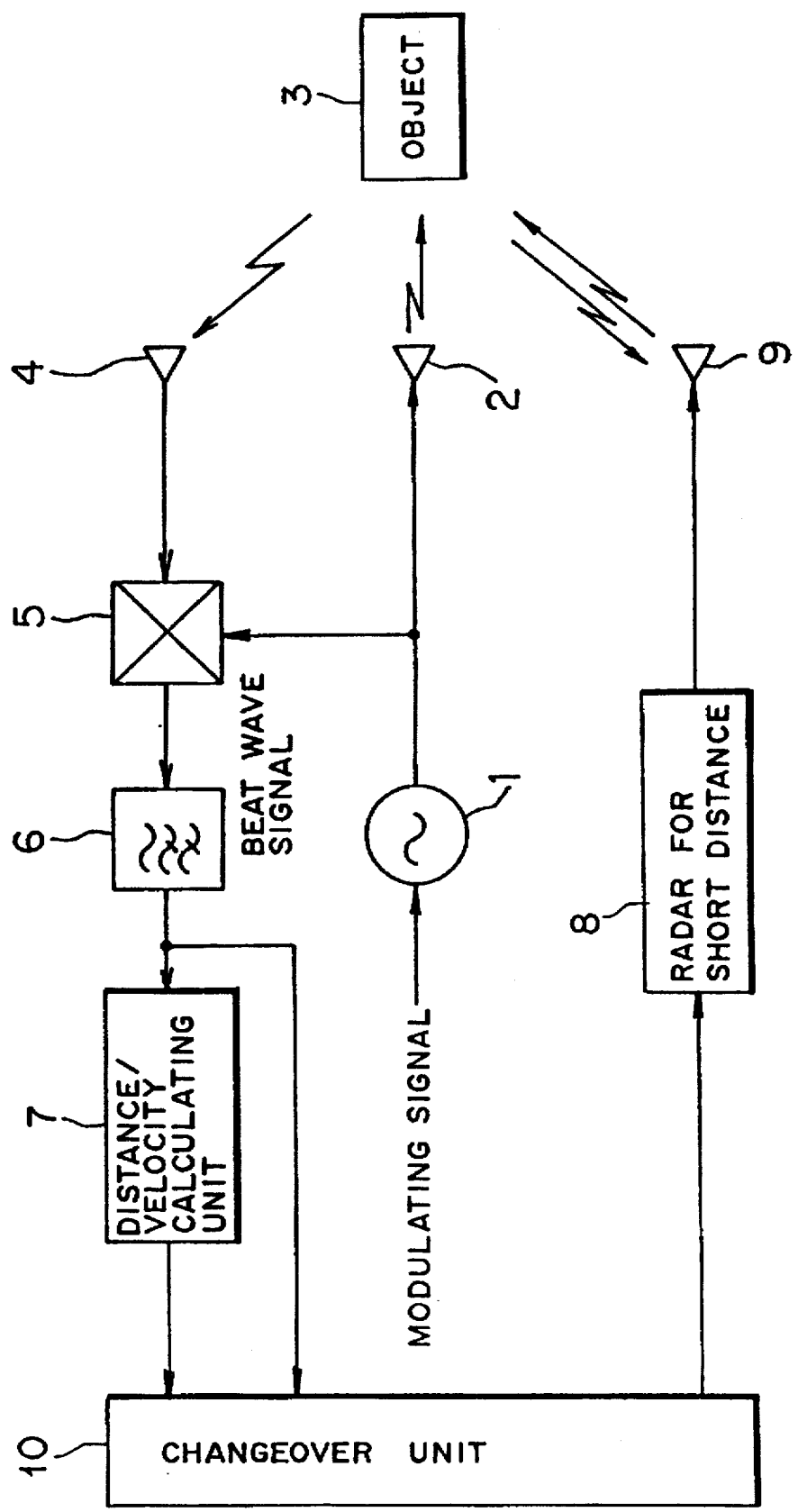

Next, FIG. 2 is a block diagram showing another aspect of the present invention. A radar apparatus for detecting a distance/velocity shown in FIG. 2 comprises an FM-CW radar apparatus having a voltage controlled oscillator 1, a transmitting antenna 2, a receiving antenna 4, a mixer 5, a high-pass filter 6, and a distance/velocity calculating unit 7, as in the apparatus which was described earlier with reference to FIG. 1, and further comprises a radar apparatus 8 for short distance which is different in type from the FM-CW radar apparatus.

In FIG. 2, reference numeral 9 denotes a transmitting/receiving antenna for the radar apparatus 8, and reference numeral 10 denotes a change-over unit for selectively using either the FM-CW radar apparatus and the radar apparatus 8 for short distance.

In the thus constructed radar apparatus for detecting a distance/velocity, as in the apparatus of FIG. 1, the distance/velocity calculating unit 7 of the FM-CW radar apparatus can calculate the distance to the object 3 and the relative velocity between an object 3 and the observer based on only the frequency information in the beat wave signal which has been passed through the high-pass filter 6 so as to cut off modulation frequency components of the modulated transmission signal with orders that are equal to or lower than a predetermined order.

And further, since the radar apparatus of FIG. 2 has the radar apparatus 8 for short distance which is different in type from the above-mentioned FM-CW radar apparatus, the radar apparatus 8 for short distance is used to obtain the distance to the object 3 and the relative velocity between the object 3 and the observer in the case where, due to the therefore short distance to the object 3, the frequency information of the received signal may be lost as a result of the cutting off of modulation frequency components of the modulated transmission signal with orders that are equal to or lower than a predetermined order at the high-pass filter 6 of the FM-CW radar apparatus.

Accordingly, in the above-mentioned radar apparatus for detecting a distance/velocity, in obtaining the distance to the object 3 and the relative velocity between the object 3 and the observer, the radar apparatus 8 for short distance complements the frequency information of the received signal (mainly frequency information in the case of a short distance to the object 3) which is lost from the beat wave signal as a result of passing through the high-pass filter 6, whereby a required range of detection of a distance/relative velocity can be easily obtained in a simple structure which is implemented by adding the radar apparatus 8 for short distance to the FM-CW radar apparatus having a similar structure to that of the apparatus of FIG. 1.

Figure 3:
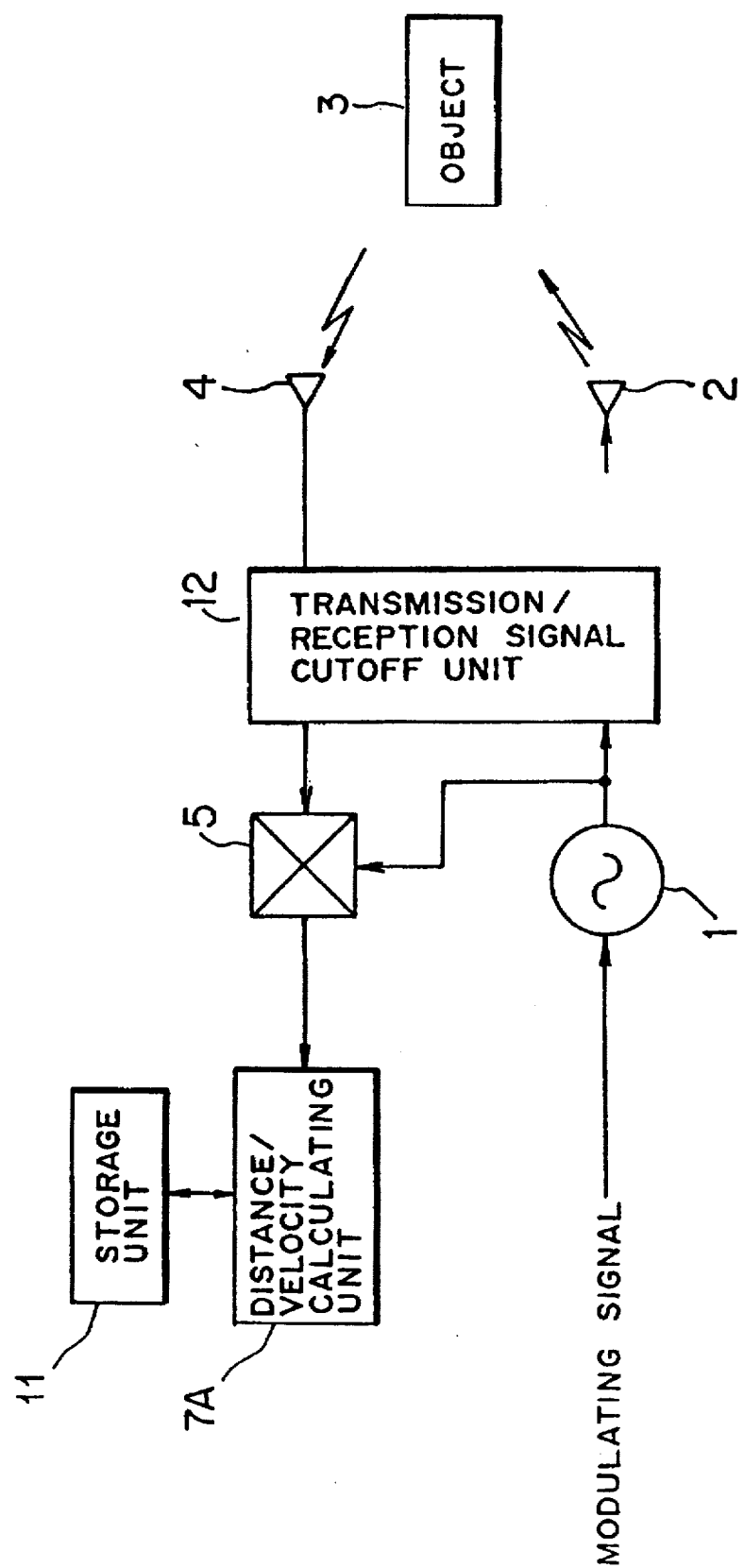

Also, FIG. 3 is a block diagram showing a further aspect of the present invention. A radar apparatus for detecting a distance/velocity shown in FIG. 3 has a voltage controlled oscillator 1, a transmitting antenna 2, a receiving antenna 4, and a mixer 5, as in the apparatus which was described earlier with reference to FIG. 1, and further has a distance/velocity calculating unit 7A and a storage unit 11.

The storage unit 11 stores FM/AM conversion noise information which is outputted in the state that the reflected wave signal from an object 3 is not received. The distance/velocity calculating unit 7A, as in the case of the distance/velocity calculating unit 7 of FIG. 1, calculates the distance to the object 3 and the relative velocity between the object 3 and the observer based on the frequency information in the beat wave signal which has been detected in the receiving system, and is also adapted to remove the FM/AM conversion noise information stored in the storage unit 11 from the frequency information in the beat wave signal before calculating the distance/velocity.

In thus constructed radar apparatus for detecting a distance/velocity, the storage unit 11 stores FM/AM conversion noise information which is outputted in the state that the reflected wave signal from the object 3 is not received. Accordingly, the distance/velocity calculating unit 7A can calculate the distance to the object 3 and the relative velocity between the object 3 and the observer based on the resultant frequency information after removing the FM/AM conversion noise information stored in the storage unit 11 from the frequency information in the beat wave signal which is received by the receiving system.

Accordingly, in the above-mentioned radar apparatus for detecting a distance/velocity, the receiving S/N ratio of the apparatus can be greatly improved, whereby a distance/velocity can be reliably detected with low power and high accuracy and can be easily detected even when the apparatus is in a poor receiving state.

As shown in FIG. 3, the above-mentioned radar apparatus for detecting a distance/velocity has a transmission/reception signal cutoff unit 12 for stopping the transmission/reception of a signal between the transmitting/receiving system and the outside. The FM/AM conversion noise information is stored in the storage unit 11 in the state that the transmission/reception of a signal to/from the outside is cut off, and a distance/relative velocity is calculated with the FM/AM conversion noise information taken into consideration in the state that the transmission/reception of a signal to/from the outside is established.

Thus, first, in the state that the transmission/reception of a signal to/from the outside is cut off by the transmission/reception signal cutoff unit 12, the FM/AM conversion noise information is stored in the storage unit 11. Then, in the state that the transmission/reception of a signal to/from the outside is established, a distance/relative velocity is calculated.

Accordingly, in the above-mentioned radar apparatus for detecting a distance/velocity, a distance to/a relative velocity with respect to the object 3 can be reliably obtained with the FM/AM conversion noise information taken into consideration.

Specifically, the transmission/reception signal cutoff unit 12 is composed of a switch provided in each of the transmitting and receiving systems. In the state that at least the switch provided in the receiving system is off, the FM/AM conversion noise information is stored in the storage unit 11. In the state that the switches are on, a distance/relative velocity is calculated with the FM/AM conversion noise information taken into consideration.

Thus, as a result of the transmission/reception signal cutoff unit 12 being composed of a switch provided in each of the transmitting and receiving systems, in the state that at least the switch provided in the receiving system is off, the FM/AM conversion noise information can be stored in the storage unit 11. Also, in the state that the switches are on, a distance/relative velocity can be calculated with the FM/AM conversion noise information taken into consideration.

Accordingly, a distance/relative velocity can be quite easily obtained with the FM/AM conversion data taken into consideration.

Also, the transmission/reception signal cutoff unit 12 may be composed of an attenuator provided in each of the transmitting and receiving systems. In this case, in the state that at least the attenuator provided in the receiving system is activated so as to attenuate a signal, the FM/AM conversion noise information is stored in the storage unit 11. In the state that the attenuators are deactivated so as not to attenuate a signal, a distance/relative velocity is calculated with the FM/AM conversion noise information taken into consideration.

As a result of the transmission/reception signal cutoff unit 12 being composed of an attenuator provided in each of the transmitting and receiving systems, in the state that at least the attenuator provided in the receiving system is activated so as to attenuate a signal, the FM/AM conversion noise information can be stored in the storage unit 11. Also, in the state that the attenuators are deactivated so as not to attenuate a signal, a distance/relative velocity can be calculated with the FM/AM conversion noise information taken into consideration.

Accordingly, also in this case, the aforesaid distance/relative velocity can be quite easily obtained with the FM/AM conversion data taken into consideration.

Also, the transmission/reception signal cutoff unit 12 may be composed of a changeover switch for switching to an antenna side or a terminator side provided in each of the transmitting and receiving systems. In this case, in the state that at least the changeover switch provided in the receiving system is switched to the terminator side, the FM/AM conversion noise information is stored in the storage unit 11. In the state that the changeover switches are switched to the antenna side, a distance/relative velocity is calculated with the FM/AM conversion noise information taken into consideration.

As a result of the transmission/reception signal cutoff unit 12 being composed of a changeover switch for switching to the antenna side or the terminator side provided in each of the transmitting and receiving systems, in the state that at least the changeover switch provided in the receiving system is switched to the terminator side, the FM/AM conversion noise information can be stored in the storage unit 11. Also, in the state that the changeover switches are switched to the antenna side, a distance/relative velocity can be calculated with the FM/AM conversion noise information taken into consideration.

Accordingly, also in this case, the aforesaid distance/relative velocity can be obtained with the FM/AM conversion noise information taken into consideration. Furthermore, since the reflected wave signal from the object 3 is cut off by switching the changeover switch to the terminator side, the influence of the reflection of a signal within the apparatus or the like can be reliably suppressed, thereby obtaining a stable operation.

Figure 4:
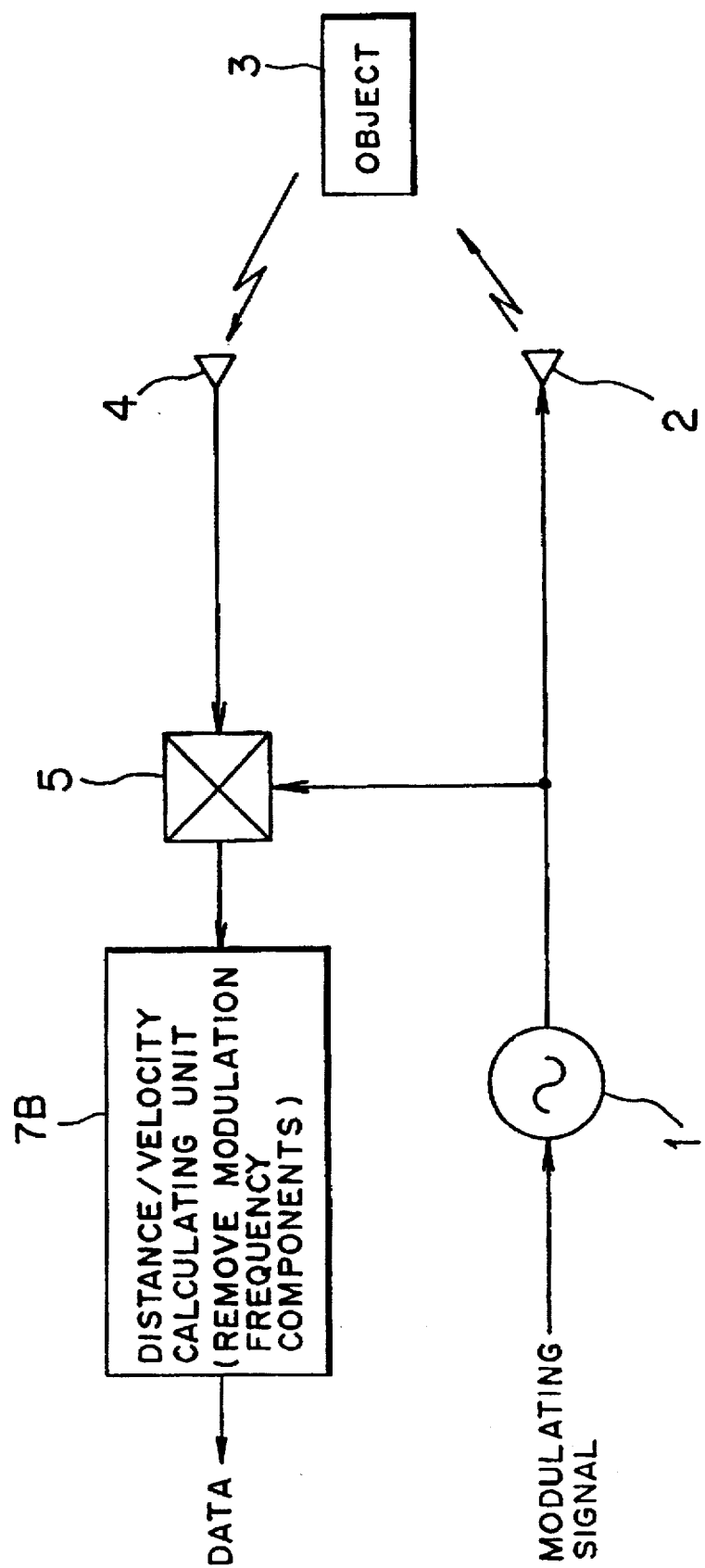

FIG. 4 is a block diagram showing still another aspect of the present invention. A radar apparatus for detecting a distance/velocity shown in FIG. 4 has a voltage controlled oscillator 1, a transmitting antenna 2, a receiving antenna 4, and a mixer 5, as in the apparatus which was described earlier with reference to FIG. 1, and further has a distance/velocity calculating unit 7B.

The distance/velocity calculating unit 7B calculates the distance to the object 3 and the relative velocity between the object 3 and the observer based on frequency information in the beat wave signal which has been detected in the receiving system, and is also adapted to remove the modulation frequency components of the modulated transmission signal before calculating the distance/velocity.

Thus, in the above-mentioned radar apparatus for detecting a distance/velocity, the distance/velocity calculating unit 7B can calculate the distance to the object 3 and the relative velocity between an object 3 and the observer based on the frequency information in the beat wave signal which has been detected in the receiving system, and is also adapted to remove the modulation frequency components of the modulated transmission signal before calculating the distance/velocity.

Accordingly, in the above-mentioned radar apparatus for detecting a distance/velocity, the distance to and the relative velocity with respect to the object 3 can be obtained based on only the frequency information of the reflected wave signal from the object 3, whereby a distance/velocity can be reliably detected with high accuracy and can be easily detected even when the apparatus is in a poor receiving state.

Also, in the apparatus of FIG. 4, the structure of the transmitting system may be modified to be able to transmit a signal which is frequency-modulated with a predetermined modulating signal selected from a plurality of modulating signals having different recurrence frequencies, or to be able to change the frequency deviation of the modulated transmission signal, or to be able to change the center frequency of the modulated transmission signal.

When a signal which is frequency-modulated with a predetermined modulating signal selected from a plurality of modulating signals having different recurrence frequencies is transmitted, the modulation frequency components of the modulated transmission signal can be shifted by a required amount from the frequency information of the received signal (reflected wave signal). This prevents the frequency information of the received signal from being removed together with the modulation frequency components of the modulated transmission signal.

Also, when the modulated transmission signal having a variable frequency deviation or a variable center frequency of transmission is transmitted, the modulation frequency components of the modulated transmission signal can be shifted by a required amount from the frequency information of the received signal. This prevents the frequency information of the received signal from being removed together with the modulation frequency components of the modulated transmission signal.

Accordingly, the distance to and the relative velocity with respect to the object 3 can always be obtained with a high accuracy, and a required range of observation can be easily attained.

Specifically, the aforesaid distance/velocity calculating unit 7B is adapted to use past data in calculating the distance to the object 3 and the relative velocity between the object 3 and the observer based on frequency information in the beat wave signal which has been detected in the receiving system.

Thus, in the radar apparatus of FIG. 4, even when the frequency information of the received signal is lost together with the modulation frequency components of the modulated transmission signal, the distance/velocity calculating unit 7B can calculate the distance to the object 3 and the relative velocity between the object 3 and the observer by using past data.

Accordingly, the distance to and the relative velocity with respect to the object 3 can always be obtained reliably with high accuracy.

Information about the distance and the relative velocity which was obtained in the last calculation is used as past data. Also, information about the distance and the relative velocity which was obtained in the last calculation and information about the distance and the relative velocity which was obtained in the calculation before the last calculation may be used as past data.

Accordingly, the distance and relative velocity can be easily obtained. The aforesaid distance and relative velocity can be obtained with a higher accuracy by using information about distance and relative velocity which was obtained in the last calculation and the calculation before the last calculation.

The structure of the distance/velocity calculating unit 7B may be modified such that signals having a predetermined signal level or higher are prevented from being subjected to an information removing process in calculating the distance to the object 3 and the relative velocity between the object 3 and the observer based on the frequency information in the beat wave signal which has been detected in the receiving system.

Thus, when the signal level of a reflected wave signal in the beat wave signal is equal to or lower than a predetermined level, the distance/velocity calculating unit 7B can calculate the distance to the object 3 and the relative velocity between the object 3 and the observer based on the frequency information which is obtained only by removing information about those modulation frequency components of the modulated transmission signal which emerge near the frequency of the reflected wave signal.

Accordingly, loss of the frequency information of the reflected wave signal from the object 3 can be reliably prevented, whereby the distance and the relative velocity can always be obtained with high accuracy.

Figure 5:
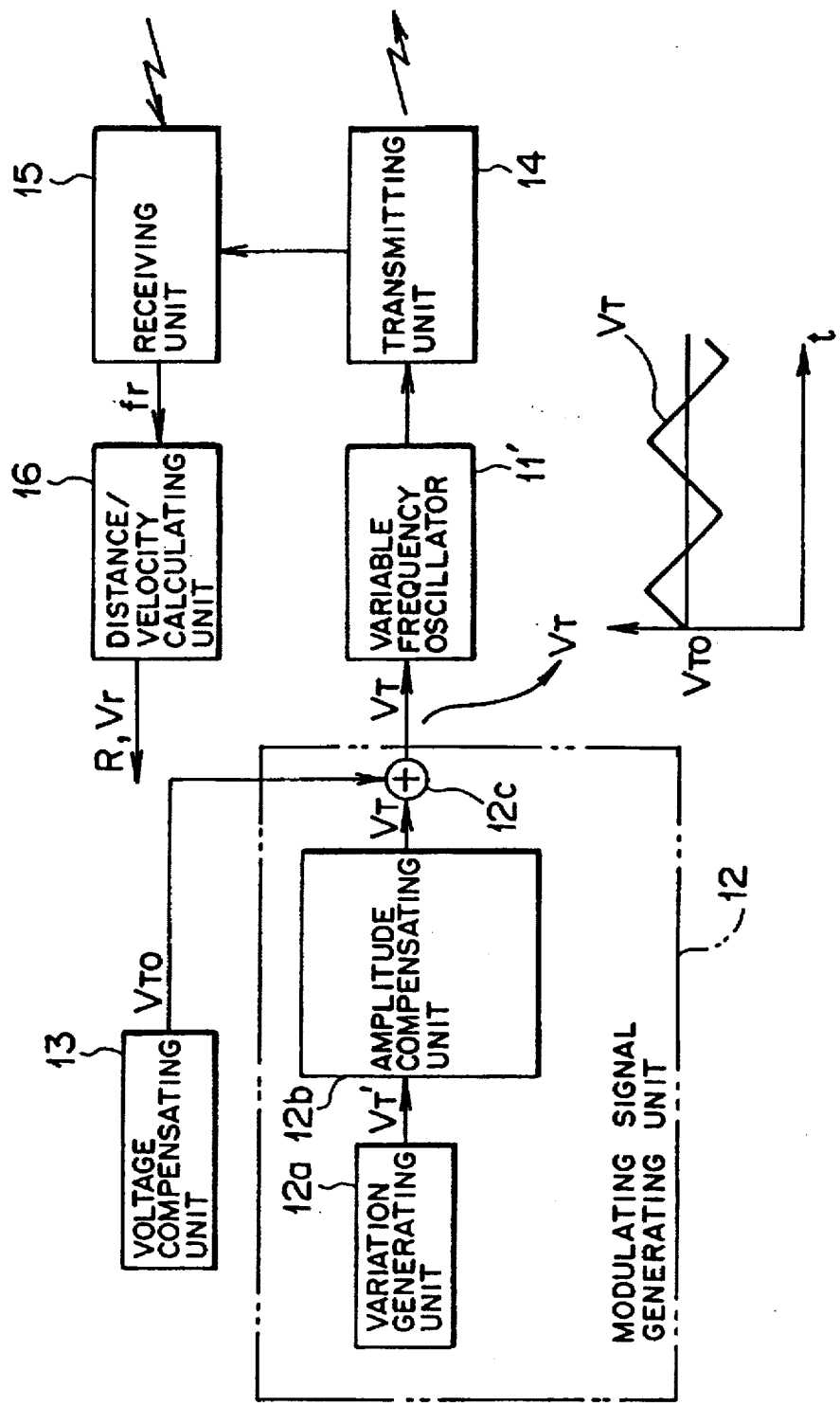

Next, FIG. 5 is a block diagram showing a still further aspect of the present invention. In FIG. 5, reference numeral 11' denotes a variable frequency oscillator, 12 denotes a modulating signal generating unit, 13 denotes a DC voltage compensating unit, 14 denotes a transmitting unit, 15 denotes a receiving unit, and 16 denotes a distance/velocity calculating unit.

The variable frequency oscillator 11' changes oscillation frequency in accordance with an input signal. The modulating signal generating unit 12 generates a modulating signal having a predetermined recurrence frequency and inputs the generated modulating signal to the variable frequency oscillator 11'. The DC voltage compensating unit 13 compensates the DC voltage component (i.e. center voltage) of the modulating signal in accordance with the ambient temperature. The transmitting unit 14 transmits the frequency-modulated signal outputted from the variable frequency oscillator 11' toward an object.

The receiving unit 15 receives a reflected wave signal, which is the modulated signal transmitted from the transmitting unit 14 and reflected by the object, and mixes the reflected wave signal and the modulated transmission signal from the transmitting unit 14 so as to detect a beat wave signal of the reflected wave signal and the modulated transmission signal. The distance/velocity calculating unit 16 calculates the distance to and the relative velocity with respect to the object based on frequency information in the beat wave signal which has been detected at the receiving unit 15.

Furthermore, as shown in FIG. 5, the modulating signal generating unit 12 has a variation generating unit 12a for generating a voltage variation of the modulating signal and an amplitude compensating unit 12b for compensating the amplitude of the modulating signal in accordance with the ambient temperature (for example, as the ambient temperature rises, the amplitude of a voltage variation $v_T'$ of the modulating signal is increased). The synthesizing unit 12c synthesizes a DC voltage component $V_{TO}$ from the DC voltage compensating unit 13 and a voltage variation $v_T$ of the modulating signal which has been amplitude-compensated at the amplitude compensating unit 12b, thereby compensating the DC voltage component and amplitude of the modulating signal from the variation generating unit 12a in accordance with the ambient temperature.

In the thus constructed radar apparatus for detecting a distance/velocity, the modulating signal generating unit 12 generates a modulating signal (DC voltage component $V_{TO}$) having a predetermined recurrence frequency and inputs thus the generated modulating signal to the variable frequency oscillator 11'. The variable frequency oscillator 11' varies the oscillation frequency in accordance with the input signal, whereby a frequency-modulated signal is outputted therefrom. The frequency-modulated signal is transmitted from the transmitting unit 14 toward the object.

On the other hand, the receiving unit 15 receives a reflected wave signal, which is the modulated transmission signal transmitted from the transmitting unit 14 and reflected by the object, and mixes the reflected wave signal and the modulated transmission signal from the transmitting unit 14 so as to detect a beat wave signal of the reflected wave signal and the modulated transmission signal. The distance/velocity calculating unit 16 calculates the distance to and the relative velocity with respect to the object based on the frequency information in the beat wave signal which has been detected at the receiving unit 15.

In the above-mentioned radar apparatus for detecting a distance/velocity, the DC voltage compensating unit 13 compensates the DC voltage component $V_{TO}$ of the modulating signal in accordance with the ambient temperature, and the amplitude compensating unit 12b compensates the amplitude of the modulating signal in accordance with the ambient temperature. Accordingly, the oscillation frequency of the variable frequency oscillator 11' is maintained constant, and also a modulation sensitivity is maintained constant even when the ambient temperature rises above or drops below the normal temperature.

Accordingly, in the above-mentioned radar apparatus for detecting a distance/velocity, the center frequency and modulation sensitivity of the variable frequency oscillator 11' can be maintained constant regardless of variation in temperature, whereby then the accuracy of measuring the distance to and the relative velocity with respect to the object can be greatly improved.

Specifically, the aforesaid amplitude compensating unit 12b is composed of a first multiplier and a second multiplier. The first multiplier performs multiplication on the information representing the difference between an ambient temperature and the normal temperature and an amplitude adjustment value used for adjusting the amplitude of the modulating signal, thereby generating a signal for adjusting the amplitude of the modulating signal. The second multiplier performs multiplication on the modulating signal and the amplitude adjusting signal from the first multiplier, thereby compensating the amplitude of the modulating signal in accordance with ambient temperature.

Thus, in the amplitude compensating unit 12b, the first and second multipliers make calculation based on ambient temperature information (temperature information) and amplitude adjustment information for the modulating signal, respectively. Accordingly, the amplitude of the modulating signal can be reliably compensated in accordance with ambient temperature.

The amplitude compensating unit 12b may be composed of an operational amplifier and a multiplier. The operational amplifier outputs a signal obtained by multiplying the information representing the difference between an ambient temperature and the normal temperature by a predetermined amplitude adjustment value for adjusting the amplitude of the modulating signal, as a signal for adjusting the amplitude of the modulating signal. The multiplier performs multiplication on the modulating signal and the amplitude adjusting signal to be outputted from the operational amplitude, thereby compensating the amplitude of the modulating signal in accordance with ambient temperature.

Also, the amplitude compensating unit 12b may be composed of a voltage signal generating unit, an amplitude adjusting signal generating unit, and a multiplier. The voltage signal generating unit outputs a voltage signal having an amplitude corresponding to the information representing the difference between an the ambient temperature and the normal temperature. When the voltage signal is positive, the amplitude adjusting signal generating unit multiplies the voltage signal by a first amplitude adjustment value. When the voltage signal is negative, the amplitude adjusting signal generating unit multiplies the voltage signal by a second amplitude adjustment value. With this operation, two kinds of amplitude adjusting signals can be generated for the modulating signal. The multiplier performs multiplication on the modulating signal and the amplitude adjusting signal outputted from the amplitude adjusting signal generating unit, thereby compensating the amplitude of the modulating signal in accordance with the ambient temperature.

Furthermore, the amplitude compensating unit 12b may be composed of a memory, a read-out control unit, and a multiplier. The memory stores the correspondence between different ambient temperatures and amplitude values of the modulating signal at the predetermined ambient temperatures. The read-out control unit reads an amplitude value of the modulating signal corresponding to a present ambient temperature from the memory and outputs the thus read amplitude value as an amplitude adjusting signal for the modulating signal. The multiplier performs multiplication on the modulating signal and the amplitude adjusting signal outputted from the read-out control unit, thereby compensating the amplitude of the modulating signal in accordance with the ambient temperature.

Also, the amplitude compensating unit 12b may have a memory for storing data which have been obtained by sampling, at predetermined intervals, a plurality of modulating signals having respective amplitudes corresponding to different ambient temperatures. A predetermined modulating signal corresponding to a present ambient temperature is read from the memory at the predetermined time interval. Thus the read modulating signal is outputted as a modulating signal whose amplitude is compensated in accordance with the ambient temperature.

And further, the amplitude compensating unit 12b may have a signal processing unit which outputs, at predetermined intervals, a modulating signal having an amplitude value corresponding to the ambient temperature in the form of a digital value. Thus outputted digital value is used as a modulating signal whose amplitude is compensated in accordance with the ambient temperature.

As has been stated above, the above-mentioned radar apparatus for detecting a distance/velocity allows the amplitude compensating unit 12b to be implemented in various forms. Thus, a radar apparatus for detecting a distance/velocity which is most suited for an application can be provided.

Furthermore, the aforesaid amplitude compensating unit 12b may have a volume for adjusting the amplitude of the modulating signal. The volume is adjusted with a higher or lower temperature so that the frequency deviation of the modulated transmission signal becomes equal to the amplitude corresponding to the normal temperature.

Thus, in the amplitude compensating unit 12b, the volume is adjusted once at a predetermined higher or lower temperature so that the frequency deviation (modulation sensitivity) at the temperature becomes equal to that at the normal temperature. Since the frequency deviation is substantially proportional to a change in temperature, only a single adjustment renders the frequency deviation at every temperature equal to the frequency deviation at the normal temperature. Accordingly, the distance to and the relative velocity with respect to the object can be highly accurately measured at every temperature.

Also, the structure of the amplitude compensating unit 12b may be modified such that under the normal temperature condition, the amplitude of the modulating signal is adjusted at an arbitrary ambient temperature thereby to render the frequency deviation at any ambient temperature equal to the frequency deviation at the normal temperature.

Thus, in this amplitude compensating unit 12b, under the normal temperature condition, the DC voltage component of the modulating signal is rendered equal to the DC voltage component of the modulating signal at an arbitrary ambient temperature, and the amplitude of the modulating signal is adjusted with the volume so as to render the frequency deviation equal to that at the normal temperature. Thus, adjustment with the volume is possible under the normal temperature condition without using a thermostatic chamber. Accordingly, adjusting work can be simplified, and also the frequency deviation at every temperature can be rendered equal to the frequency deviation at the normal temperature only by a single adjusting operation. Hence, the distance to and the relative velocity with respect to the object can be highly accurately measured at every temperature.

Figure 6:
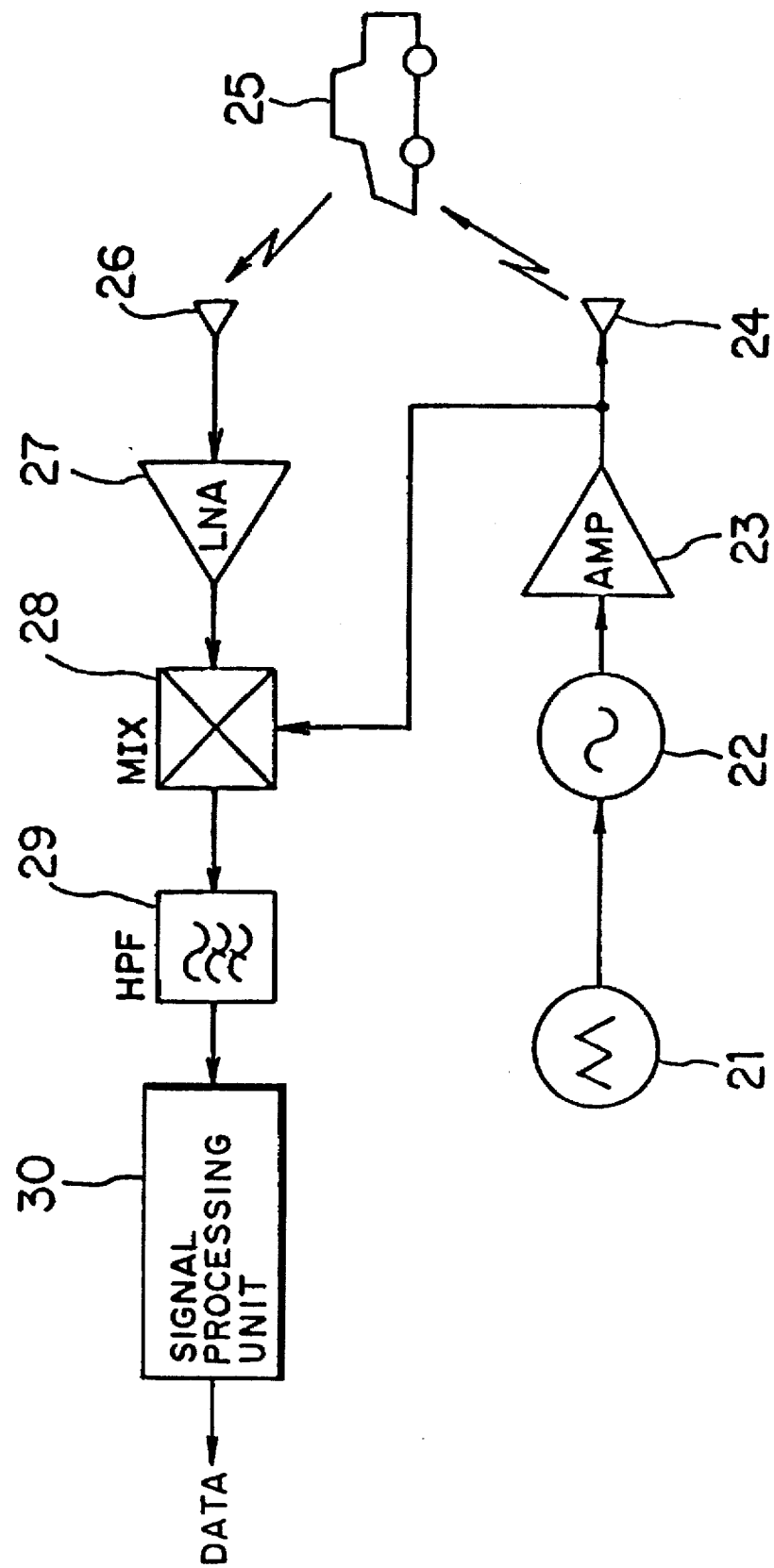
FIG. 6 is a block diagram showing the construction of an FM-CW radar apparatus (radar apparatus for detecting a distance/velocity) according to a first embodiment of the present invention.

(b) First embodiment of the present invention:

FIG. 6 is a block diagram showing the construction of an FM-CW radar apparatus (radar apparatus for detecting a distance/velocity) according to a first embodiment of the present invention. In the FM-CW radar apparatus shown in FIG. 6, a transmitting system has a triangular wave signal generator 21, a voltage controlled oscillator (VCO) 22, an amplifier (AMP) 23, and a transmitting antenna 24, and a receiving system has a receiving antenna 26, a low noise amplifier (LNA) 27, a mixer (MIX) 28, a high-pass filter (HPF), and a signal processing unit 30. Reference numeral 25 denotes a vehicle (object) a distance to/a velocity of which is to be detected.

Figure 45A:
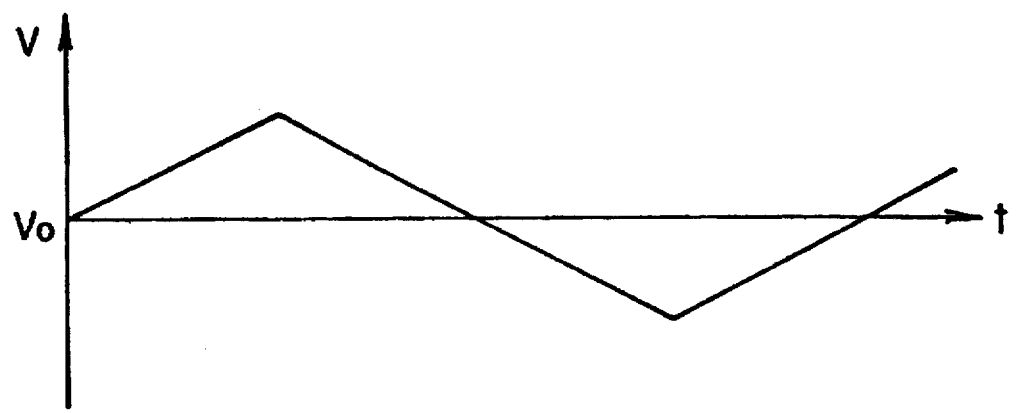
FIG. 45 (a) and FIG. 45 (b) are graphs exemplifying a triangular wave signal for use in the general FM-CW radar apparatus.
Figure 45B:
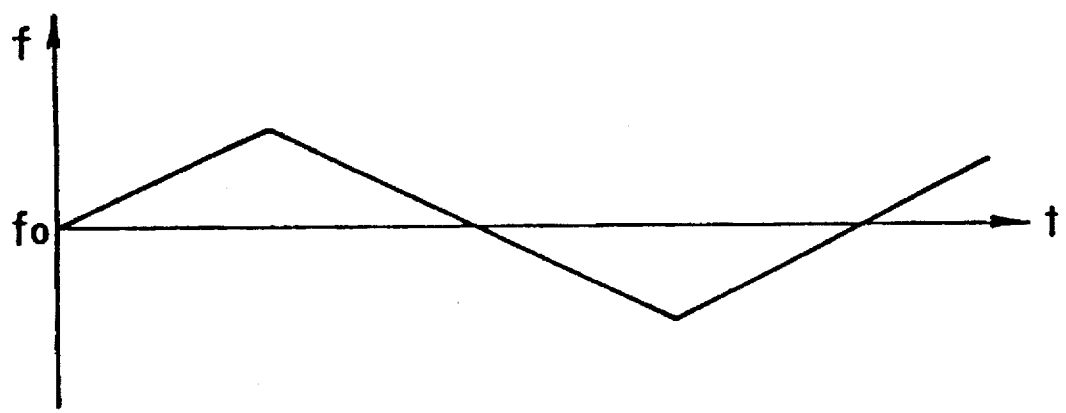
Figure 46:
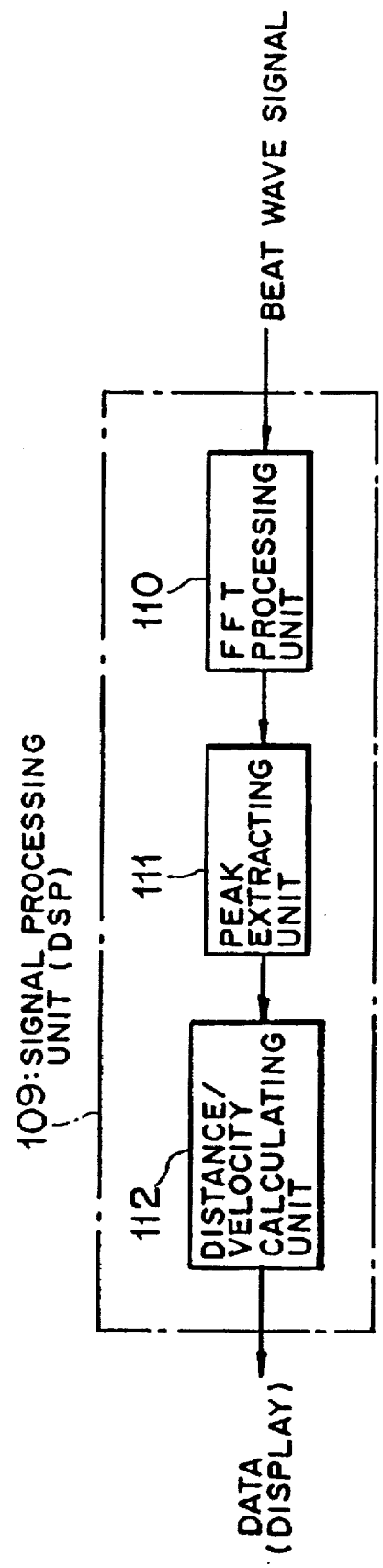
FIG. 46 is a block diagram showing the construction of a signal processing unit in the general FM-CW radar apparatus.
Figure 47A:
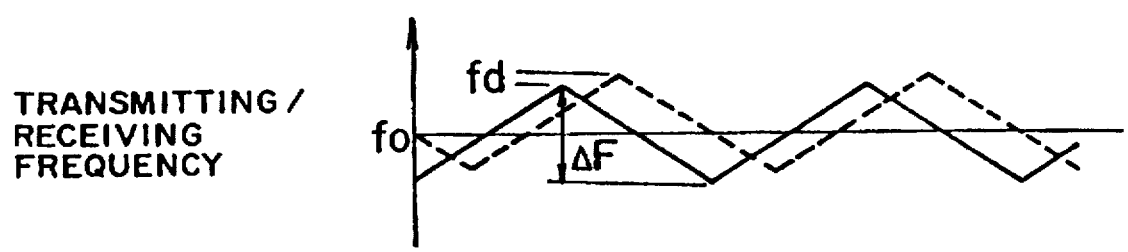
FIG. 47 (a) and FIG. 47 (b) are graphs for illustrating the principle of the general FM-CW radar apparatus.
Figure 47B:
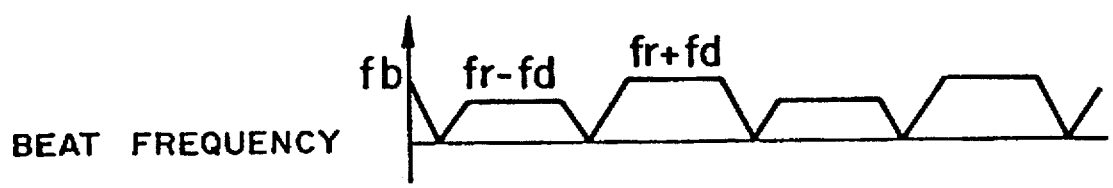
Figure 48:
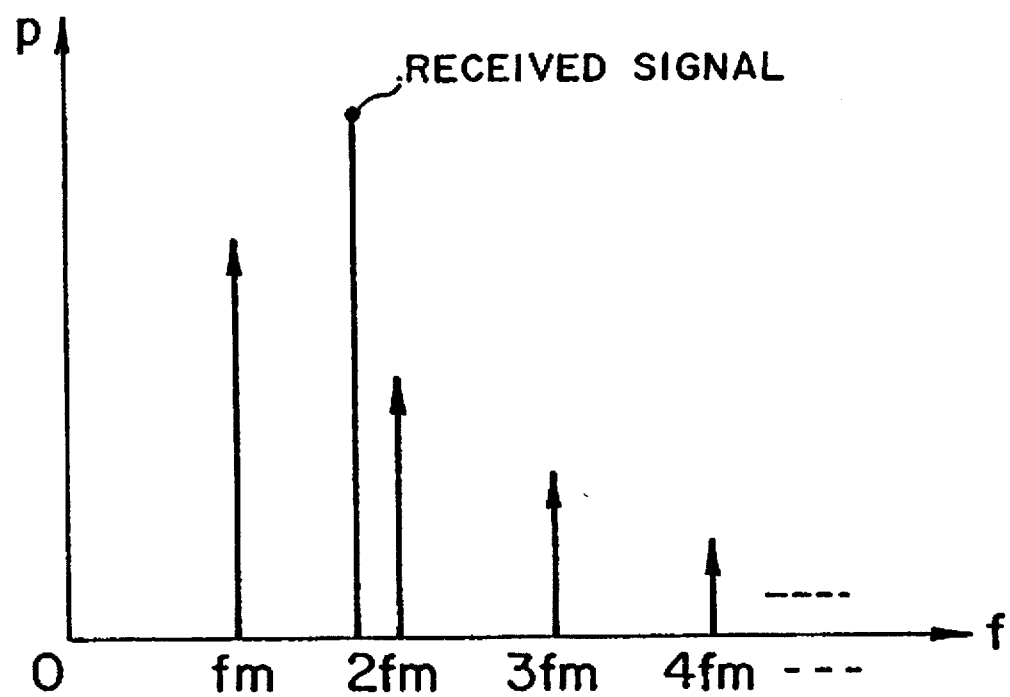
FIG. 48 is a graph for illustrating the operation of the general FM-CW radar apparatus.
Figure 49:
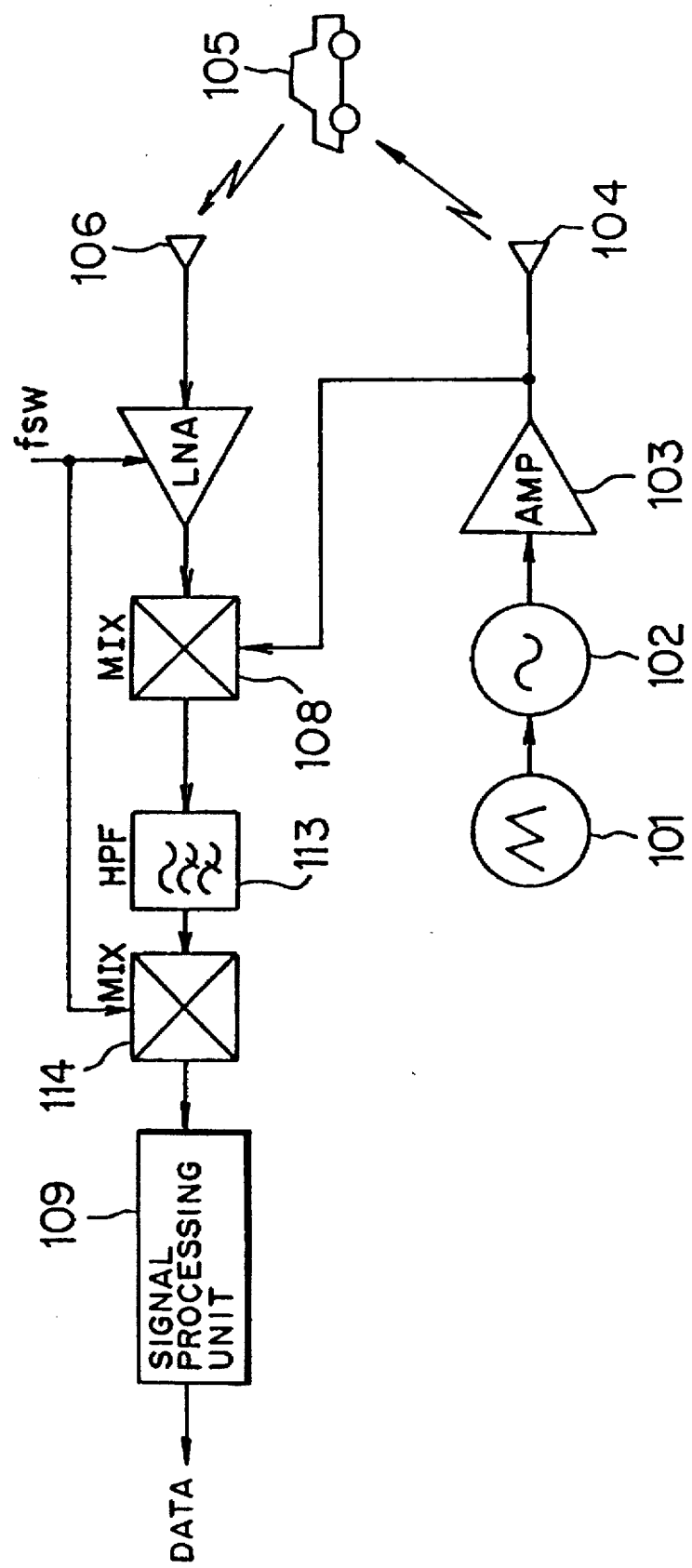
FIG. 49 is a block diagram showing another construction of the general FM-CW radar apparatus.
Figure 50A:
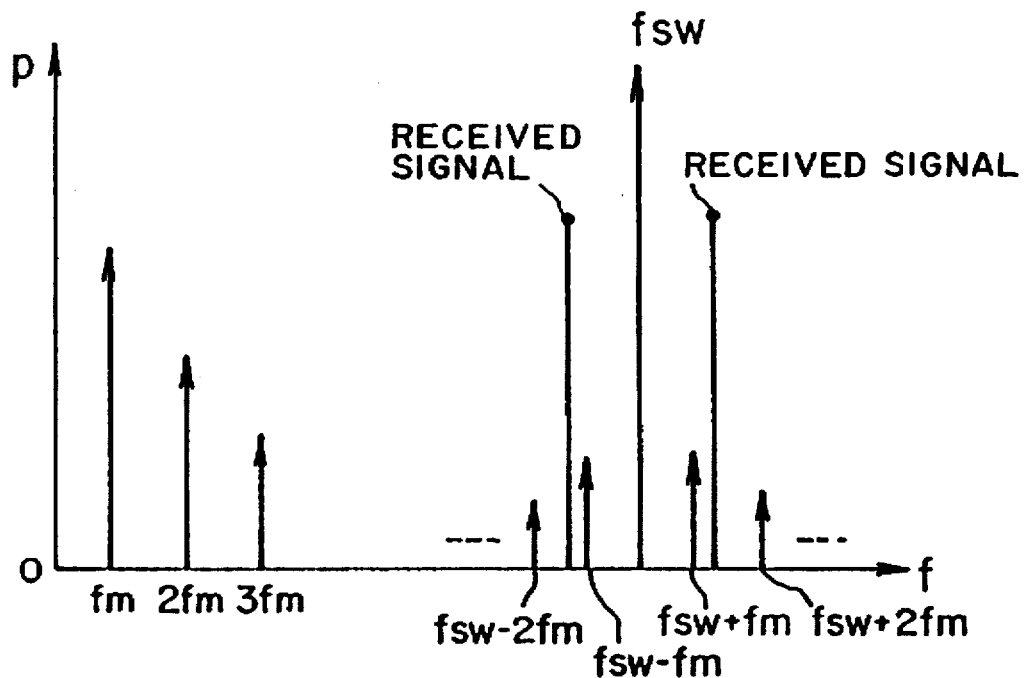
FIG. 50 (a) and FIG. 50 (b) are graphs for illustrating the operation of the general FM-CW radar apparatus.
Figure 50B:
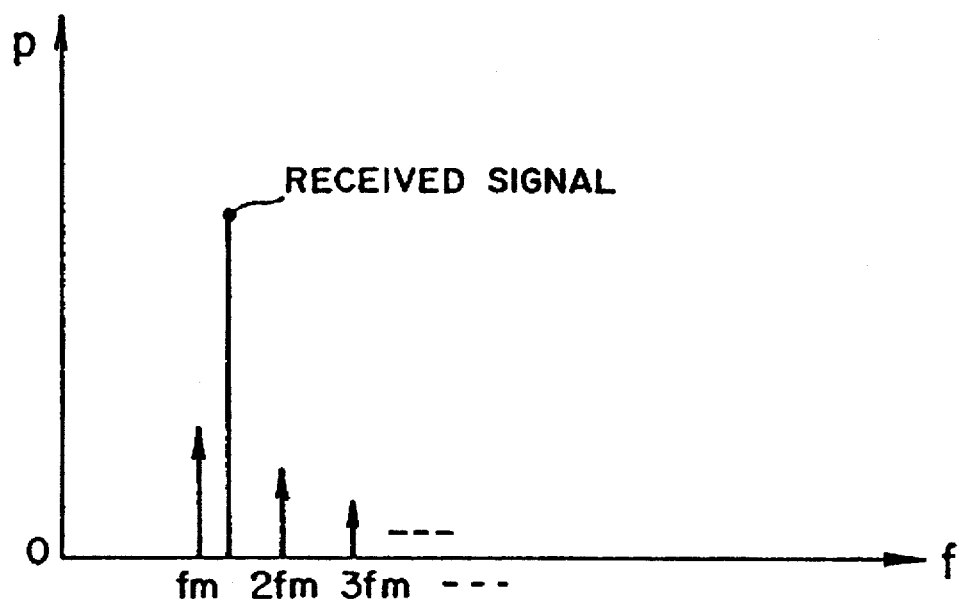
Figure 51:
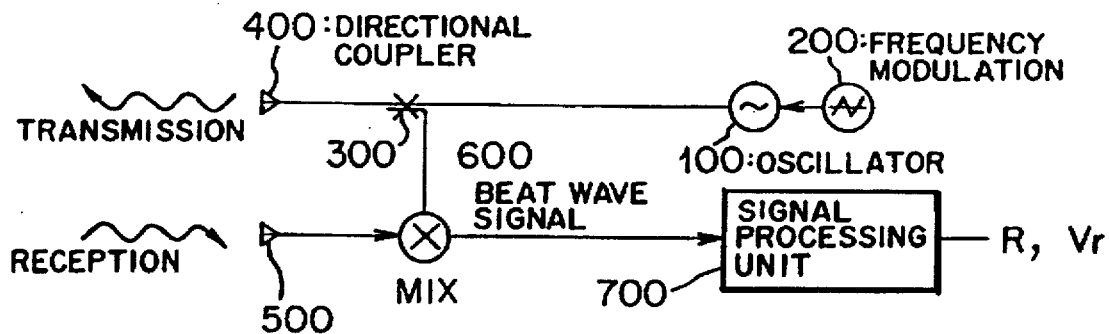
FIG. 51 is a block diagram showing a schematic construction of the general FM-CW radar apparatus.
Figure 52:
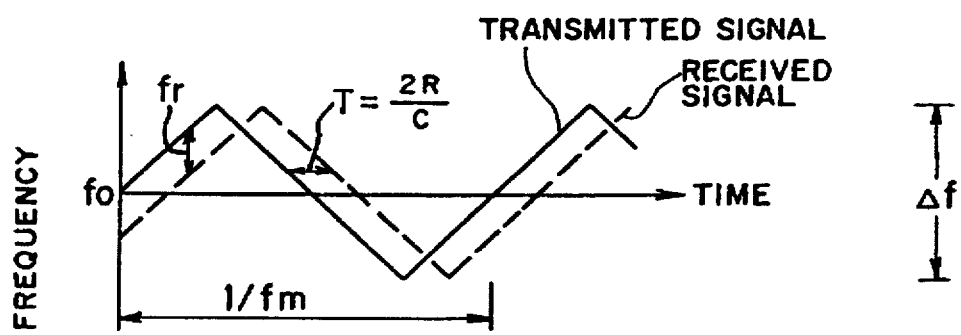
FIG. 52 is a graph for illustrating a change in frequency of a transmission/reception signal in the general FM-CW radar apparatus.
Figure 53:
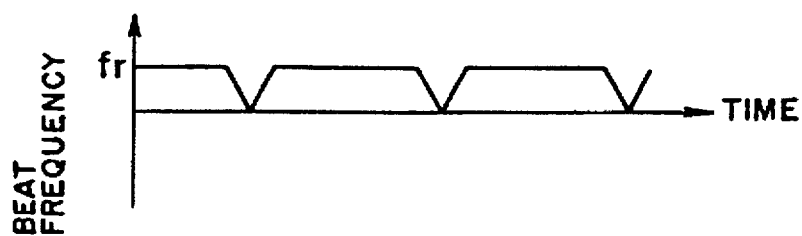
FIG. 53 is a graph exemplifying a beat frequency which is detected in the general FM-CW radar apparatus.
Figure 54:
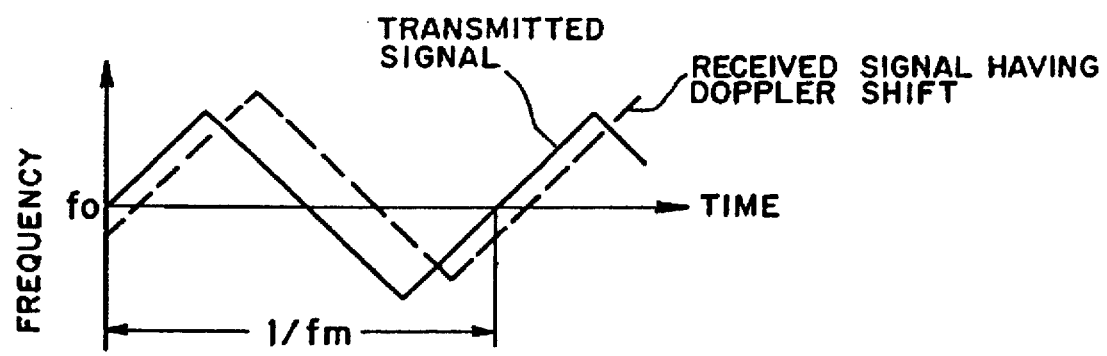
FIG. 54 is a graph for illustrating a change in frequency of a transmission/reception signal when there exists the relative velocity between the general FM-CW radar apparatus and an object.
Figure 55:
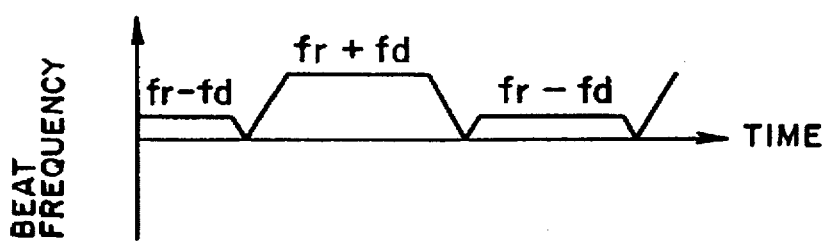
FIG. 55 is a graph exemplifying a beat frequency to be detected when the general FM-CW radar apparatus involves a relative velocity.
Figure 56:
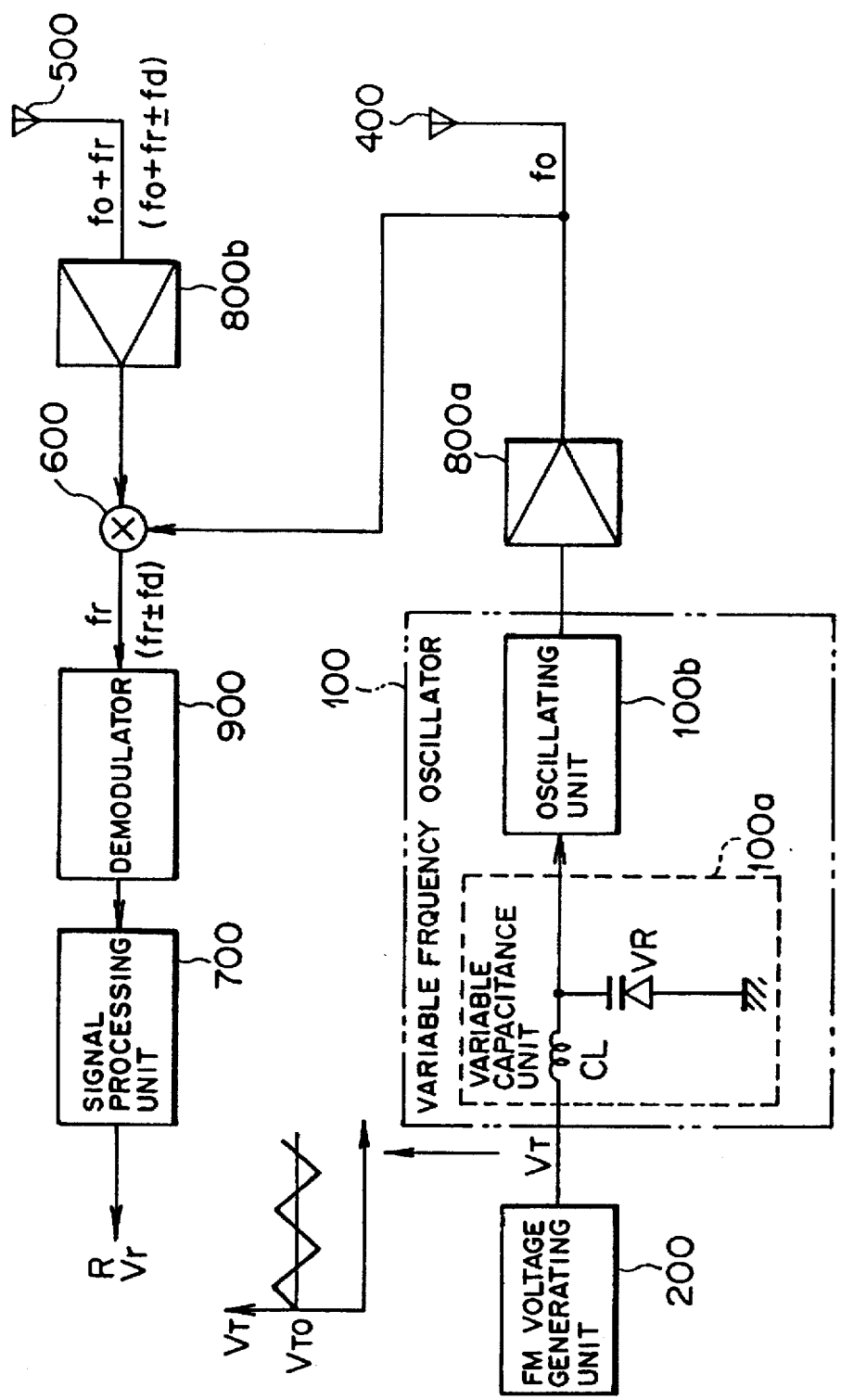
FIG. 56 is a block diagram showing a detailed construction of the general FM-CW radar apparatus.
Figure 57:
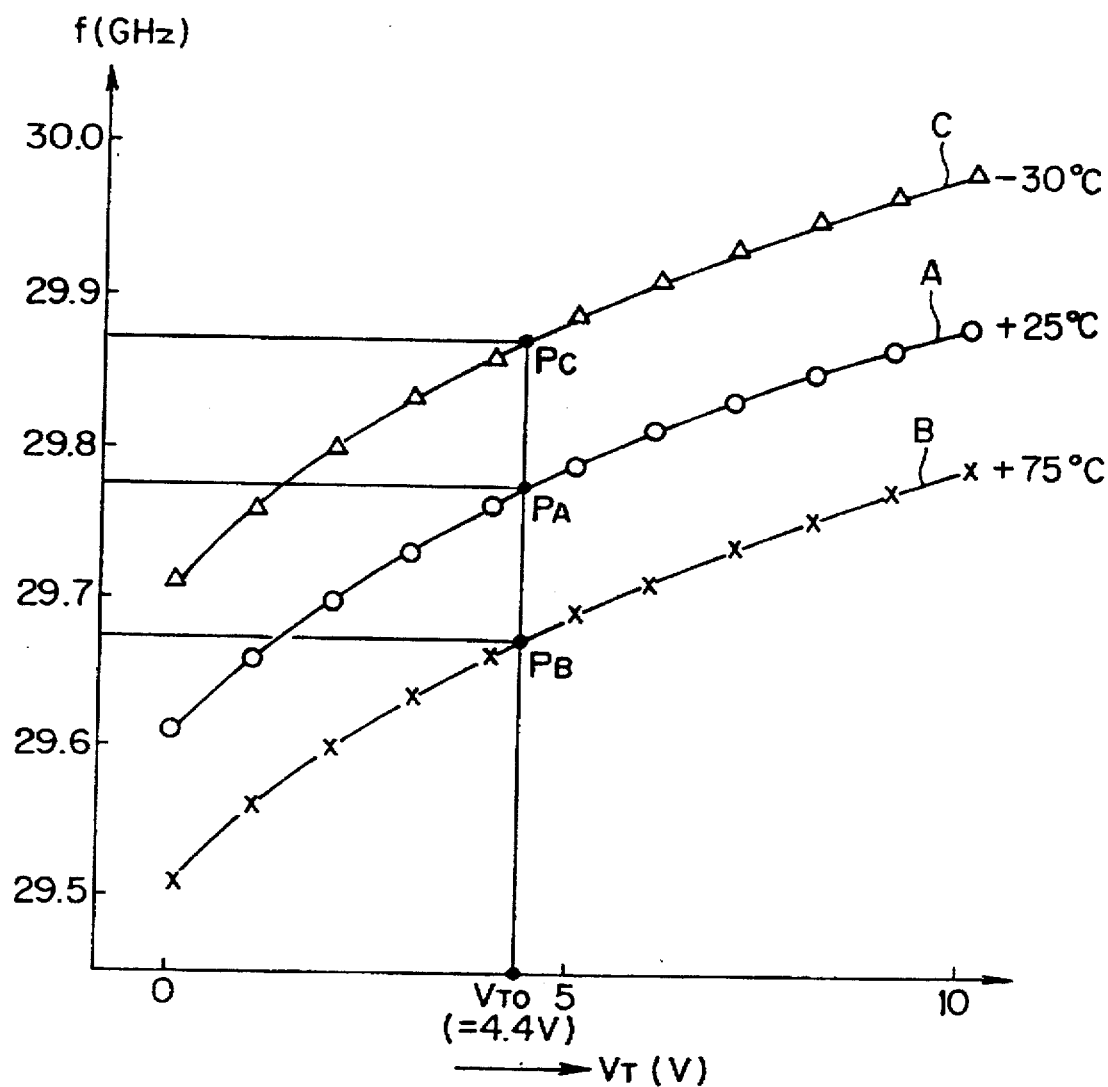
FIG. 57 is a graph exemplifying a $V_T$-f characteristic in the general FM-CW radar apparatus.
Figure 59:
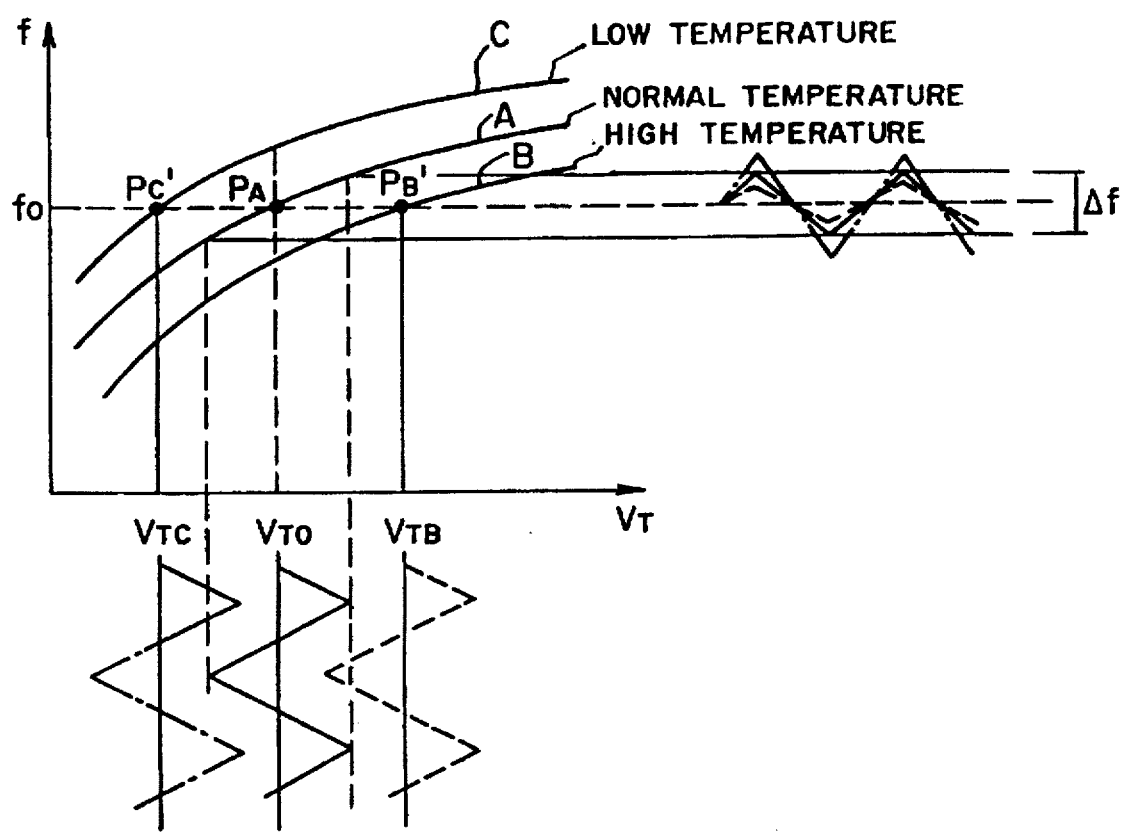
FIG. 59 is a graph exemplifying temperature compensation of the $V_T$-f characteristic in the general FM-CW radar apparatus.

In the transmitting system, the triangular wave signal generator 21 generates a triangular wave signal (modulating signal), for example the one shown in FIG. 45 (a), having a predetermined recurrence frequency fm for carrying out frequency modulation. The voltage controlled oscillator 22 generates a signal [center frequency $f_O$; see FIG. 45 (b)] which is frequency-modulated with the triangular wave signal outputted from the triangular wave signal generator 21, and thus the frequency-modulated signal is outputted therefrom as a modulated transmission signal.

The amplifier 23 amplifies the modulated transmission signal outputted from the voltage controlled oscillator 22. The transmitting antenna 24 transmits the modulated transmission signal outputted from the amplifier 23 to the space, particularly toward the vehicle 25.

On the other hand, in the receiving system, the receiving antenna 26 receives a reflected wave signal, i.e. the modulated transmission signal which has been transmitted from the transmitting antenna 24 in the transmitting system and reflected by the vehicle 25. The low noise amplifier 27 amplitude-modulates the reflected wave signal (hereinafter merely referred to as a received signal in some case) which has been received by the receiving antenna 26. The mixer 28 mixes the reflected wave signal from the low noise amplitude 27 with part of the modulated transmission signal from the voltage controlled oscillator 22 in the transmitting system, whereby a beat wave signal of the reflected wave signal and the modulated transmission signal is detected.

Figure 8A:
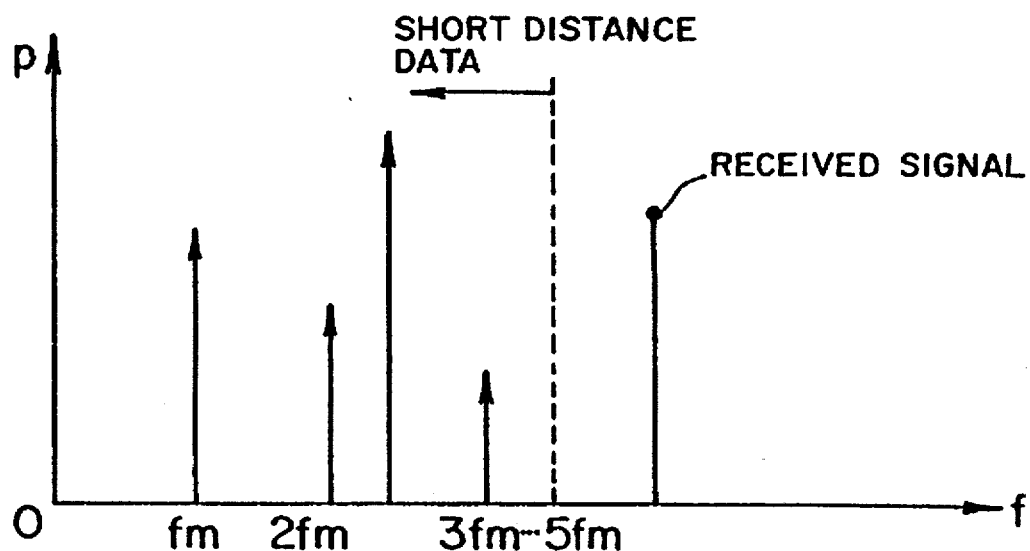
FIG. 8 (a) and FIG. 8 (b) are graphs for illustrating the operation of the FM-CW radar apparatus according to the first embodiment.
Figure 8B:
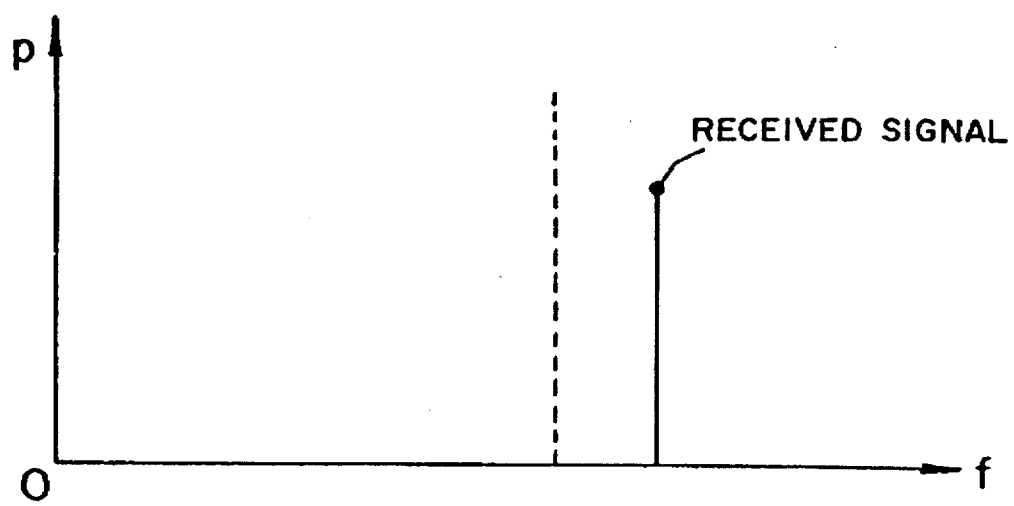

The high-pass filter 29 filters the beat wave signal detected by the mixer 28 so as to cut off some of the harmonic frequency components (modulation frequency components) fm, 2fm, 3fm, etc. which appear near the frequency of the received signal, for example, harmonic frequency components with frequencies that are equal to or lower than that of the fifth harmonic frequency component 5fm (harmonic frequency components fm to 5fm), as shown in FIG. 8 (a) and FIG. 8 (b). Usually, the information of the received signal which appears near harmonic frequency components fm to 5fm is short distance data in the case where a distance to the vehicle 25 is about 1 m.

The signal processing unit (distance/velocity calculating unit) 30 carries out an operational process like a fast Fourier transform on the beat wave signal from the high-pass filter 29 so as to calculate the frequency information which the beat wave signal possesses, namely the frequency information (the distance frequency fr) that is dependent on a distance to the vehicle 25 and the frequency information (the velocity frequency fd) that is dependent on the relative velocity. The signal processing unit 30 thereafter calculates a distance to the vehicle 25 and the relative velocity between the vehicle 25 and an observer based on the calculated frequency information.

To carry out the operational process described above, as shown in FIG. 7, the signal processing unit 30 has an FFT processing unit 311 for carrying out a fast Fourier transform on the input data (beat wave signal which has been passed through the high-pass filter 29), a peak extracting unit 312 for obtaining the distance frequency fr and the velocity frequency fd based on the result of operational process at the FFT processing unit 311, and a distance/velocity calculating unit 313 for calculating the distance and relative velocity based on the distance frequency fr and the velocity frequency fd which were obtained at the peak extracting unit 312.

In the FM-CW radar apparatus according to the first embodiment of the present invention, a signal which is frequency-modulated with a triangular wave signal having a recurrence frequency fm from the triangular wave signal generator 21 is outputted from the voltage controlled oscillator 22 and then amplified to a predetermined signal level at the amplifier 23. The thus amplified signal is outputted from the transmitting antenna 24 as a modulated transmission signal. The modulated transmission signal is reflected by the vehicle 25 and then is received by the receiving antenna 26 in the form of a reflected wave signal.

The reflected wave signal and part of the modulated transmission signal from the voltage controlled oscillator 22 in the transmitting system are mixed by the mixer 28, whereby a beat wave signal of the reflected wave signal and the modulated transmission signal is detected. The high-pass filter 29 filters the beat wave signal so as to cut off some of the harmonic frequency components fm, 2fm, 3fm, etc. which appear near a frequency of the received signal, namely the harmonic frequency components with the frequencies that are equal to or lower than that of the fifth harmonic frequency component (harmonic frequency components fm to 5fm), as shown in FIG. 8 (a) and FIG. 8 (b).

Thus, in the signal processing unit 30, the FFT processing unit 311 carries out a fast Fourier transform, and the peak extracting unit 312 extracts the distance frequency fr and the velocity frequency fd, based on only frequency information of the received signal in the beat wave signal which has been passed through the high-pass filter 29 so as to cut off the harmonic frequency components fm to 5fm which otherwise emerge near the frequency component of the received signal and make it difficult to extract the frequency information of the received signal.

The distance/velocity calculating unit 313 carries out an operational process on the thus obtained the distance frequency fr and the velocity frequency fd in accordance with the aforesaid Eq. (6) and Eq. (7), thereby obtaining a distance to the vehicle 25 and the relative velocity between the vehicle 25 and an observer.

As described above, in the FM-CW radar apparatus (radar apparatus for detecting a distance/velocity) according to the first embodiment of the present invention, modulation frequency components the frequencies of which are not greater than that of the fifth modulation frequency component (the orders of which are not greater than a predetermined order) (harmonic frequency components fm to 5fm) appearing near a frequency of the received signal (reflected wave signal) can be cut off in a simple structure, which is implemented only by providing the high-pass filter 29, before the distance to and the relative velocity with respect to the vehicle (object) 25 are calculated. Thus, the receiving S/N ratio of the radar apparatus can be greatly improved, whereby the distance to and the relative velocity with respect to the vehicle 25 can be detected with a high accuracy even when the radar apparatus is in a poor condition of receiving the reflected wave signal from the vehicle 25.

Also, even with a small transmitting power for the modulated transmission signal, the aforesaid distance/velocity can be detected with a high accuracy. Accordingly, the distance to and the relative velocity with respect to a more distant object can be detected with the same transmitting power.

Figure 9:
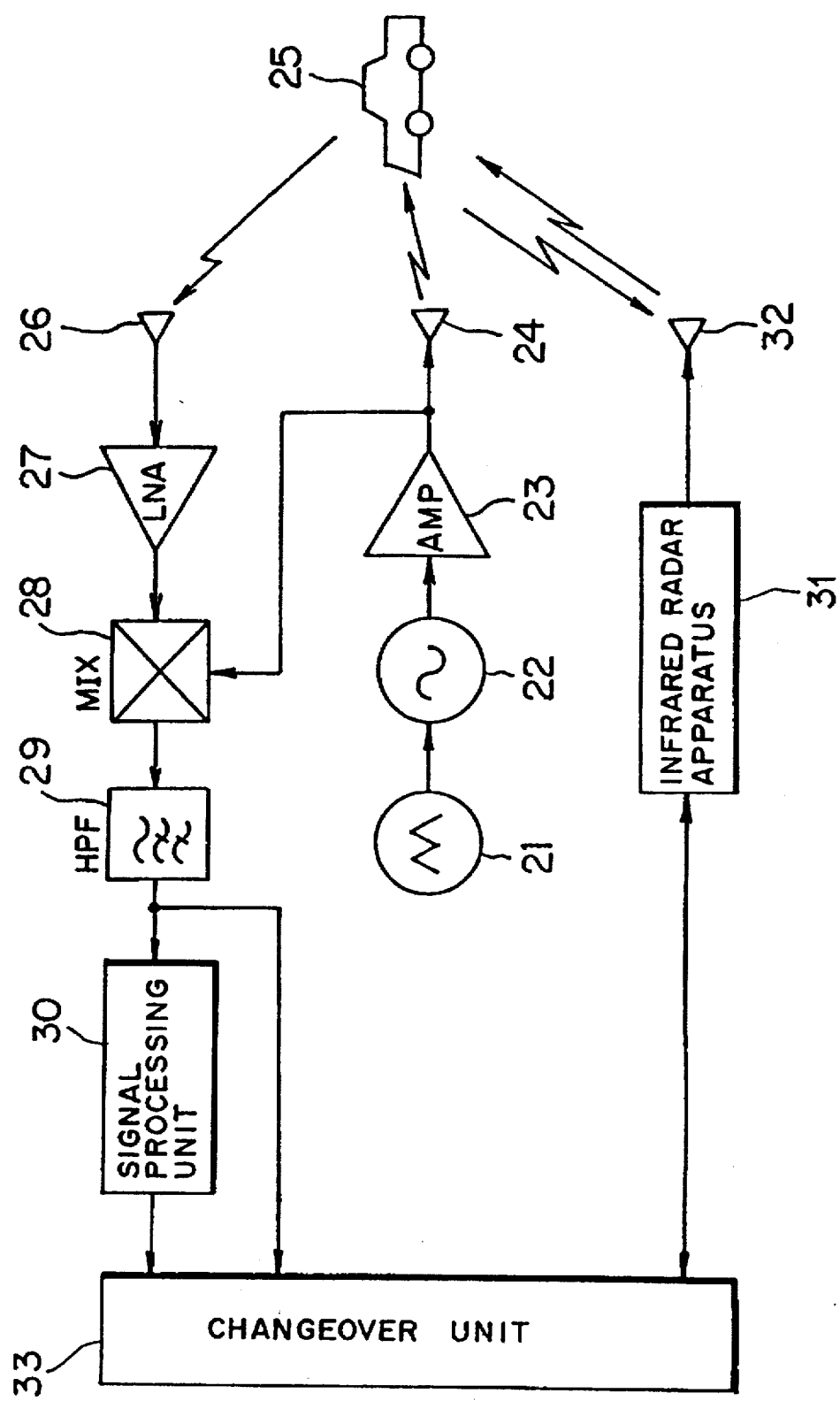
FIG. 9 is a block diagram showing the construction of a radar apparatus for detecting a distance/velocity according to a second embodiment of the present invention.

(c) Second embodiment of the present invention:

FIG. 9 is a block diagram showing the construction of a radar apparatus for detecting a distance/velocity according to a second embodiment of the present invention. The radar apparatus shown in FIG. 9 is composed of an FM-CW radar apparatus and an infrared radar apparatus 31 for short distance which is different in type from the FM-CW radar apparatus. In the FM-CW radar apparatus, as in the apparatus which was described earlier with reference to FIG. 6, a transmitting system has a triangular wave signal generator 21, a voltage controlled oscillator (VCO) 22, an amplifier (AMP) 23, and a transmitting antenna 24, and a receiving system has a receiving antenna 26, a low noise amplifier (LNA) 27, a mixer (MIX) 28, a high-pass filter (HPF), and a signal processing unit (distance/velocity calculating unit) 30.

In the thus constructed radar apparatus of FIG. 9, in the signal processing unit 30 of the FM-CW radar apparatus, the FFT processing unit 311 carries out a fast Fourier transform, the peak extracting unit 312 extracts the distance frequency fr and the velocity frequency fd, and the distance/velocity calculating unit 313 carries out an operational process, based on the frequency information of the received signal in the beat wave signal which has been passed through the high-pass filter 29 so as to cut off harmonic frequency components fm to 5fm [see FIG. 8 (a) and FIG. 8 (b)] which otherwise emerge near a frequency component of the reflected wave signal (received signal) from the vehicle 25 and make it difficult to extract the frequency information of the received signal, whereby the distance to the vehicle 25 and the relative velocity between the vehicle 25 and an observer can be calculated.

In this case, when the harmonic frequency components fm to 5fm are cut off at the high-pass filter 29 and when the distance between the vehicle 25 and the observer is short, the frequency information of the received signal is also cut off. As a result, the short distance data is lost.

Thus, as shown in FIG. 9, the present embodiment is provided with the infrared radar apparatus 31 which is different in type from the FM-CW radar apparatus. For a range (short distance) incapable of measuring the distance to/the relative velocity with respect to the vehicle 25 by the FM-CW radar apparatus due to loss of frequency information of the reflected wave signal in the beat wave signal, a changeover unit 33 is switched to the infrared radar apparatus 31 in order to obtain the distance to/the relative velocity with respect to the vehicle 25.

As described above, in the radar apparatus for detecting a distance/velocity according to the second embodiment of the present invention, loss of short distance data can be easily complemented in a simple structure which is implemented by adding the infrared radar apparatus 31 for short distance to the FM-CW radar apparatus of FIG. 6. Accordingly, a required range of detection of a distance/relative velocity can be easily obtained.

The radar apparatus for detecting a distance/velocity according to the present embodiment uses the infrared radar apparatus 31 as a radar apparatus for short distance. The present invention, however, is not to be limited to this form. Other types of radar apparatus for short distances may be used which are different in type from the FM-CW radar apparatus.

Figure 10:
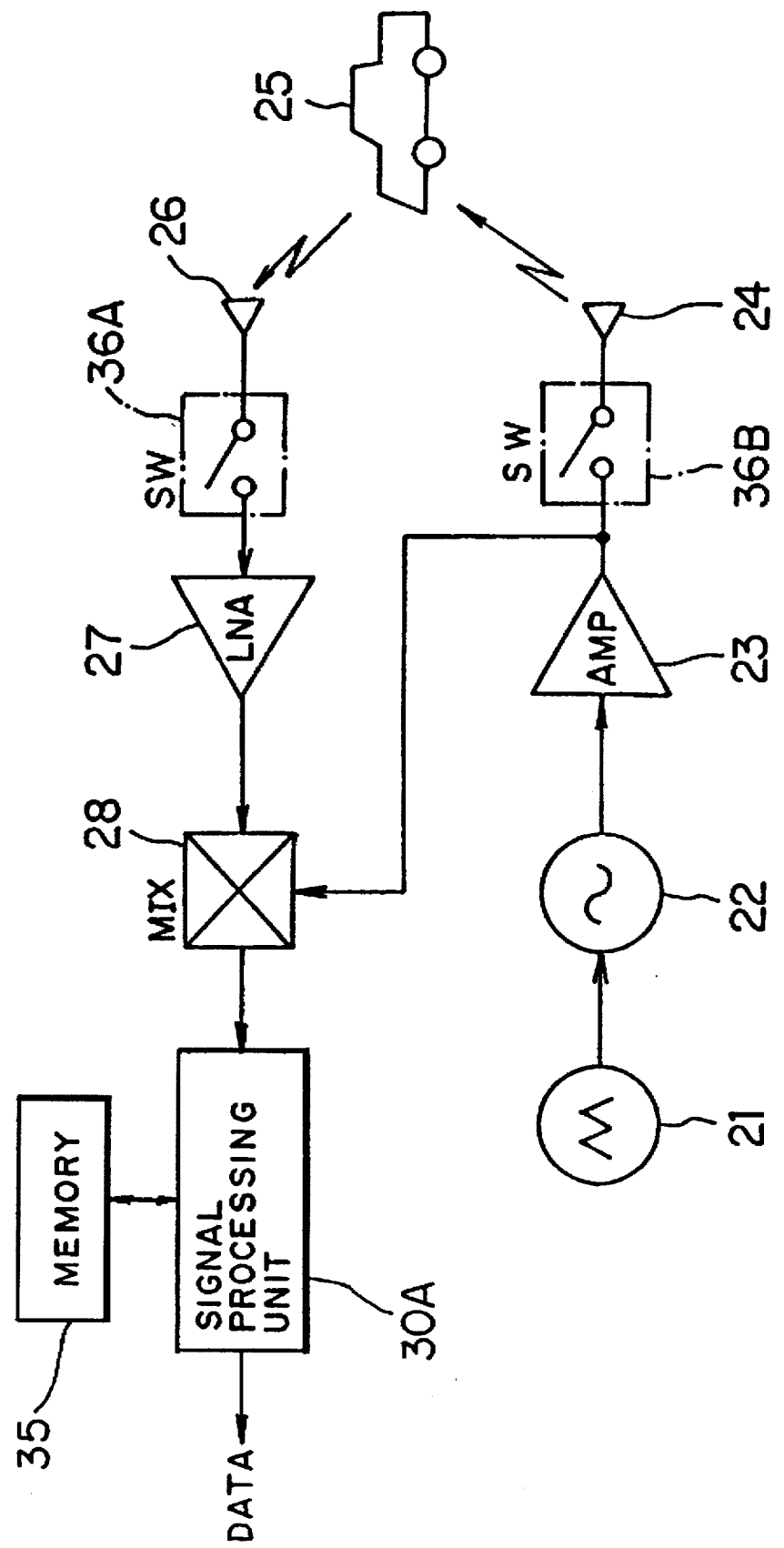
FIG. 10 is a block diagram showing the construction of an FM-CW radar apparatus (radar apparatus for detecting a distance/velocity) according to a third embodiment of the present invention.

(d) Third embodiment of the present invention:

FIG. 10 is a block diagram showing the construction of an FM-CW radar apparatus (radar apparatus for detecting a distance/velocity) according to a third embodiment of the present invention. In the FM-CW radar apparatus shown in FIG. 10, as in the first embodiment, a transmitting system has a triangular wave signal generator 21, a voltage controlled oscillator 22, an amplifier (AMP) 23, and a transmitting antenna 24, and a receiving system has a receiving antenna 26, a low noise amplifier (LNA) 27, and a mixer (MIX) 28.

In addition to the above construction, the FM-CW radar apparatus according to the present embodiment has a signal processing unit 30A and a memory 35, and the transmitting and receiving systems are provided with switches (FSW) 36B and 36A, respectively.

The memory (storage unit) 35 stores modulation frequency components of the modulated transmission signal (frequency fm) which appear in the beat wave signal outputted from the mixer 28 and which are received by the signal processing unit 30A, described later, in the state of not receiving the reflected wave signal from the vehicle 25. That is, the memory 35 is adapted to store the aforesaid harmonic frequency components (FM/AM conversion noise information) fm, 2fm, 3fm, etc. The switches (transmission/reception signal cutoff unit) 36A and 36B are brought into on and off states so as to start and stop the transmission/reception of signals to/from the outside.

Also, in the present embodiment, the signal processing unit 30A carries out an operational process like a fast Fourier transform based on the frequency information in the beat wave signal which is detected in the receiving system, thereby obtaining the distance to the vehicle (object) 25 and the relative velocity between the vehicle 25 and an observer. The signal processing unit 30A is adapted to store only the FM/AM conversion noise information appearing in the beat wave signal in the memory 35 when at least the switch 36A is off (in the state that the reflected wave signal from the vehicle 25 is not received) and to calculate the distance to/the relative velocity with respect to the vehicle 25 after subtracting the FM/AM conversion noise information fm, 2fm, 3fm, etc. Shored in the memory 35 from the frequency information in the beat wave signal when the switches 36A, 36B are on.

Figure 7:
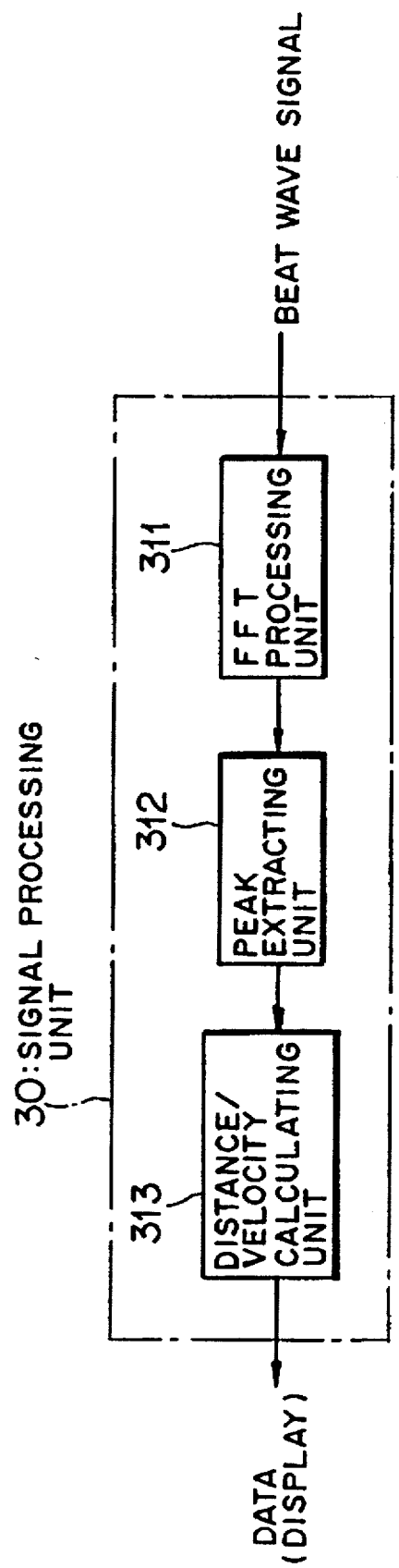
FIG. 7 is a block diagram showing the construction of a signal processing unit in the FM-CW radar apparatus according to the first embodiment.
Figure 11:
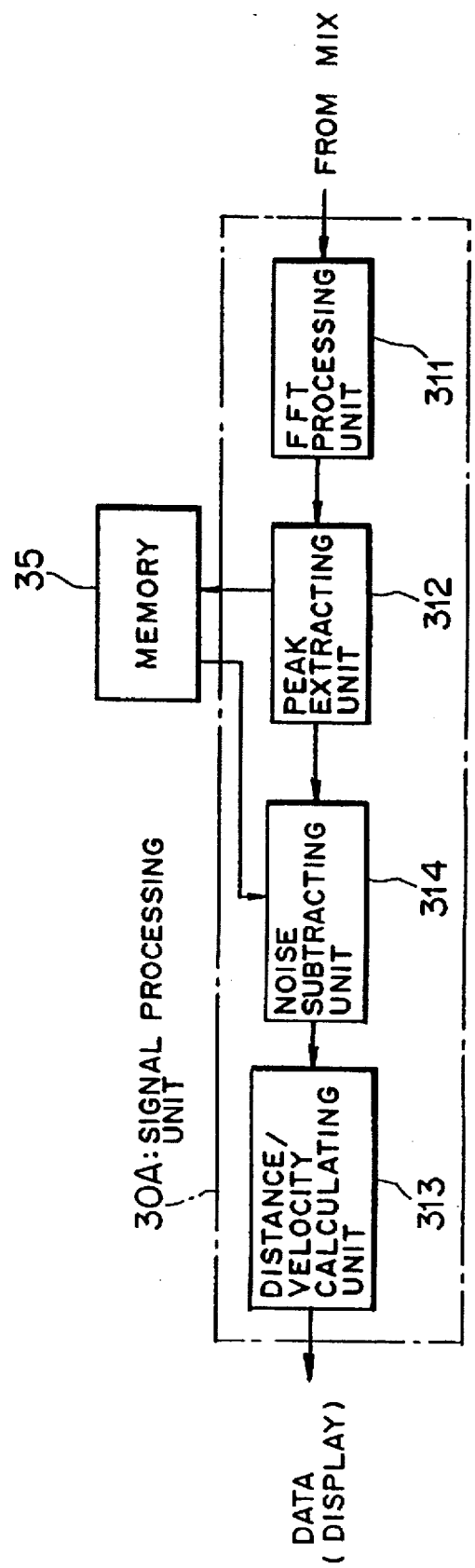
FIG. 11 is a block diagram showing the construction of a signal processing unit in the FM-CW radar apparatus according to the third embodiment.

Thus, as shown in FIG. 11, the signal processing unit 30A has a noise subtracting unit 314 in addition to an FFT processing unit 311, a peak extracting unit 312, and a distance/velocity calculating unit 313, as of the first embodiment shown in FIG. 7. When the switch 36A in the receiving system is off, the FM/AM conversion noise information fm, 2fm, 3fm, etc. which is detected at the peak extracting unit 312 is stored in the memory 35. When the switches 36A, 36B are on, the stored FM/AM conversion noise information fm, 2fm, 3fm, etc. is read from the memory 35 and is inputted to the noise subtracting unit 314.

When the switches 36A, 36B are on, the noise subtracting unit 314 reads out the previously stored FM/AM conversion noise information from the memory 35 and subtracts the read FM/AM conversion noise information from the frequency information in the beat wave signal which has undergone a fast Fourier transform at the FFT processing unit 311, thereby removing the FM/AM conversion noise information fm, 2fm, 3fm, etc. which otherwise appears near the frequency of the received signal in the beat wave signal.

In the thus constructed FM-CW radar apparatus according to the present embodiment, first, at least the switch 36A in the receiving system is turned off to establish the state of not receiving the reflected wave signal from the vehicle 25. In this case, the mixer 28 outputs to the signal processing unit 30A the beat wave signal which only includes the FM/AM conversion noise information fm, 2fm, 3fm, etc. derived from the modulated transmission signal (frequency fm) outputted from the voltage controlled oscillator 22.

Then, in the signal processing unit 30A, the beat wave signal undergoes a fast Fourier transform at the FFT processing unit 311, and the resultant data is written to the memory 35.

After that, when the switches 36A, 36B are turned on, the receiving antenna 36A receives the reflected wave signal which is the modulated transmission signal transmitted from the transmitting antenna 24 and reflected by the vehicle 25. The received signal is outputted to the mixer 28 via the low noise amplifier 27.

The reflected wave signal is mixed by the mixer 28 with part of the modulated transmission signal outputted from the voltage controlled oscillator 22, whereby the beat wave signal including the frequency information (the distance frequency fr and the velocity frequency fd) dependent on the distance to and the relative velocity with respect to the vehicle 25 is obtained. The thus obtained beat wave signal is outputted to the signal processing unit 30A.

In the signal processing unit 30A, the beat wave signal is processed at the FFT processing unit 311 and the peak extracting unit 312. Also in this case, as represented by a solid line in FIG. 12 (a), the FM/AM conversion noise information fm, 2fm, 3fm, etc. derived from being mixed with part of the modulated transmission signal at the mixer 28 appears near frequencies of the received signal (reflected wave signal).

Figure 12A:
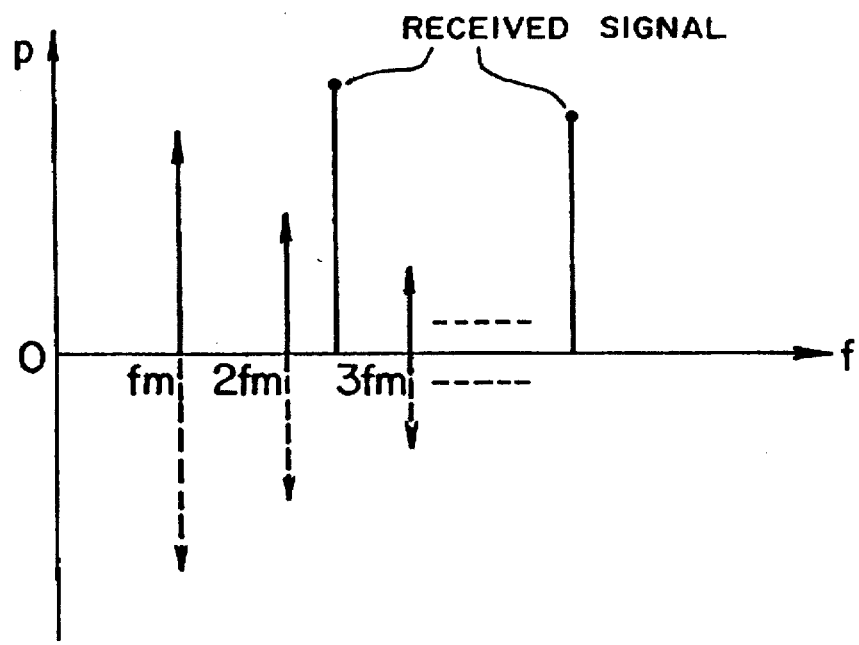
FIG. 12 (a) and FIG. 12 (b) are graphs for illustrating the operation of the FM-CM radar apparatus according to the third embodiment.
Figure 12B:
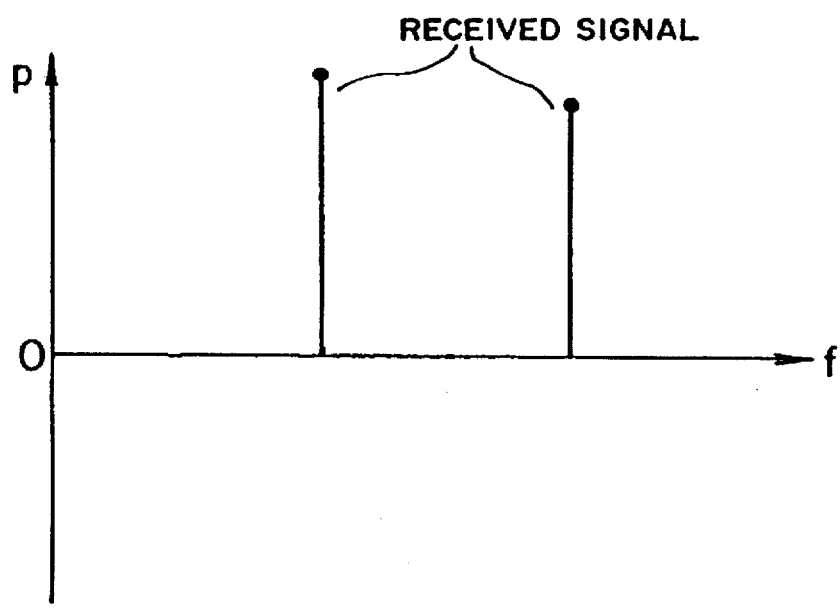

To manage this problem, the noise subtracting unit 314 reads from the memory 35 the FM/AM conversion noise information fm, 2fm, 3fm, etc. which was previously stored therein with the switch 36A in the off state, thereby vectorially subtracting the FM/AM conversion noise information fm, 2fm, 3fm, etc. appearing near the frequency of the received signal, as represented by a dashed line in FIG. 12 (a). As a result, as shown in FIG. 12 (b), the FM/AM conversion noise information fm, 2fm, 3fm, etc. is removed from the beat wave signal.

Then, as described earlier in the unit of the first embodiment, the distance/velocity calculating unit 313 calculates the distance to and the relative velocity with respect to the vehicle 25 based on the distance frequency fr and the velocity frequency fd in the beat wave signal which have been obtained through the peak extracting unit 312.

As described above, in the FM-CW radar apparatus (radar apparatus for detecting a distance/velocity) according to the third embodiment of the present invention, the FM/AM conversion noise information fm, 2fm, 3fm, etc. which is outputted from the mixer 28 in the state of not receiving the reflected wave signal from the vehicle (object) 25 was previously stored in the memory (storing unit) 35, and the thus stored FM/AM conversion noise information fm, 2fm, 3fm, etc. is used for subtracting the FM/AM conversion noise information fm, 2fm, 3fm, etc. in the beat wave signal which has been detected in the receiving system. Accordingly, the distance to and the relative velocity with respect to the vehicle 25 can be obtained based on the frequency information which does not include the FM/AM conversion noise information. Thus, the receiving S/N ratio of the apparatus can be greatly the distance can be reliably detected with a small power and a high accuracy and can be easily detected even when the apparatus is in a poor receiving state.

Figure 13:
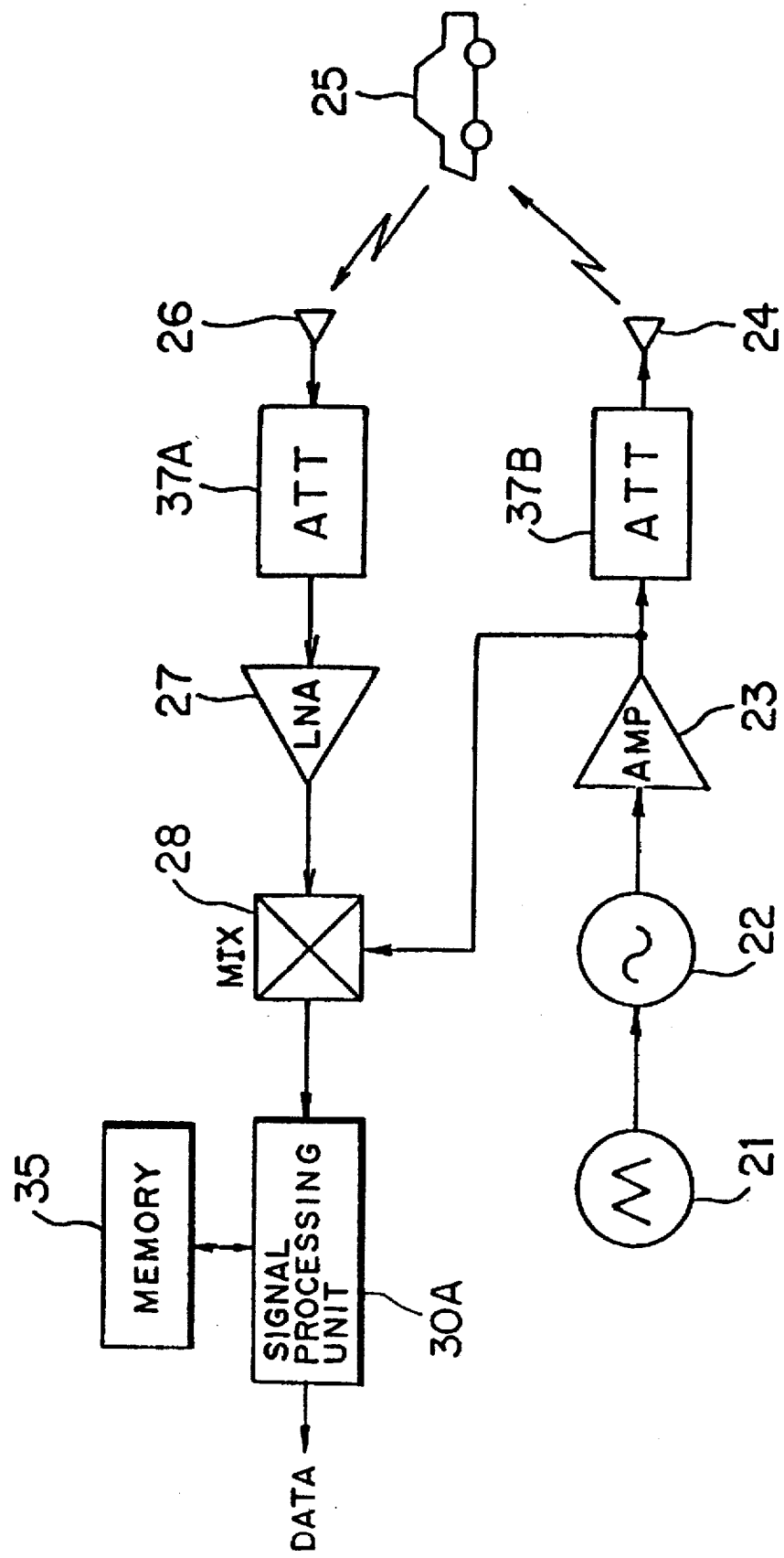
FIG. 13 is a block diagram showing the construction of an FM-CW radar apparatus according to a first modification of the third embodiment.

(d-1) First modification of the third embodiment of the present invention:

FIG. 13 is a block diagram showing the construction of an FM-CW radar apparatus (radar apparatus for detecting a distance/velocity) according to a first modification of the third embodiment of the present invention. The apparatus shown in FIG. 13 uses variable attenuators (ATT) 37A and 37B in place of the switches 36A and 36B, respectively, in the apparatus shown in FIG. 10.

The variable attenuators (transmission/reception signal cutoff unit) 37A, 37B are brought into a signal attenuating state in order to stop the transmission/reception of signals to/from the outside, as in the case of using the switches 36A, 36B. Component elements other than the variable attenuators 37A, 37B are the same as those which were described earlier with reference to FIG. 10.

In thus constructed FM-CW radar apparatus according to the present modification, at least the variable attenuator 37A in the receiving system is brought into a signal attenuating state by adjusting the degree of attenuation to establish a state in which the reflected wave signal from the vehicle 25 is not received. After that, the FM/AM conversion noise information fm, 2fm, 3fm, etc. derived from the modulated transmission signal (frequency fm) outputted from the voltage controlled oscillator 22 is stored in the memory 35. When the variable attenuators 37A, 37B are brought into a signal unattenuating state, the signal processing unit 30A can calculate the distance to and the relative velocity with respect to the vehicle 25 considering the FM/AM conversion noise information fm, 2fm, 3fm, etc. in the beat wave signal which has been detected in the receiving system.

Accordingly, the FM-CW radar apparatus according to the present modification can provide the same effect or advantage as the apparatus shown in FIG. 10.

Figure 14:
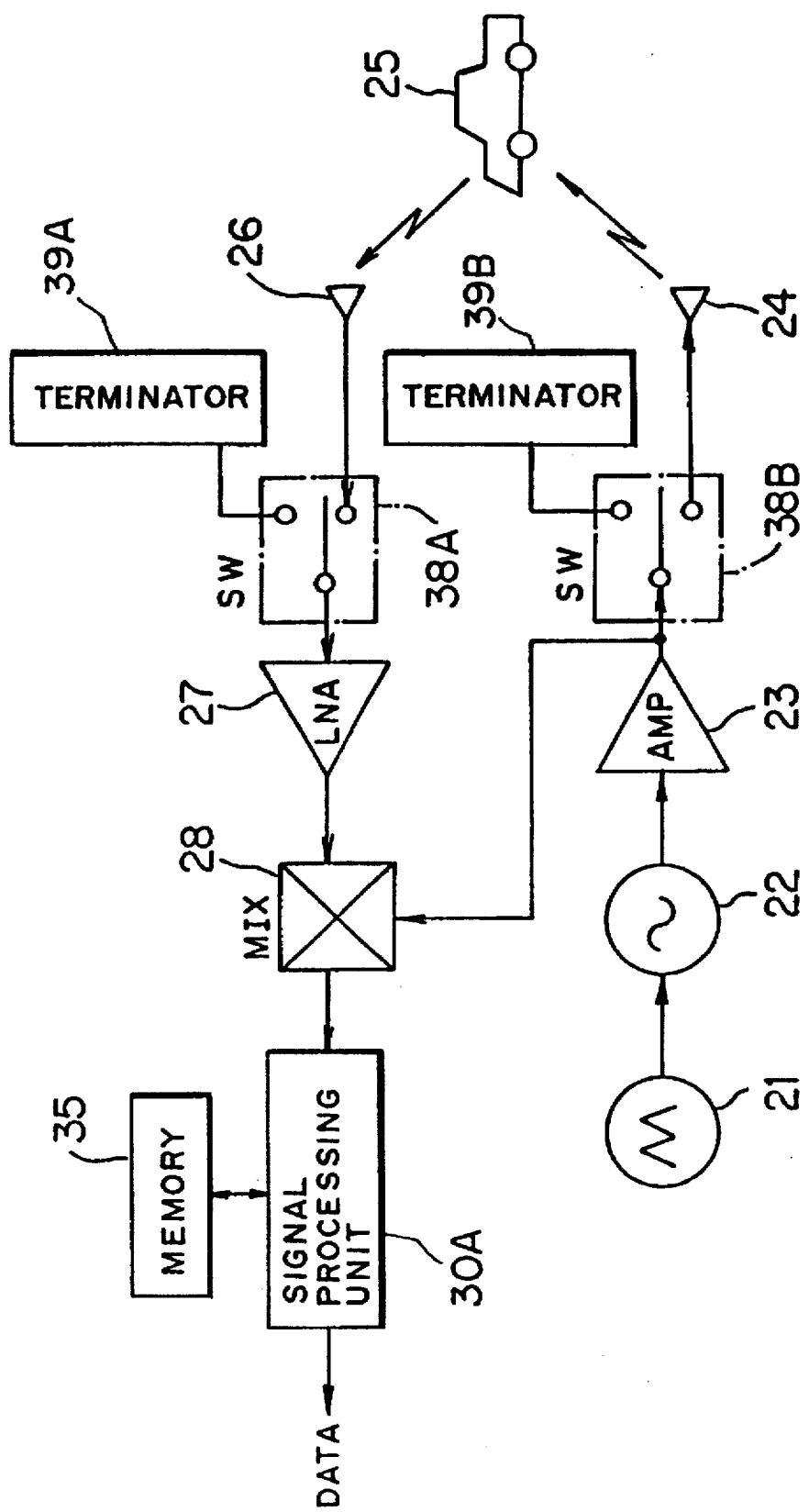
FIG. 14 is a block diagram showing the construction of an FM-CW radar apparatus according to a second modification of the third embodiment.

(d-2) Second modification of the third embodiment of the present invention:

FIG. 14 is a block diagram showing the construction of an FM-CW radar apparatus according to a second modification of the third embodiment of the present invention. In place of the switches 36A and 36B used in the apparatus shown in FIG. 10, the apparatus shown in FIG. 14 uses changeover switches 38A and 38B in the receiving and transmitting systems, respectively, so as to establish a connection with the antennas 24, 26 or terminators 39A, 39B. Also in the present modification, component elements other than the changeover switches 38A, 38B and the terminators 39A, 39B are the same as those which were described earlier with reference to FIG. 10.

The changeover switches 38A and 38B are switched to the side of the terminators 39A and 39B, respectively, in order to stop the transmission/reception of signals to/from the outside, as in the case of using the switches 36A, 36B. When the changeover switches 38A, 38B establish connection with the terminators 39A, 39B, the terminators 39A, 39B establish an impedance match for the circuit, whereby the reflection of a signal is suppressed for stable circuit operation.

In the thus constructed FM-CW radar apparatus according to the present modification, at least the changeover switch 38A in the receiving system is switched to the terminator 39A to establish a state in which the reflected wave signal from the vehicle 25 is not received. After that, only the FM/AM conversion noise information fm, 2fm, 3fm, etc. derived from the modulated transmission signal (frequency fm) outputted from the voltage controlled oscillator 22 is stored in the memory 35. When the changeover switches 38A, 38B are switched to the side of the antennas 24, 26, the signal processing unit 30A can calculate the distance to and the relative velocity with respect to the vehicle 25 considering the FM/AM conversion noise information fm, 2fm, 3fm, etc. in the beat wave signal which has been detected in the receiving system.

Accordingly, the FM-CW radar apparatus according to the present modification can offer the same effect or advantage as the apparatus shown in FIG. 10. In addition, even when the apparatus is in the state of not receiving the reflected wave signal from the vehicle 25 as a result of switching the changeover switches 38A, 38B to the side of the terminators 39A, 39B, respectively, impedance match can be established for circuit, whereby the FM/AM conversion data fm, 2fm, 3fm, etc. can be more stably stored in the memory 35.

Figure 15:
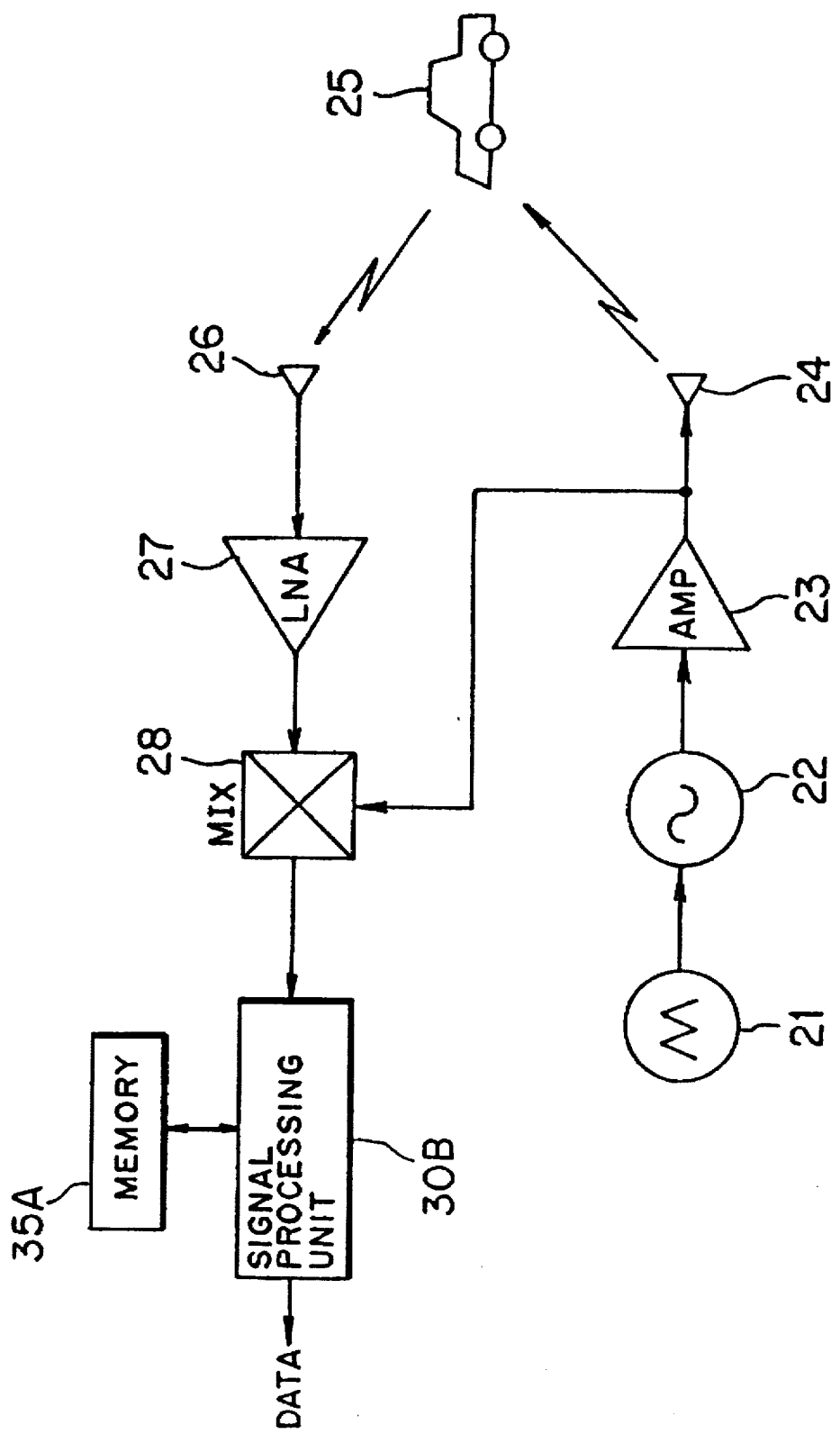
FIG. 15 is a block diagram showing the construction of an FM-CW radar apparatus (radar apparatus for detecting a distance/velocity) according to a fourth embodiment of the present invention.

(e) Fourth embodiment of the present invention:

FIG. 15 is a block diagram showing the construction of an FM-CW radar apparatus (radar apparatus for detecting a distance/velocity) according to a fourth embodiment of the present invention. In the apparatus shown in FIG. 15, as in the first embodiment, a transmitting system has a triangular wave signal generator 21, a voltage controlled oscillator 22, an amplifier (AMP) 23, and a transmitting antenna 24.

On the other hand, a receiving system has a receiving antenna 26, a low noise amplifier (LNA) 27, and a mixer (MIX) 28, as in the first embodiment, and further has a signal processing unit 30B and a memory 35A.

The signal processing unit (distance/velocity calculating unit) 30B calculates the distance to the vehicle (object) 25 and the relative velocity between the vehicle 25 and an observer based on the frequency information in the beat wave signal which has been detected at the mixer 28 in the receiving system. The signal processing unit 30B is further adapted to remove information about the harmonic frequency components (modulation frequency components) fm, 2fm, 3fm, etc. of the modulated transmission signal (frequency fm) outputted from the voltage controlled oscillator 22 in the transmitting system before cadistaning the distance/velocity.

Figure 16:
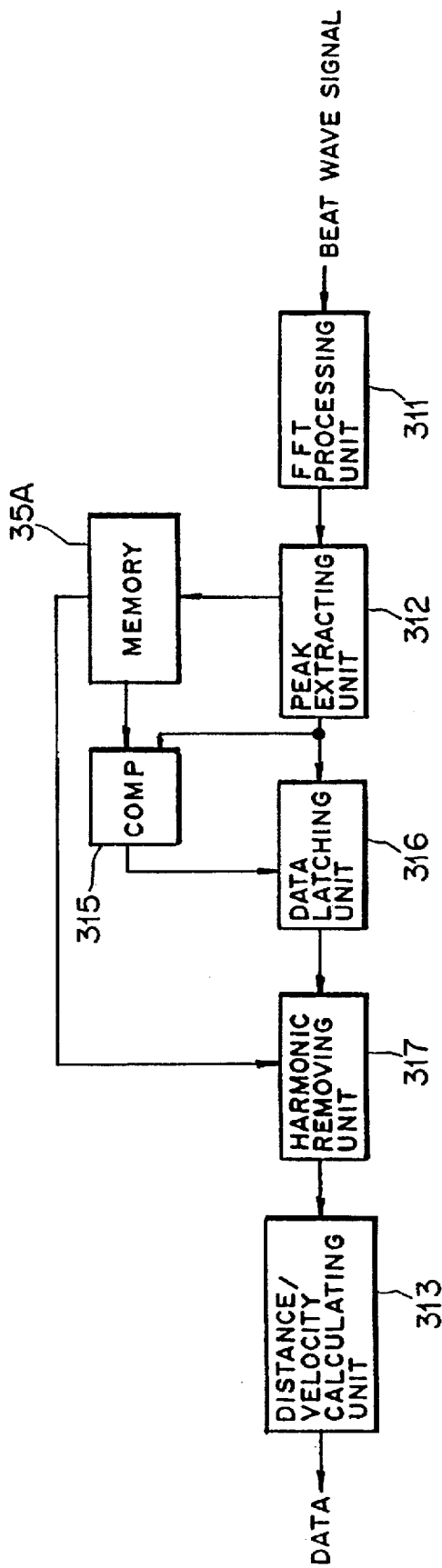
FIG. 16 is a block diagram showing the construction of a signal processing unit in the FM-CW radar apparatus according to the fourth embodiment.

That is, as shown in FIG. 16, the signal processing unit 30B has an FFT processing unit 311, a peak extracting unit 312, and a distance/velocity calculating unit 313, as of the first embodiment shown in FIG. 7, and further has a memory 35A, a comparator (COMP) 315, a data latching unit 316, and a harmonic removing unit 317.

The memory 35A previously stored the frequency information about the harmonic frequency components fm, 2fm, 3fm, etc. in the beat wave signal which was obtained by the peak extracting unit 312. The comparator 315 determines whether or not the frequency information of the received signal (reflected wave signal) in the beat wave signal at the current point of time coincides with the frequency information about the harmonic frequency components fm, 2fm, 3fm, etc. which has been stored in the memory 35A.

When the comparator 315 determines the matching between the frequency information of the received signal at the current point of time and the frequency information about the harmonic frequency components fm, 2fm, 3fm stored in the memory 35A, the data latching unit 316 latches the frequency information which has been obtained at the peak extracting unit 312 at that point of time, thereby preventing the frequency information from being used in a calculation at a subsequent stage. When matching is not the case, the data latching unit 316 outputs the frequency information which has been obtained at the peak extracting unit 312 at that point of time, so that the distance/velocity calculating unit 313 uses the frequency information for calculation.

The harmonic removing unit 317 removes the frequency information about the harmonic frequency components fm, 2fm, 3fm, etc. Shored previously in the memory 35A from frequency information outputted from the data latching unit 316.

That is, when the frequency information of the reflected wave signal from the vehicle 25 coincides with the harmonic frequency components fm, 2fm, 3fm, etc., the removal of the harmonic frequency components fm, 2fm, 3fm, etc. causes the removal of the frequency information of the reflected wave signal together with these harmonic frequency components, causing a loss of data. In this case, therefore, the signal processing unit 30B calculates the distance to and the relative velocity with respect to the vehicle 25 based on the previously detected frequency information. That is, a previously obtained distance and relative velocity are displayed.

Loss of data as described above occurs only for a special combination of the distance to the vehicle 25 and the relative velocity with respect to the vehicle 25. Hence, such loss of data is less likely to occur. And further, the distance to and the relative velocity with respect to the vehicle 25 change momentarily. Loss of data, therefore, is a momentary phenomenon.

In the thus constructed FM-CW radar apparatus, as in the embodiments described above, the reflected wave signal from the vehicle 25 and the modulated transmission signal from the voltage controlled oscillator 22 in the transmitting system are mixed together at the mixer 28 so as to obtain the beat wave signal, and the thus obtained beat wave signal is outputted to the signal processing unit 30B.

Figure 17:
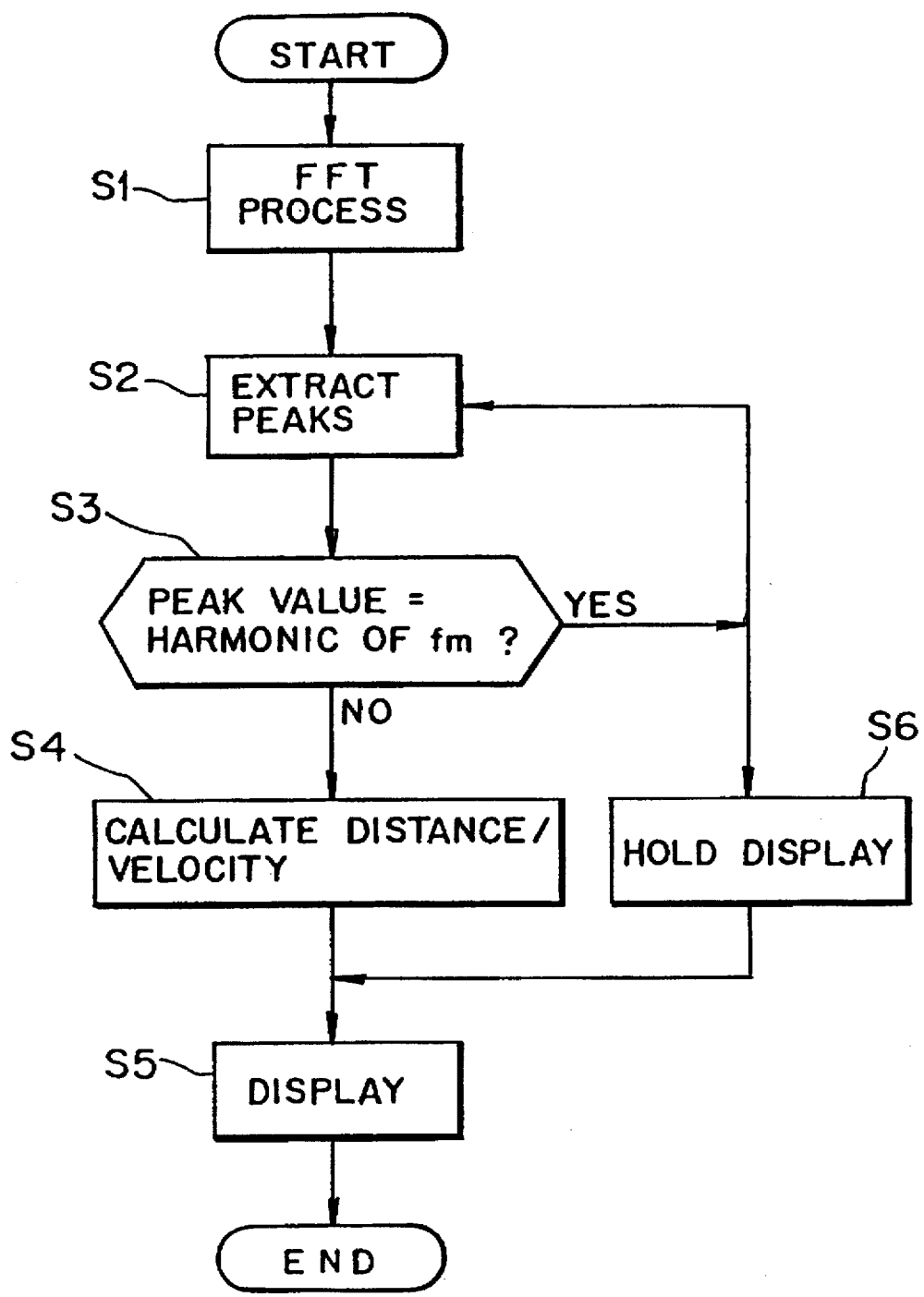
FIG. 17 is a flowchart illustrating the operation of the FM-CM radar apparatus according to the fourth embodiment.

In the signal processing unit 30B, as shown in FIG. 17, the FFT processing unit 311 carries out a fast Fourier transform on the beat wave signal (step S1), the peak extracting unit 312 extracts frequency information (peak values) of the reflected wave signal in the beat wave signal (step S2), and the comparator 315 determines whether or not the frequency information of the reflected wave signal coincides with the harmonic frequency components fm, 2fm, 3fm, etc. (step S3).

When both do not coincide with each other, the distance/velocity calculating unit 313 calculates the distance to and the relative velocity with respect to the vehicle 25 (exist of step S2 for No to step S4) based on the frequency information (including the distance frequency fr and the velocity frequency fd) outputted from the peak extracting unit 312 because the frequency information of the reflected wave signal is not removed even when the harmonic removing unit 317 removes the harmonic frequency components fm, 2fm, 3fm, etc.

On the other hand, when the frequency information of the reflected wave signal coincides with the harmonic frequency components fm, 2fm, 3fm, etc. of the modulated transmission signal, the frequency information outputted from the peak extracting unit 312 is latched by the data latching unit 316 because when the harmonic removing unit 317 removes the harmonic frequency components fm, 2fm, 3fm, etc., the frequency information of the reflected wave signal is also removed together. As a result, the previous distance and relative velocity are displayed (decision YES in step S3 to steps S2 and S6).

As described above, in the FM-CW radar apparatus (radar apparatus for detecting a distance/velocity) according to the present embodiment, when the signal processing unit 30B calculates the distance to the vehicle (object) 25 and the relative velocity between the vehicle 25 and an observer based on the frequency information in the beat wave signal which has been detected through the mixer 28 in the receiving system, data about the harmonic frequency components (modulation frequency components) fm, 2fm, 3fm, etc. of the modulated transmission signal is removed from the frequency information. Accordingly, the receiving S/N ratio of the radar apparatus can be greatly improved as in the apparatus according to the first embodiment, the distance to and the relative velocity with respect to the vehicle 25 can be detected at a quite high accuracy even when the modulated transmission signal is transmitted with a low power.

Figure 18:
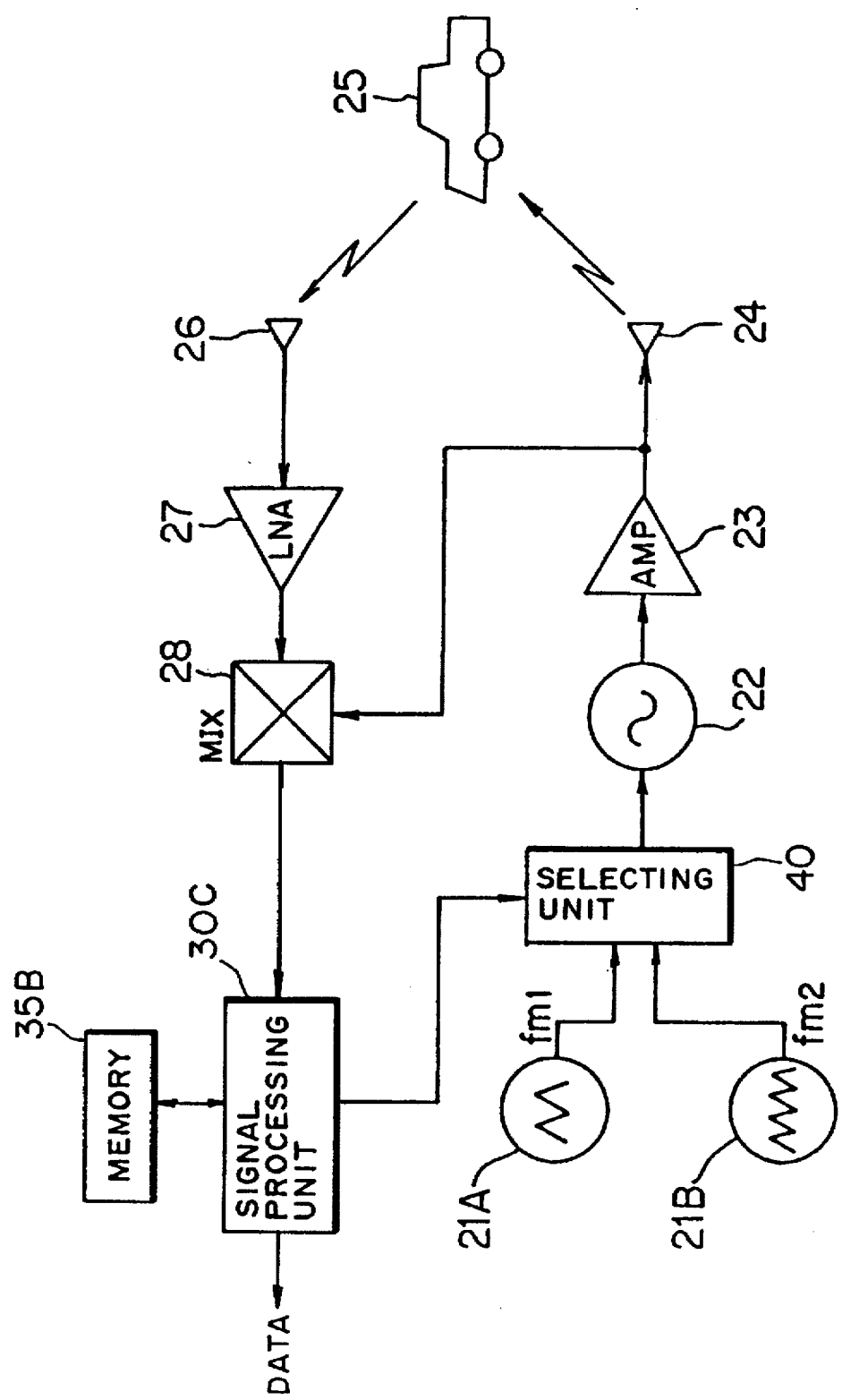
FIG. 18 is a block diagram showing the construction of an FM-CW radar apparatus according to a first modification of the fourth embodiment.

(e-1) First modification of the fourth embodiment of the present invention:

FIG. 18 is a block diagram showing the construction of an FM-CW radar apparatus (radar apparatus for detecting a distance/velocity) according to a first modification of the fourth embodiment of the present invention. In the apparatus shown in FIG.18, a transmitting system has a voltage controlled oscillator 22, an amplifier 23, and a transmitting antenna 24, as of the first embodiment, and further has two triangular signal generators 21A, 21B and a selecting unit 40.

Figure 19A:
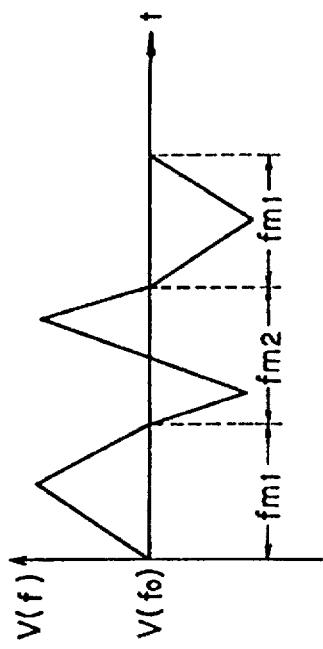
FIG. 19 (a) to FIG. 19(c) are graphs for illustrating the operation of the FM-CW radar apparatus according to the fourth embodiment.
Figure 19B:
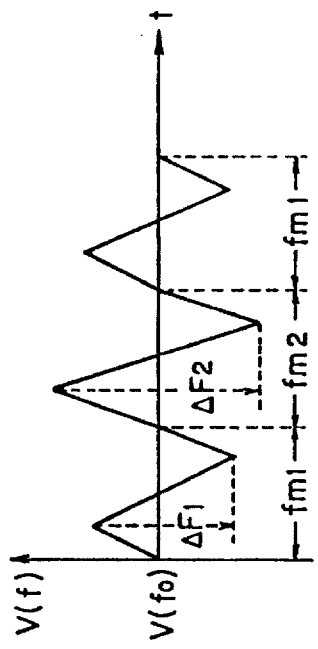
Figure 19C:
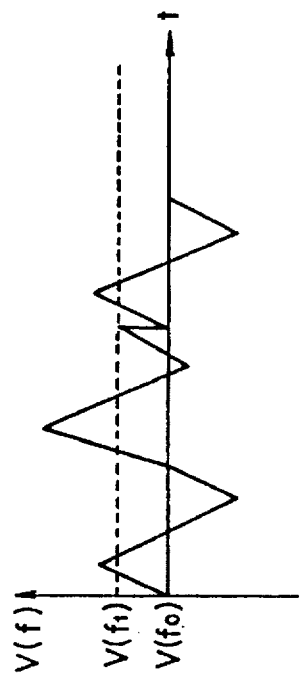

The triangular wave signal generator 21A generates a triangular wave signal having, for example, a recurrence frequency $fm_1$ as shown in FIG. 19 (a). The thus generated triangular wave signal is used as a frequency-modulating signal at the voltage controlled oscillator 22. The triangular wave signal Generator 21B Generates a triangular wave signal having, for example, a recurrence frequency $fm_2$ (different from frequency $fm_1$) as shown in FIG. 19 (a). The thus generated triangular wave signal is used as a frequency-modulating signal at the voltage controlled oscillator 22.

The selecting unit 40 selects an output of either of the triangular signal generators 21A and 21B in response to a control signal from the signal processing unit 30C, described later. The thus selected output enters the voltage controlled oscillator 22.

That is, in the FM-CW radar apparatus according to the present embodiment, the selecting system is adapted to select at the selecting unit 40 one of a plurality of (two in the present embodiment) triangular wave signals having different recurrence frequencies $fm_1$, $fm_2$ and to transmit via the transmitting antenna 24 a signal which has been frequency-modulated with the thus selected triangular wave signal.

On the other hand, a receiving system has a receiving antenna 26, a low noise amplifier (LNA) 27, and a mixer (MIX) 28, as of the first embodiment, and further has a signal processing unit 30C and a memory 35B.

The signal processing unit 30C removes data about the harmonic frequency components (modulation frequency components) of the modulated transmission signal (frequency $fm_1$ or $fm_2$) outputted from the voltage controlled oscillator 22 in the transmitting system before calculating the distance to and the relative velocity with respect to the vehicle (object) 25 based on the frequency information in the beat wave signal which has been detected at the mixer 28 in the receiving system. The signal processing unit 30C is further adapted to output to the selecting unit 40 a control signal for switching outputs of the triangular wave generators 21A and 21B when the frequency information of the reflected wave signal from the vehicle 25 in the beat wave signal coincides with the frequency information about the harmonic frequency components of the modulated transmission signal.

The memory 35B stores the frequency information about the harmonic frequency components $fm_1$, $2fm_1$, $3fm_1$, etc., and $fm_2$, $2fm_2$, $3fm_2$, etc. of the two kinds of modulated transmission signals having frequencies $fm_1$ or $fm_2$, with either of the modulated transmission signals being outputted from the voltage controlled oscillator 22. The harmonic removing unit 317 removes the harmonic frequency components from the beat wave signal using either kind of frequency information stored in the memory 35B.

Figure 20:
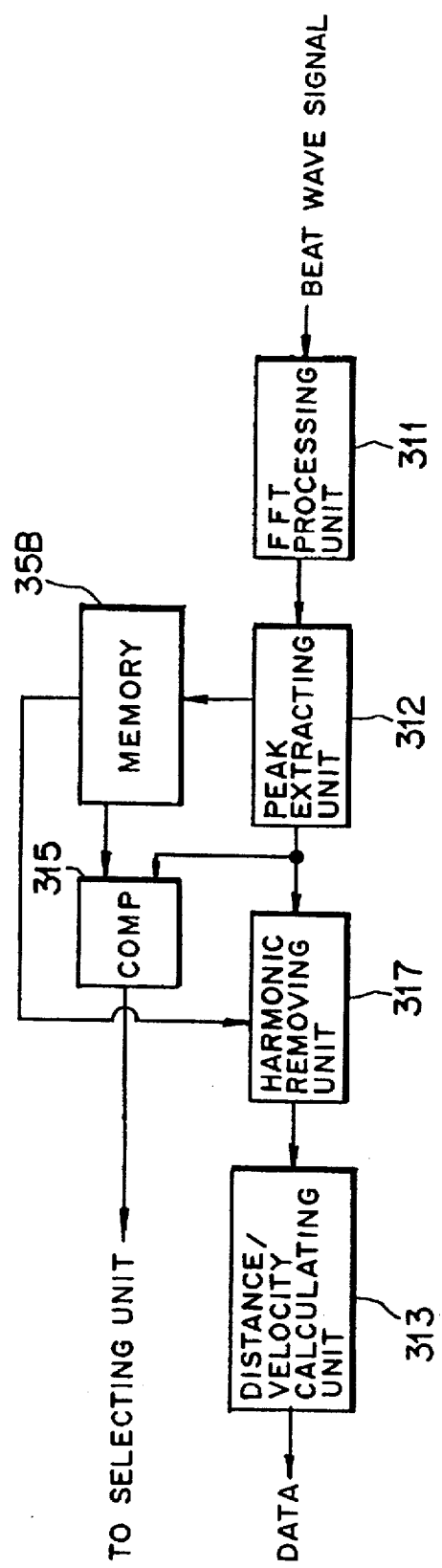
FIG. 20 is a block diagram showing the construction of a signal processing unit in the FM-CW radar apparatus according to the first modification of the fourth embodiment.

Furthermore, as shown in FIG. 20, the signal processing unit 30C has an FFT processing unit 311, a peak extracting unit 312, a distance/velocity calculating unit 313, a comparator (COMP) 315, and a harmonic removing unit 317, as of the fourth embodiment shown in FIG. 16. The comparator 315 is adapted to output to the selecting unit 40 a control signal for switching outputs of the triangular wave signal generators 21A, 21B when the frequency information of the reflected wave signal from the vehicle 25 in the beat wave signal coincides with the harmonic frequency components of the modulated transmission signal stored previously in the memory 35B.

In the thus constructed FM-CW radar apparatus according to the present modification, the beat wave signal which has been detected at the mixer 28 in the receiving system is outputted to the signal processing unit 30C. In the signal processing unit 30C, the FFT processing unit 311 carries out a fast Fourier transform on the beat wave signal, and the peak extracting unit 312 extracts the peak values of frequency information in the beat wave signal.

The comparator 315 determines whether or not the frequency information (peak values) in the beat wave signal, which has been obtained at the peak extracting unit 312, coincides with the harmonic frequency components of the modulated transmission signal stored previously in the memory 35B. If both coincide with each other, the comparator 315 outputs to the selecting unit 40 a control signal for switching the triangular wave signal generator 21A to and from the triangular wave signal generator 21B, thereby switching the outputs of the triangular signal generators 21A, 21B.

For example, in the case where the output having a recurrence frequency $fm_1$ from the triangular wave signal generator 21A is initially selected and where the modulated transmission signal having a frequency $fm_1$ is transmitted from the voltage controlled oscillator 22, when the frequency information of the received signal in the beat wave signal (which has been detected through the mixer 28 ) coincides with the harmonic frequency components $fm_1$, $2fm_1$, $3fm_1$, etc. stored in the memory 35B, the comparator 315 outputs to the selecting unit 40 a control signal for selecting the triangular signal generator 21B so that the triangular signal having recurrence frequency $fm_2$ outputted from the triangular wave signal generator 21B is outputted to the voltage controlled oscillator 22.

Thus, as shown in FIG. 19 (a), a voltage waveform having a different recurrence frequency is inputted to the voltage controlled oscillator 22 each time the frequency information of the received signal in the beat wave signal coincides with the harmonic frequency components of the modulated transmission signal, thereby switching frequencies $fm_1$ and $fm_2$ of the modulated transmission signal.

As stated earlier, when the center frequency of the frequency modulation (the center frequency of the triangular wave signal) is represented by $f_O$, the amount of frequency deviation (modulation width) is represented by $\Delta F$, the recurrence frequency of the triangular wave signal is represented by $fm$, the velocity of light is represented by c, the distance to the vehicle 25 is represented by R, and the relative velocity is represented by V, the frequency information (beat frequency) fb of the beat wave signal which is detected through the mixer 28 is expressed as follows:

$$fb=(4 \cdot \Delta F \cdot fm/c) \cdot R \pm 2f_O(V/c) \tag{5}$$

Switching frequencies $fm_1$ and $fm_2$ of the modulated transmission signal is to change the variable $fm$ in Eq. (5).

Figure 21A:
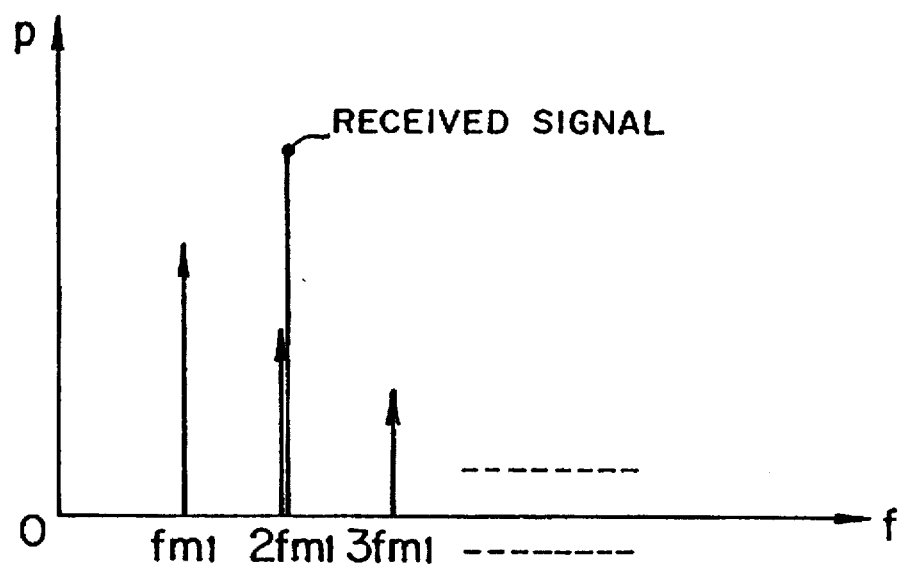
FIG. 21 (a) and FIG. 21 (b) are graphs for illustrating the operation of the FM-CW radar apparatus according to the first modification of the fourth embodiment.
Figure 21B:
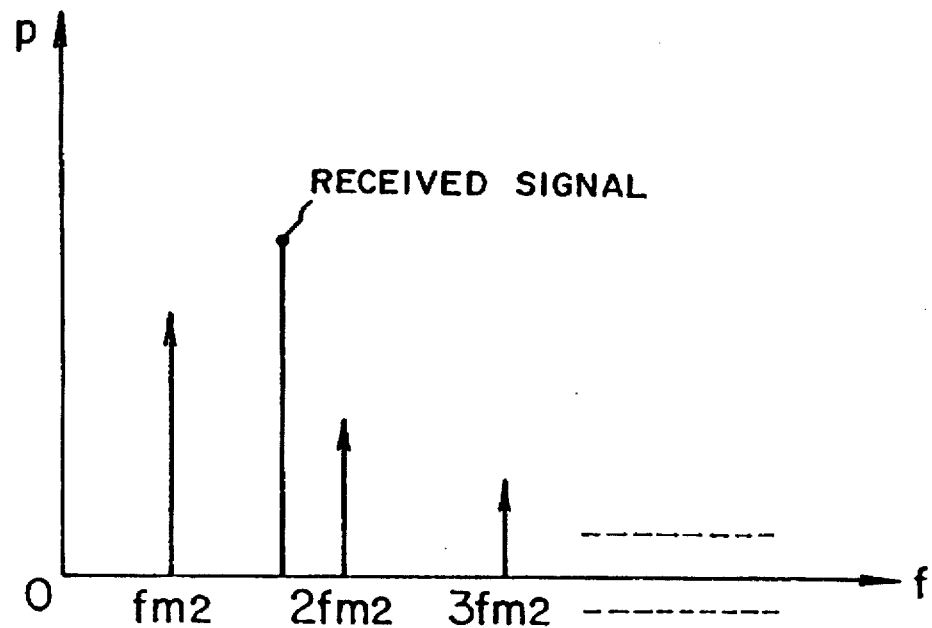

For example, as shown in FIG. 21 (a), when the harmonic frequency components $fm_1$, $2fm_1$, $3fm_1$, etc. in the beat wave signal of the modulated transmission signal having a frequency $fm_1$ match the frequency information of the received signal, the frequency of the modulated transmission signal is switched to $fm_2$. As a result, as shown in FIG. 21 (b), the harmonic frequency components in the beat wave signal change to $fm_2$, $2fm_2$, $3fm_2$, etc. This causes a shift of a required amount of the frequency information of the received signal with respect to the harmonic frequency components $fm_1$, $2fm_1$, $3fm_1$, etc. of the modulated transmission signal.

As a result, when the harmonic removing unit 317 removes the harmonic frequency components $fm_2$, $2fm_2$, $3fm_2$ etc. of the modulated transmission signal, the frequency information of the received signal is prevented from being removed together. Accordingly, the distance/velocity calculating unit 313 can calculate the distance to and the relative velocity with respect to the vehicle 25 based on only the frequency information of the received signal.

As far as the comparator 315 judges that the frequency information of the received signal does not coincide with the harmonic frequency components $fm_1$, $2fm_1$, $3fm_1$, etc. of the modulated transmission signal in the beat wave signal, the distance/velocity calculating unit 313 calculates the distance to and the relative velocity with respect to the vehicle 25 without switching the frequency of the modulated transmission signal to $fm_2$ because even when the harmonic removing unit 317 removes the harmonic frequency components $fm_1$, $2fm_1$, $3fm_1$, etc. of the modulated transmission signal, the frequency information of the received signal is not removed together.

As described above, in the FM-CW radar apparatus according to the present modification, either of two triangular waves having different recurrence frequencies $fm_1$ and $fm_2$ is selected in accordance with the result of the judgment by the comparator 315 in the signal processing unit 30C, and a signal which is frequency-modulated with the thus selected triangular wave is transmitted. Accordingly, the harmonic frequency components of the modulated transmission signal can be shifted by a required amount from the frequency information of the received signal (reflected wave signal) in the beat wave signal, whereby the frequency information of the received signal can be prevented from being removed together with information about the harmonics of the modulated transmission signal at the harmonic removing unit 317. Thus, the distance to and the relative velocity with respect to the vehicle (object) 25 can always and reliably be obtained with higher accuracy.

In the aforesaid case, the frequencies $fm_1$ and $fm_2$ are switched. This method, however, does not work when the relative velocity with respect to the vehicle 25 is "0", as seen from Eq. (5). To cope with the case of the relative velocity being zero, the variable ΔF (the frequency deviation or modulation width) and $f_O$ (the center frequency of the modulated transmission signal) in Eq. (5) are varied, whereby the harmonic frequency components of the modulated transmission signal can be shifted by a required amount from the frequency information of the received signal (reflected wave signal) in the beat wave signal.

Figure 22:
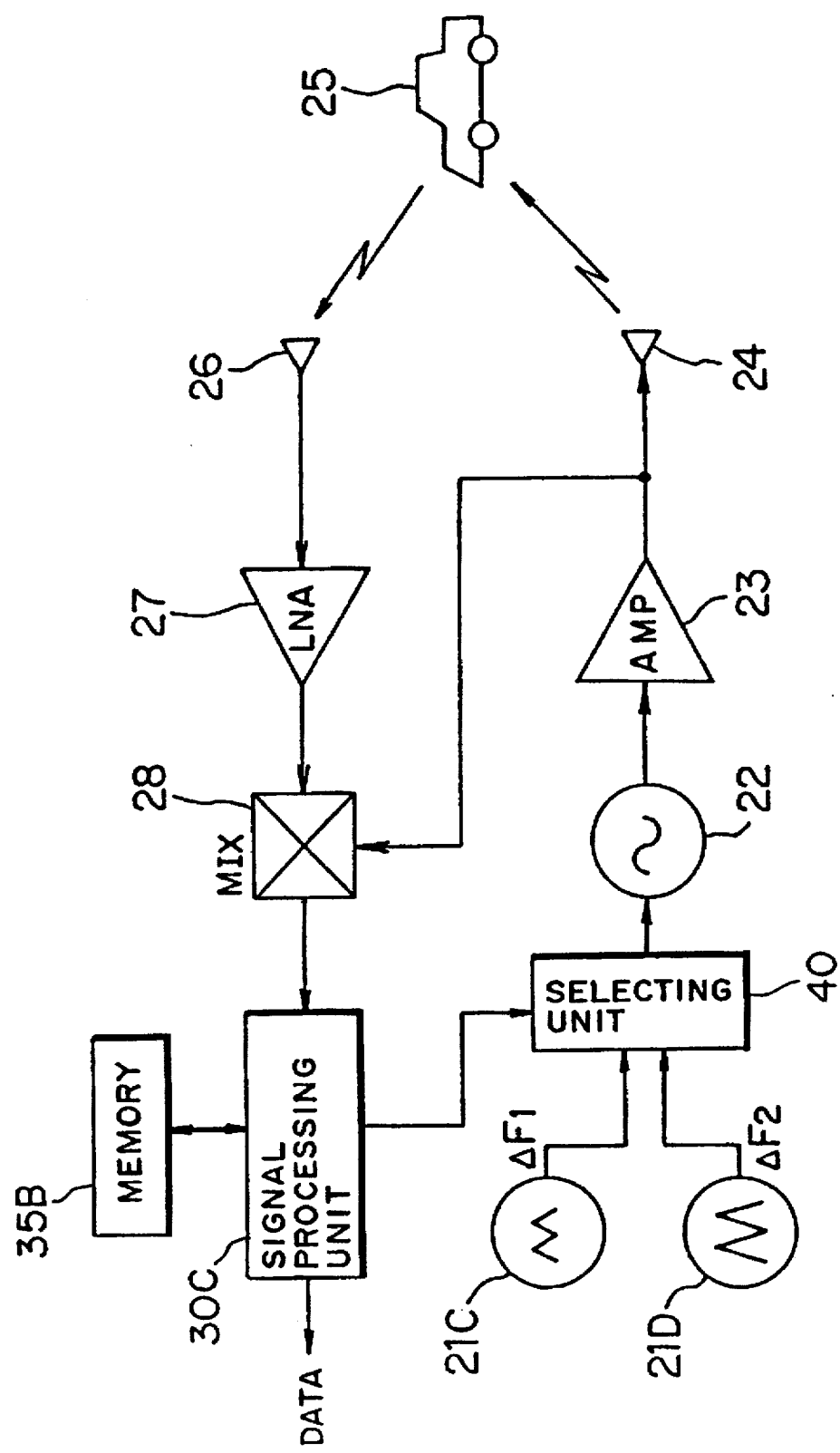
FIG. 22 is a block diagram showing another construction of the FM-CW radar apparatus according to the first modification of the fourth embodiment.

To render the amount of frequency deviation (the modulation width) ΔF variable, for example, a triangular wave signal generator 21C for generating a triangular wave having a modulation width $ΔF_1$ as shown in FIG. 19 (b) and a triangular wave signal generator 21D for generating a triangular wave having a modulation width $ΔF_2$ (different from ΔF1) are used as shown in FIG. 22. The selecting unit 40 selects either of the outputs from the triangular wave signal generators 21C and 21D, and the thus selected output enters the voltage controlled oscillator 22. Thus, the amount of frequency deviation ΔF for the modulated transmission signal can be made variable.

Thus, in an FM-CW radar apparatus shown in FIG. 22, when the harmonic frequency components of the modulated transmission signal and the frequency information of the received signal (reflected wave signal) match in the beat wave signal, the selecting unit 40 selects either of the outputs from the triangular wave signal generators 21C and 21D to thereby change the amount of frequency deviation ΔF. This causes a shift of a required amount, thereby avoiding removing the frequency information of the received signal together with the harmonic frequency components of the modulated transmission signal. Accordingly, the distance to and the relative velocity with respect to the vehicle (object) 25 can always and reliably be obtained with higher accuracy.

Figure 23:
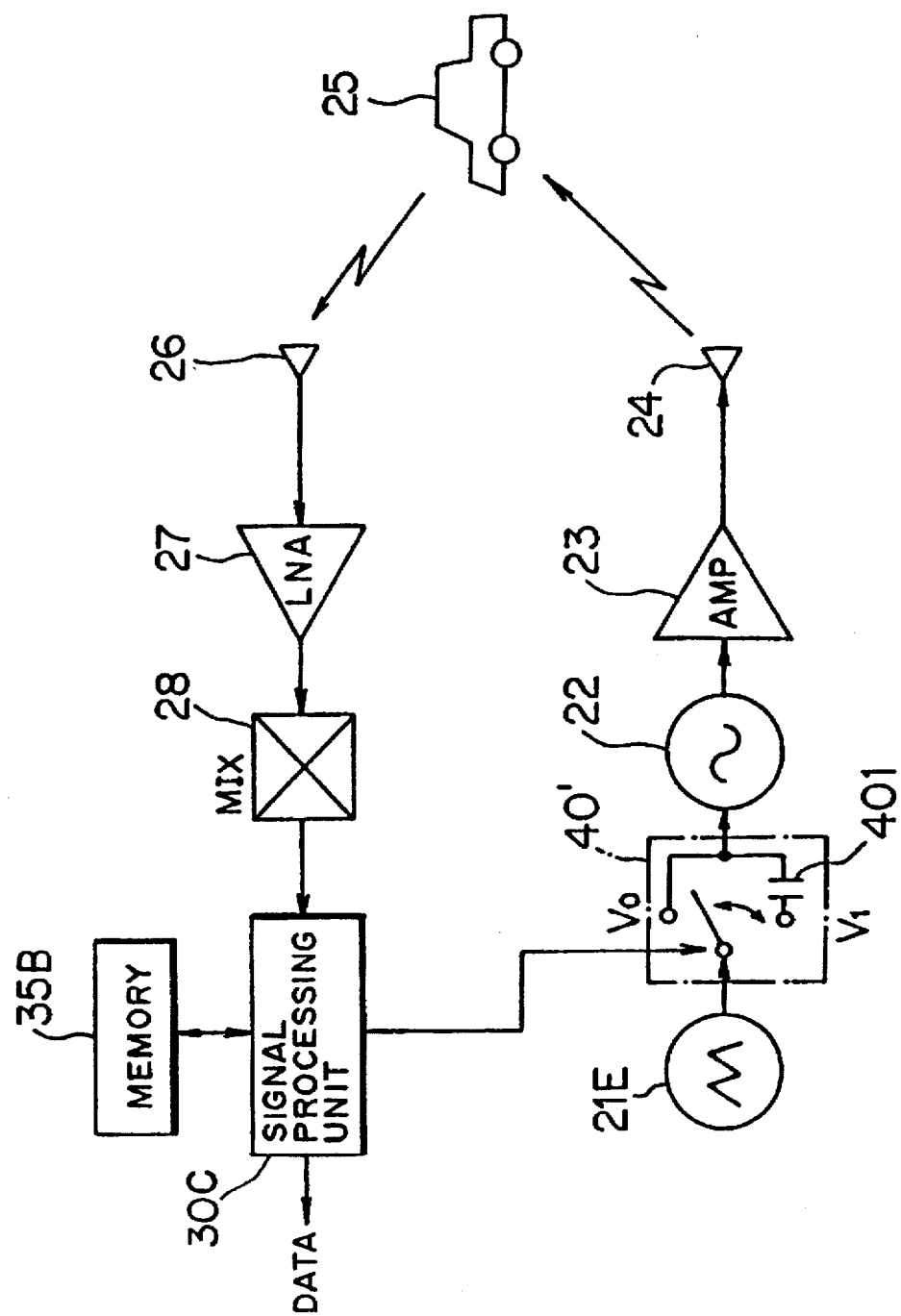
FIG. 23 is a block diagram showing a further construction of the FM-CW radar apparatus according to the first modification of the fourth embodiment.

To render the center frequency $f_O$ of the modulated transmission signal variable, for example, a triangular wave signal generator 21E for generating a triangular wave signal having a predetermined recurrence frequency for use as a modulating signal at the voltage controlled oscillator 22 and a selecting unit 40' in the form of a switch using a capacitor 401 are provided as shown in FIG. 23. In FIG. 23, the same portions as in FIG. 22 are denoted by common reference numerals.

In the thus constructed FM-CW radar apparatus shown in FIG. 23, when the harmonic frequency components of the modulated transmission signal and the frequency information of the received signal (reflected wave signal) coincide with the beat wave signal, the switch in the selecting unit 40' is switched to the capacitor 401 side. As a result, the center voltage of the triangular wave to be inputted to the voltage controlled oscillator 22 is switched, for example, from $v_0$ to $v_1$ as shown in FIG. 19 (c), whereby the frequency of the modulated transmission signal to be outputted from the voltage controlled oscillator 22 is switched from $f_O$ to $f_1$.

As a result, the harmonic frequency components of the modulated transmission signal are shifted by a required amount from the frequency information of the received data in the beat wave signal, thereby avoiding the removal of the frequency information of the received signal together with the harmonic frequency components of the modulated transmission signal. Accordingly, the distance to and the relative velocity with respect to the vehicle (object) 25 can always and reliably be obtained with higher accuracy.

Figure 24:
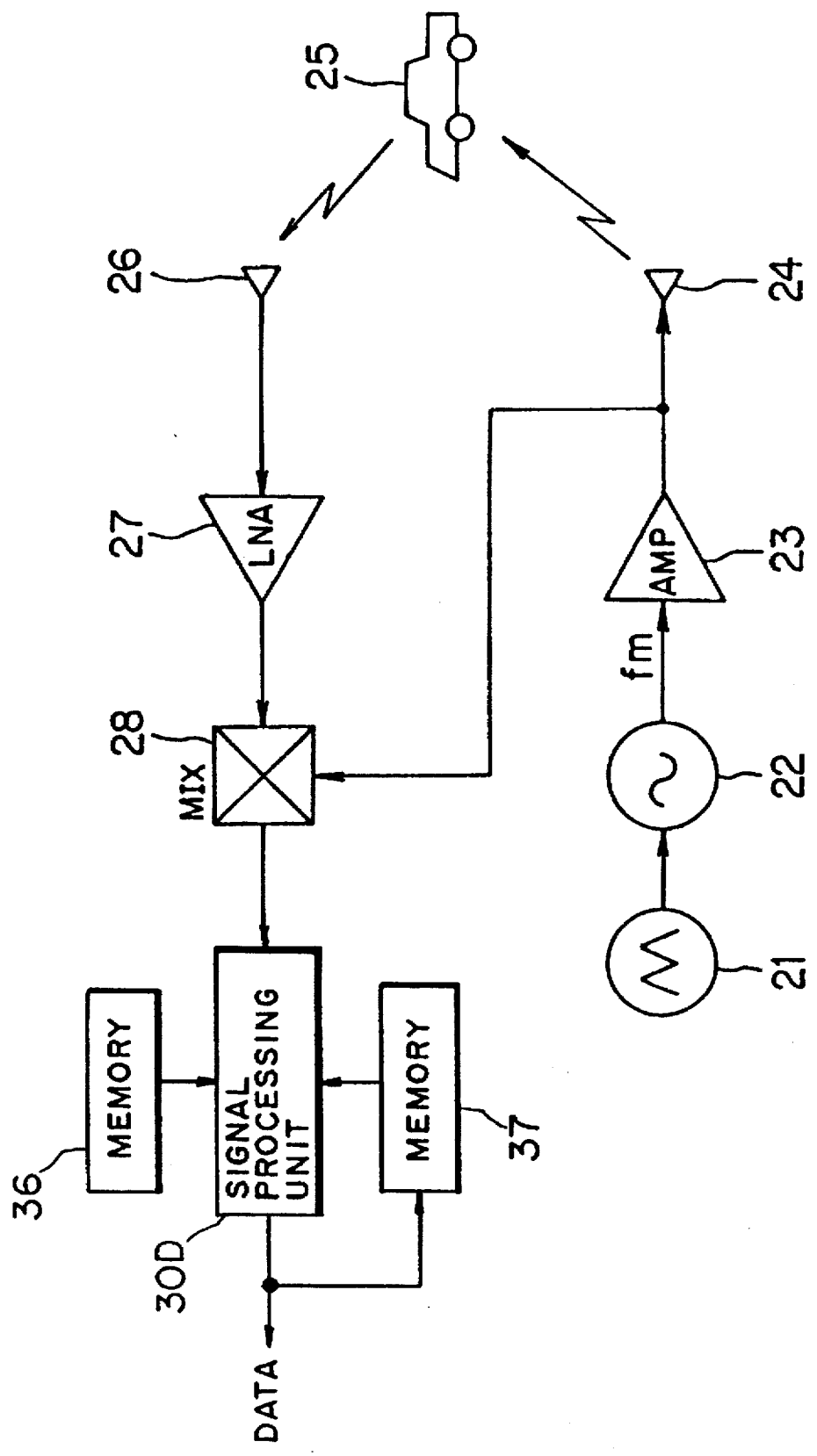
FIG. 24 is a block diagram showing the construction of an FM-CW radar apparatus according to a second modification of the fourth embodiment.

(e-2) Second modification of the fourth embodiment of the present invention:

FIG. 24 is a block diagram showing the construction of an FM-CW radar apparatus according to a second modification of the fourth embodiment of the present invention. In the apparatus shown in FIG. 24, a transmitting system has a triangular wave signal generator 21, a voltage controlled oscillator 22, an amplifier (AMP) 23, and a transmitting antenna 24, and a receiving system has a receiving antenna 26, a low noise amplifier (LNA) 27, and a mixer (MIX) 28 and further has a signal processing unit 30D and memories 36 and 37.

Also, in the present modification, the signal processing unit (distance/velocity calculating unit) 30D removes the information about harmonic frequency components fm, 2fm, 3fm, etc. of the modulated transmission signal (frequency fm) outputted from the voltage controlled oscillator 22 in the transmitting system before calculating the distance to and the relative velocity with respect to the vehicle (object) 25 based on the frequency information in the beat wave signal which has been detected at the mixer 28 in the receiving system.

Figure 25:
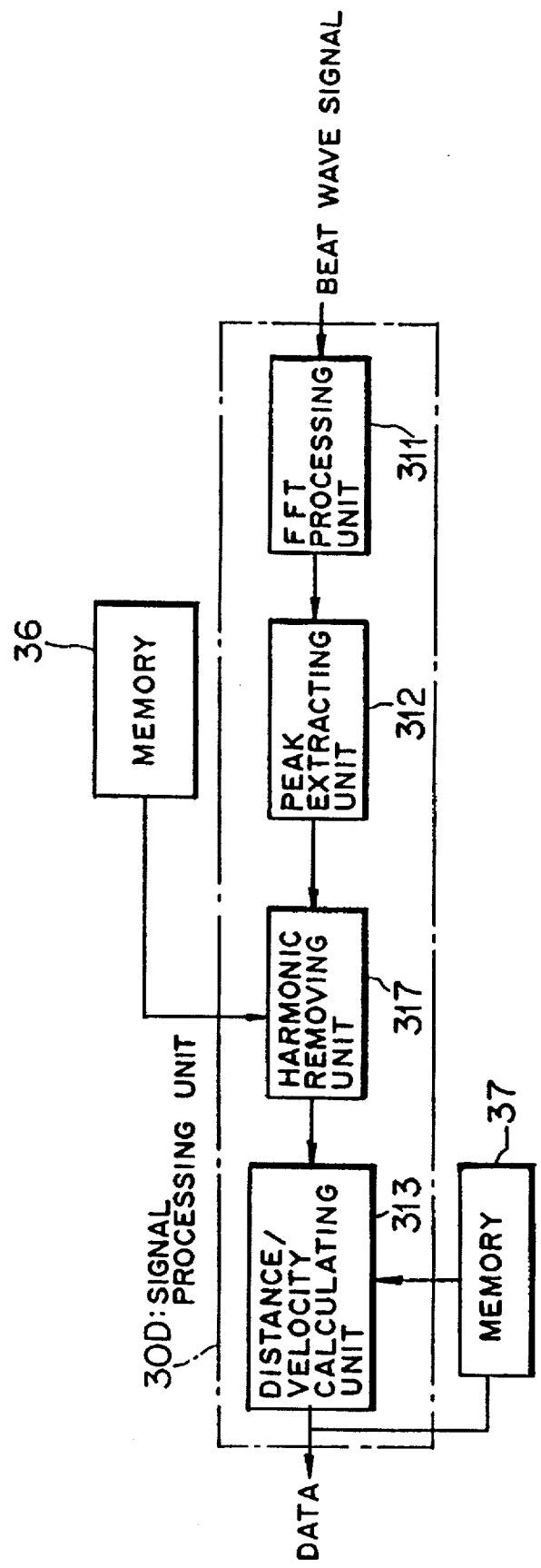
FIG. 25 is a block diagram showing the construction of a signal processing unit in the FM-CW radar apparatus according to the second modification of the fourth embodiment.

Thus, the signal processing unit 30D, as shown in FIG. 25, has an FFT processing unit 311, a peak extracting unit 312, a distance/velocity calculating unit 313, and a harmonic removing unit 317, as of the fourth embodiment shown in FIG. 16.

Functioning in the same manner as the memory 35A of FIG. 15 does, the memory 36 stores information about the harmonic frequency components fm, 2fm, 3fm, etc. of the modulated transmission signal from the transmitting system. The memory 37 stores past data about the distance to and the relative velocity with respect to the vehicle 25 which was obtained at the signal processing unit 30D.

That is, the signal processing unit 30D is adapted to use the past data stored in the memory 37 for calculating the distance to and the relative velocity with respect to the vehicle 25 in the case where the harmonic removing unit 317 has removed the frequency information of the received signal together with the harmonic frequency components in the beat wave signal.

In the thus constructed FM-CW radar apparatus according to the present modification, as described above, the harmonic removing unit 317 removes the harmonic frequency components fm, 2fm, 3fm, etc. in the beat wave signal which has been detected through the mixer 28 in the receiving system, whereby the distance/velocity calculating unit 313 can calculate the distance to and the relative velocity with respect to the vehicle 25 based on only the frequency information of the received signal. In the case where the frequency information of the received signal has been removed together with the harmonic frequency components fm, 2fm, 3fm, etc., the distance/velocity calculating unit 313 uses past data stored in the memory 37 for calculating the distance to and the relative velocity with respect to the vehicle 25.

That is, in the apparatus according to the present modification, when data are not available for calculating the current distance to and relative velocity with respect to the vehicle 25, the current distance/relative velocity is estimated from past data.

Figure 26A:
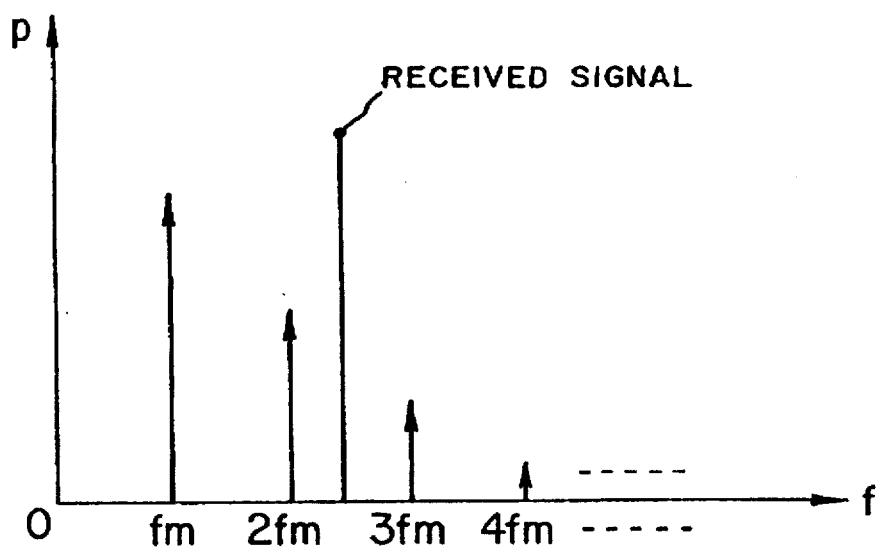
FIG. 26 (a) and FIG. 26 (b) are graphs for illustrating the operation of the FM-CW radar apparatus according to the second modification of the fourth embodiment.
Figure 26B:
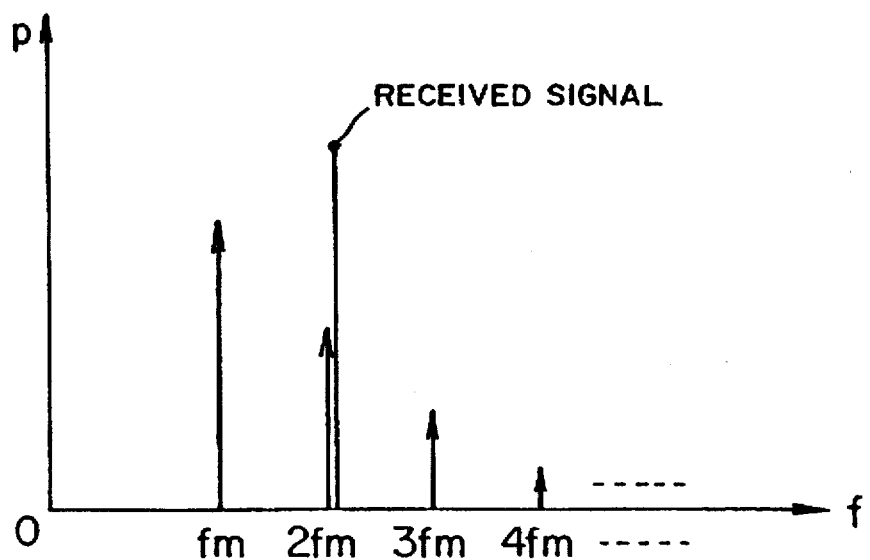

For example, suppose that the beat wave signal having frequency information shown in FIG. 26 (a) was obtained through the mixer 28 at a certain point of time in the past. In this case, since the harmonic frequency components fm, 2fm, 3fm, etc. of the modulated transmission signal outputted from the transmitting system do not coincide with the frequency information of the received signal, the frequency information of the received signal is not lost even when the harmonic removing unit 317 removes the harmonic frequency components fm, 2fm, 3fm, etc. Accordingly, the distance/velocity calculating unit 313 can calculate the distance to and the relative velocity with respect to the vehicle 25.

The thus obtained distance/relative velocity data is outputted as data for display and stored in the memory 37.

At the next moment, if the harmonic frequency components fm, 2fm, 3fm, etc. of the modulated transmission signal outputted from the transmitting system match the frequency information of the received signal, the frequency information of the received signal will be lost as a result of removing the harmonic frequency components fm, 2fm, 3fm, etc. at the harmonic removing unit 317.

The distance/velocity calculating unit 313, therefore, reads out from the memory 37 the distance/relative velocity data about was obtained in the was obtained in the last calculation, and estimates the current distance/relative velocity from the read data.

For example, in the case where a distance $R_1$ to and a relative velocity $V_1$ with respect to the vehicle 25 were obtained in the last calculation at the distance/velocity calculating unit 313 and the frequency information of the received signal was lost a minute time (measurement interval) $\Delta t$ after the last calculation, the distance/velocity calculating unit 313 reads out from the memory 36 the distance $R_1$ and the relative velocity $V_1$ which were obtained in the last calculation.

Usually, since the relative velocity between the observer and the vehicle 25 is less likely to abruptly change within a single measurement interval $\Delta t$ of the apparatus, the distance/velocity calculating unit 313 assumes that the relative velocity remains unchanged between the last calculation and the current point of time, and calculates the current distance $R_2$ to the vehicle 25 using the equation below.

$$R_2 = R_1 + V_1 \cdot \Delta t \tag{8}$$

The memory 37 may store past distance/relative velocity data about the vehicle 25 which was obtained in the last calculation and the calculation before the last calculation.

Figure 27A:
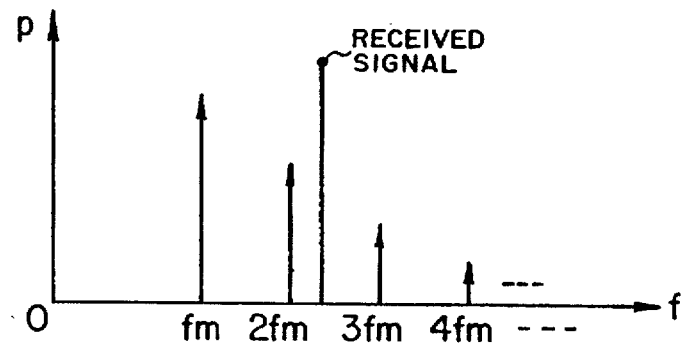
FIG. 27 (a) to FIG. 27 (c) are graphs for illustrating another operation of the FM-CW radar apparatus according to the second modification of the fourth embodiment.
Figure 27B:
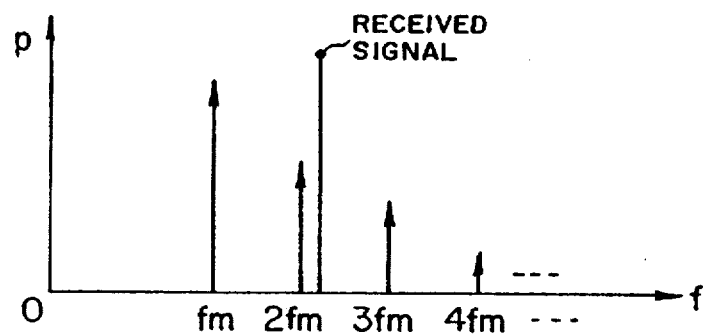
Figure 27C:
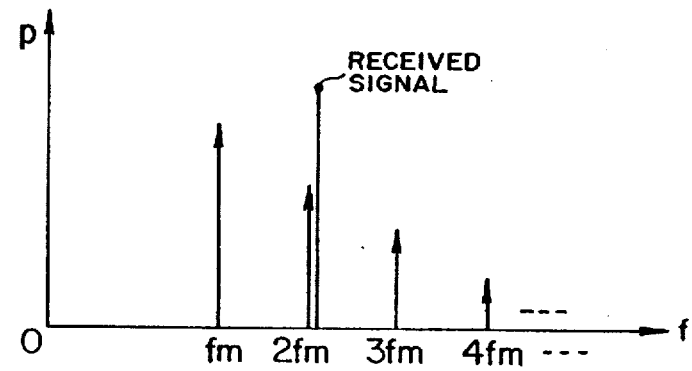

That is, for example, suppose that a distance $R_1$ to and a relative velocity $V_1$ with respect to the vehicle 25 were obtained at time T from the frequency information in the beat wave signal as shown in FIG. 27 (a) and that a distance $R_2$ to and a relative velocity $V_2$ with respect to the vehicle 25 were obtained after a measurement interval $\Delta t$, i.e. at the time (T+$\Delta t$) from frequency information as shown in FIG. 27 (b). The thus obtained distance/relative velocity data is stored in the memory 37.

Also, suppose that the frequency information of the received signal and the harmonic frequency components fm, 2fm, 3fm, etc. have coincided with each other as shown in FIG. 27 (c) after another measurement interval $\Delta t$, i.e. at time (T+2$\Delta t$), causing loss a of frequency information required for obtaining a distance $R_3$ to and a relative velocity $V_3$ with respect to the vehicle 25 at the time (T+2$\Delta t$). The distance/velocity calculating unit 313 reads out the distances $R_1$, $R_2$ and the relative velocities $V_1$, $V_2$ which were obtained in the last calculation and the calculation before the last calculation, and calculates the distance $R_3$ and the relative velocity $V_3$ at the current time (T+2$\Delta t$) as follows:

$$R_3 = R_2 + V_2 \cdot \Delta t, \tag{9}$$

$$V_3 = V_2 + (V_2 - V_1) = 2V_2 - V_1, \tag{10}$$

or $$R_3 = R_2 + (R_2 - R_1) = 2R_2 - R_1, \tag{11}$$

$$V_3 = 2V_2 - V_1. \tag{12}$$

As described above, in the FM-CW radar apparatus according to the present modification, even when the frequency information of the received signal is lost as a result of removing the harmonic frequency components of the modulated transmission signal in the beat wave signal, the signal processing unit 30D can calculate the distance to and the relative velocity with respect to the vehicle 25 using past data. Accordingly, the distance to and the relative velocity with respect to the vehicle 25 can always be obtained with high accuracy in a quite simple structure.

By using past distance/relative velocity data about the vehicle 25 which was obtained in the last calculation and the calculation before the last calculation, the distance/relative velocity can be reliably obtained even when the frequency information of the received signal is lost.

Figure 28:
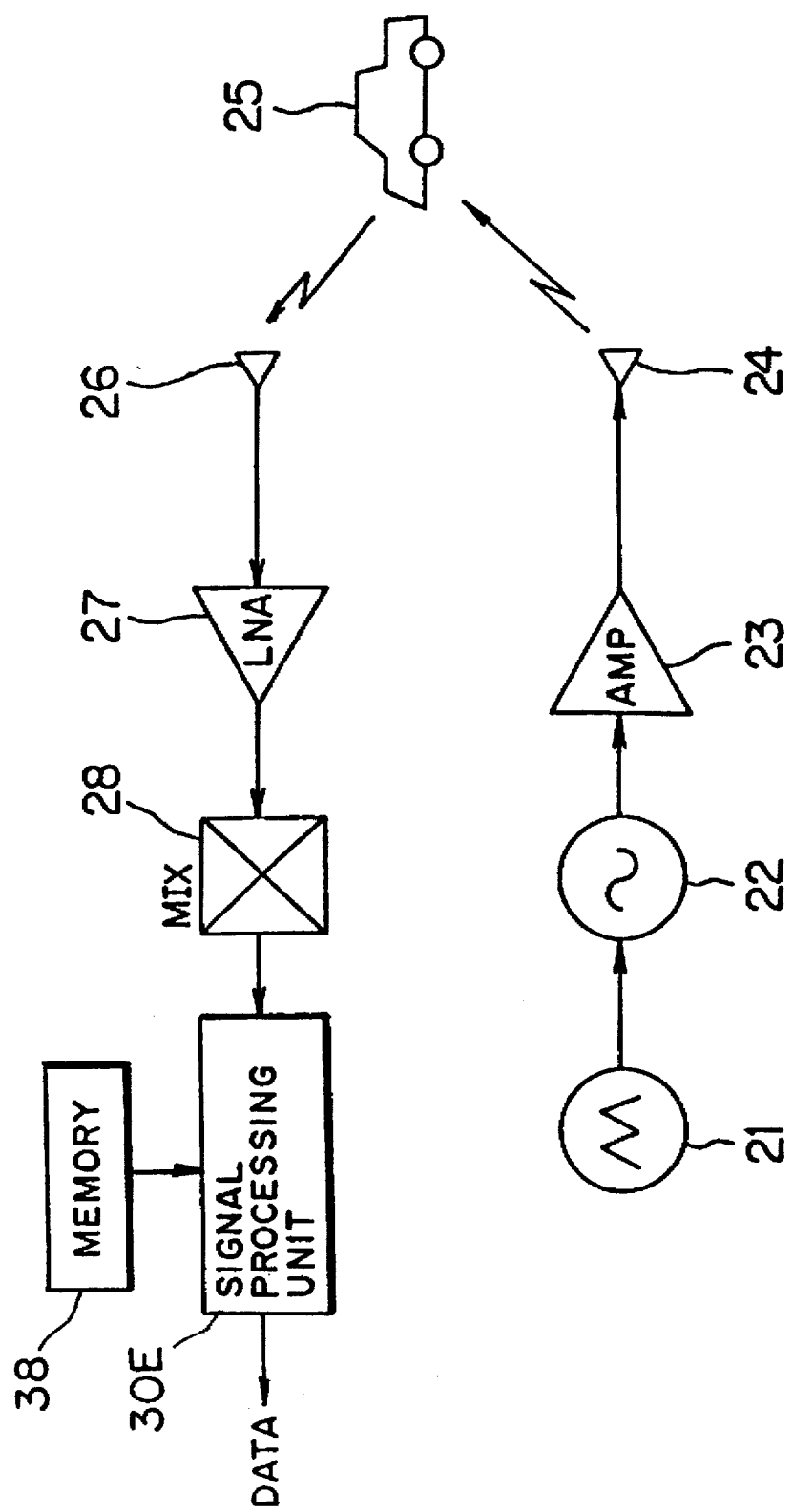
FIG. 28 is a block diagram showing the construction of an FM-CW radar apparatus according to a third modification of the fourth embodiment.

(e-3) Third modification of the fourth embodiment of the present invention:

FIG. 28 is a block diagram showing the construction of an FM-CW radar apparatus (radar apparatus for detecting a distance/velocity) according to a third modification of the fourth embodiment of the present invention. In the apparatus shown in FIG. 28, a transmitting system has a triangular wave signal generator 21, a voltage controlled oscillator 22, an amplifier 23, and a transmitting antenna 24, and a receiving system has a receiving antenna 26, a low noise amplifier (LNA) 27, and a mixer (MIX) 28 and further has a signal processing unit 30E and a memory 38.

Also, in the present modification, the signal processing unit (distance/velocity calculating unit) 30E removes data about harmonic frequency components fm, 2fm, 3fm, etc. of the modulated transmission signal (frequency fm) outputted from the voltage controlled oscillator 22 in the transmitting system before calculating the distance to and the relative velocity with respect to the vehicle (object) 25 based on the frequency information in the beat wave signal which has been detected at the mixer 28 in the receiving system. The signal processing unit 30E is further adapted to inhibit data from being removed when the signal level of the received signal is large to some extent (equal to or greater than a predetermined signal level) due to a short distance to the vehicle 25.

Thus, the signal processing unit 30E, as shown in FIG. 29, has an FFT processing unit 311, a peak extracting unit 312, a distance/velocity calculating unit 313, a comparator (COMP) 315, and a harmonic removing unit 317, as of the fourth embodiment shown in FIG. 16.

The memory 38 stores the aforesaid predetermined signal level. In the signal processing unit 30E, the comparator 315 compares a predetermined signal level stored in the memory 38 and a peak value (signal level) of the received signal in the beat wave signal which has been obtained at the peak extracting unit 312.

In the thus constructed FM-CW radar apparatus according to the present modification, when the harmonic removing unit 317 removes the harmonic frequency components fm, 2fm, 3fm, etc. of the modulated transmission signal (frequency fm) from the frequency information in the beat wave signal which has been obtained through the mixer 28 in the receiving system, the comparator 315 determines whether or not a signal having a signal level equal to or greater than a predetermined level exists in the beat wave signal.

Figure 30A:
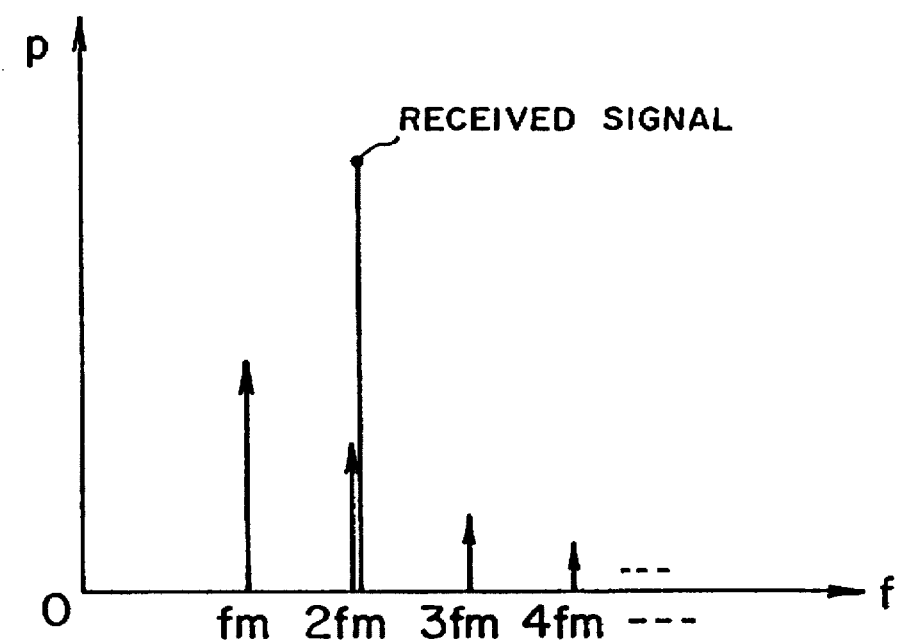
FIG. 30 (a) and FIG. 30 (b) are graphs for illustrating the operation of the FM-CW radar apparatus according to the third modification of the fourth embodiment.
Figure 30B:
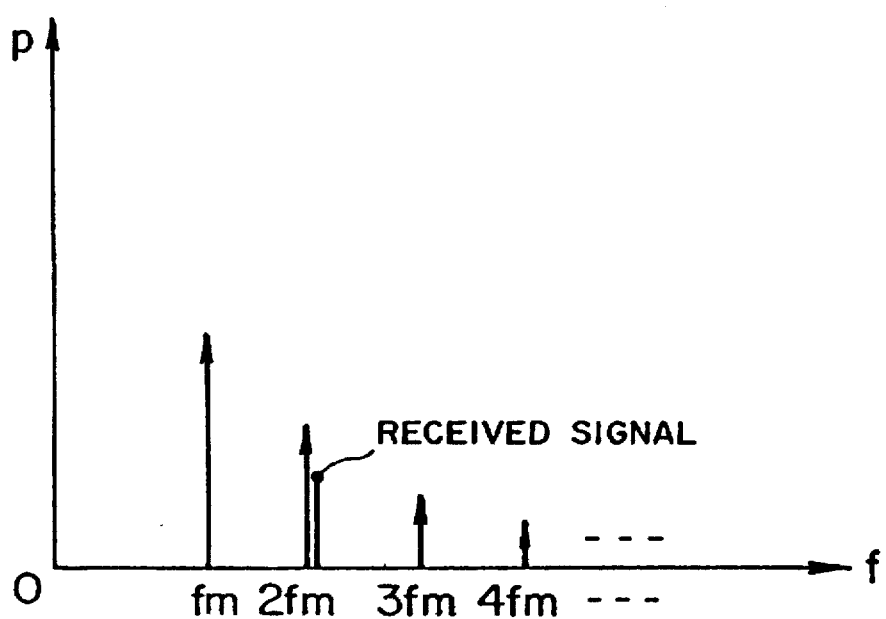

As a result of the comparison above, it is found that a signal having a signal level equal to or greater than a predetermined signal level exists in the beat wave signal as shown in FIG. 30 (a), it is considered that the signal is a received signal (short distance data) which is received when the vehicle is at a short distance. In such a case, the comparator 315 outputs a control signal to the harmonic removing unit 317 so as to instruct the harmonic removing unit 317 not to remove the harmonic frequency components fm, 2fm, 3fm, etc. Accordingly, the distance/velocity calculating unit 313 calculates the distance to and the relative velocity with respect to the vehicle 25 based on the frequency information of this received signal.

On the other hand, for example, if a signal having a signal level equal to or greater than the predetermined signal level does not exist in the beat wave signal as shown in FIG. 30 (b), it is considered that short distance data does not exist. In such a case, the harmonic removing unit 317 removes the harmonic frequency components fm, 2fm, 3fm, etc. Accordingly, the distance/velocity calculating unit 313 calculates the distance to and the relative velocity with respect to the vehicle 25 based on the frequency information (long distance data) of the remaining portion of the received signal.

As described above, in the FM-CW radar apparatus according to the present modification, when the signal processing unit 30E calculates the distance to and the relative velocity with respect to the vehicle 25 and when a signal having a signal level equal to or greater than the predetermined signal level is observed, the harmonic removing unit 317 can be inhibited from removing the data about harmonic frequency components fm, 2fm, 3fm, etc. Accordingly, based on short distance data which will otherwise be removed at the harmonic removing unit 317 together with the harmonic frequency components fm, 2fm, 3fm, etc., the distance to and the relative velocity with respect to the vehicle 25 which is at a short distance, if it is the case, can be reliably obtained.

Figure 31:
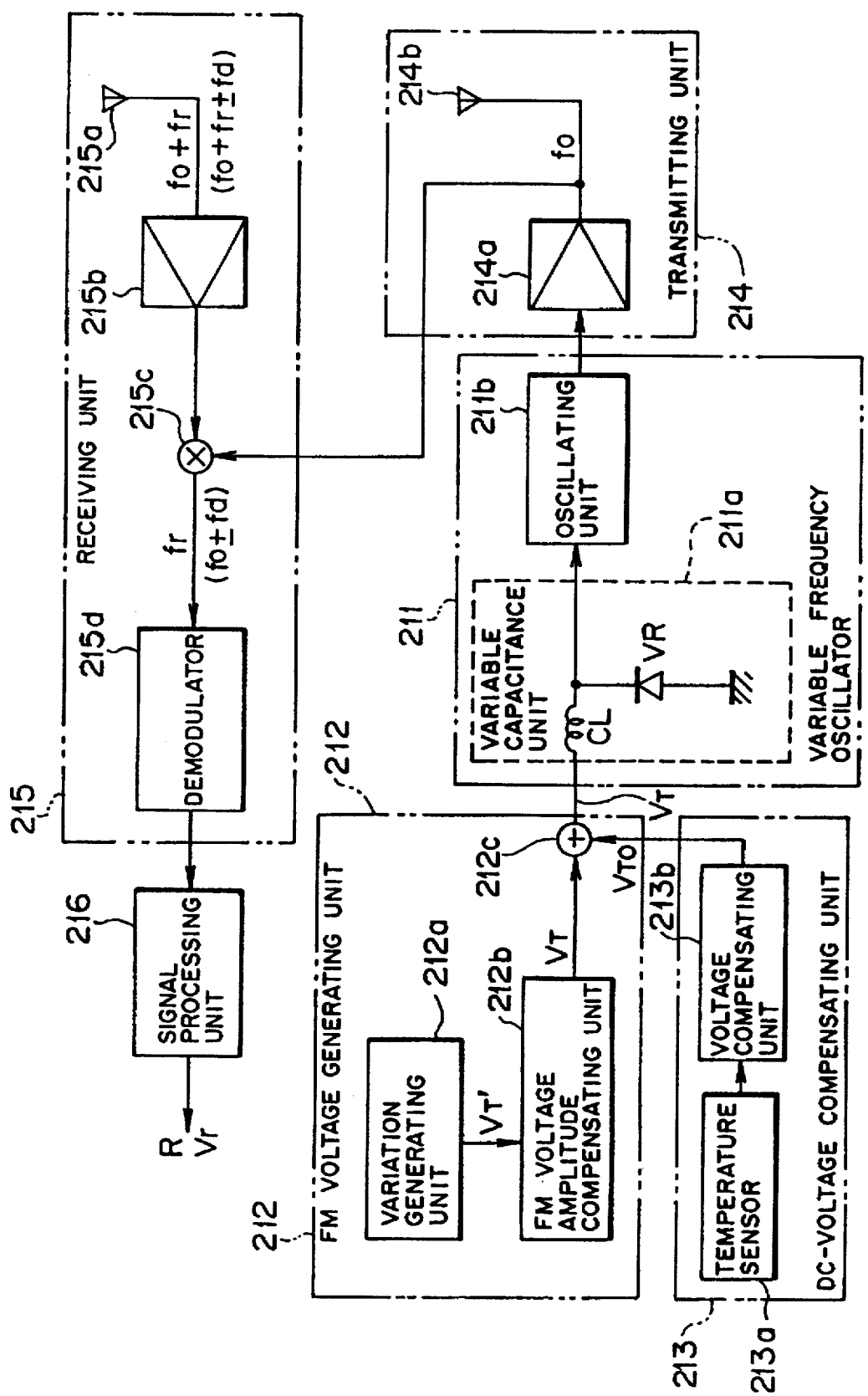
FIG. 31 is a block diagram showing the construction of an FM-CW radar apparatus according to a fifth embodiment of the present invention.

(f) Fifth embodiment of the present invention:

FIG. 31 is a block diagram showing the construction of an FM-CW radar apparatus (radar apparatus for detecting a distance/velocity) according to a fifth embodiment of the present invention. In FIG. 31, reference numeral 211 denotes a variable frequency oscillator, 212 denotes a frequency-modulation (FM) voltage generating unit, 213 denotes a DC voltage compensating unit, 214 denotes a transmitting unit, 215 denotes a receiving unit, and 216 denotes a signal processing unit.

The FM voltage generating unit (modulating signal generating unit) 212 generates, for example, a frequency-modulation voltage $V_T$ whose waveform periodically changes in a triangular form with respect to a predetermined DC voltage component $V_{TO}$. The thus generated $V_T$ is inputted to the variable frequency oscillator 211 as a modulating signal. The variable frequency oscillator 211 varies the oscillation frequency in accordance with the frequency-modulation voltage $V_T$ (input signal), thereby carrying out frequency modulation. The DC voltage compensating unit 213 compensates the voltage value of DC component $V_{TO}$ of the frequency-modulation voltage $V_T$ in accordance with the ambient temperature and outputs the thus compensated signal.

The transmitting unit 214 amplifies the frequency-modulated signal received from the variable frequency oscillator 211 and transmits the thus amplified signal toward an object. The receiving unit 215 receives a reflected wave signal, which is the frequency-modulated signal transmitted from the transmitting unit 214 and reflected by the object, and mixes the reflected wave signal and the frequency-modulated signal outputted from the transmitting unit 214 thereby to detect a beat wave signal of the reflected wave signal and the frequency-modulated signal. The signal processing unit (distance/velocity calculating unit) 216 calculates the distance to and the relative velocity with respect to the object based on the frequency information in the beat wave signal which has been detected at the receiving unit 215.

In the variable frequency oscillator 211, reference numeral 211a denotes a variable capacitance unit, and reference numeral 211b denotes an oscillating unit. The variable capacitance unit 211a has a coil CL for cutting off harmonic components and a varactor diode (variable capacitance element) VR having a resistance which varies in accordance with an applied voltage. A capacitance value, as viewed from the output side, of the variable capacitance unit 211a depends on the frequency-modulation voltage $V_T$ inputted from the FM voltage generating unit 212.

The oscillating unit 211b, for example, as shown in FIG. 32, is composed of an oscillator 211b-1 which oscillates at a center frequency of 29.75 GHz and a frequency multiplying circuit 211b-2 which multiplies an output frequency (29.75 GHz) of the oscillator 211b-1 thereby to output a signal having a center frequency of 59.5 GHz.

In the oscillator 211b-1, reference numeral 221 denotes a resonator, 222 denotes an FET with source grounded, 223 denotes a strip line connected to the drain terminal of the FET, and 224 denotes a strip line which is electrically coupled with the strip line 223 in an RF range. Thus, the oscillation frequency can be adjusted by varying the length of the resonator 221.

Also, in the oscillator 211b-1, the oscillation frequency varies with the capacitance value of the varactor diode VR.

Figure 33:
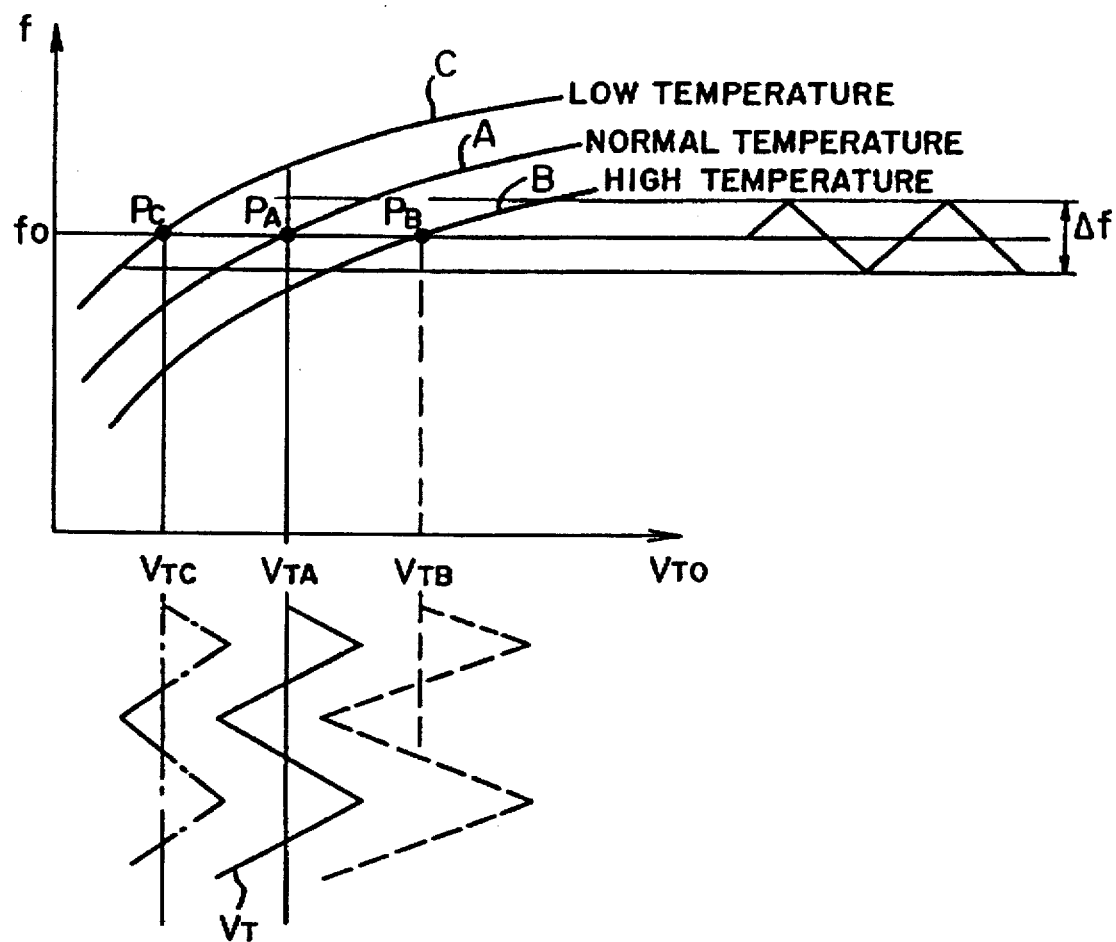
FIG. 33 is a graph for illustrating temperature compensation of the $V_T$-f characteristic in the FM-CW radar apparatus according to the fifth embodiment.

Thus, by controlling the capacitance value of the varactor diode VR through frequency-modulation voltage $V_T$ which is applied to the varactor diode VR, the oscillation frequency f varies accordingly. FIG. 33 is a graph for illustrating compensation of the $V_T$–f characteristic in accordance with temperature in the FM-CW radar apparatus according to the present embodiment. In FIG. 33, symbol A denotes the $V_T$–f characteristic at the normal temperature (25° C.), symbol B denotes the $V_T$–f characteristic at a high temperature (+75° C.), and symbol C denotes the $V_T$–f characteristic at a low temperature (−30° C.). At the normal temperature, the operating point is located at point $P_A$ on the $V_T$–f characteristic curve. When the frequency-modulation voltage $V_T$ ($V_{TA}$+ $v_T$), whose waveform varies in a triangular form, is applied to the varactor diode VR, the oscillation frequency f varies cyclically in a triangular form having a frequency deviation $\Delta$f.

Figure 34:
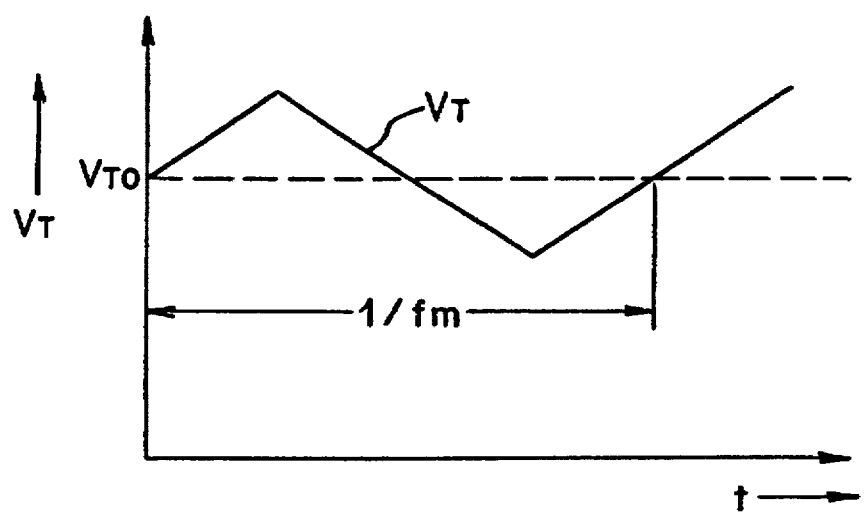
FIG. 34 is a graph exemplifying a waveform of frequency-modulation voltage for use in the FM-CW radar apparatus according to the fifth embodiment.

Furthermore, in the FM voltage generating unit 212, reference numeral 212a denotes a variation generating unit for outputting variation $v_T'$ of the frequency-modulation voltage $V_T$ which cyclically varies in a triangular form, 212b denotes a frequency-modulation (FM) voltage amplitude compensating unit for increasing the amplitude of variation $v_T'$ of the frequency-modulation voltage $V_T$ as temperature increases, and 212c denotes a synthesizing unit for combining DC voltage component $V_{TO}$ and variation $v_T'$. FIG. 34 is a graph exemplifying a waveform of the frequency-modulation voltage $V_T$. As shown in FIG. 34, the frequency-modulation voltage $V_T$ is composed of a DC component (DC voltage component) $V_{TO}$ and a variation component (voltage variation component) $v_T$. The variation component $v_T$ has a waveform which cyclically increases and decreases in a triangular form at frequency fm.

In the DC voltage compensating unit 213, reference numeral 213a denotes a temperature sensor for detecting the ambient temperature and for generating a voltage signal whose magnitude corresponds to the detected ambient temperature, and reference numeral 213b denotes a voltage compensating unit for compensating DC component $V_{TO}$ of the frequency-modulation voltage $V_T$ in accordance with the ambient temperature and for outputting the thus compensated DC component $V_{TO}$.

A specific compensating operation of the DC voltage compensating unit 213 will now be described. For example, when the ambient temperature rises, the $V_T$–f characteristic (see FIG. 33) of the variable frequency oscillator 211 changes from A to B. In accordance with this change in the characteristic due to a temperature rise, the DC voltage value is compensated from $V_{TA}$ to $V_{TB}$, whereby the operating point is moved from $P_A$ to $P_B$. Accordingly, the center frequency $f_O$ of the variable frequency oscillator 211 becomes identical to that at the normal temperature.

As the DC component $V_{TO}$ increases, the inclination of the $V_T$–f characteristic decreases so that the frequency deviation (modulation sensitivity Kv) for the frequency-modulation voltage decreases. Hence, in parallel with control described above, the FM voltage amplitude compensating unit 212 increases the amplitude of the variation $v_T$ of the frequency-modulation voltage $V_T$, as represented by a dashed line in FIG. 33, as temperature increases. As a result, even at a high temperature, the oscillation frequency of the variable frequency oscillator 211 cyclically varies in a triangular form at the same center frequency and frequency deviation $\Delta$f as those at the normal temperature.

On the contrary, when the ambient temperature drops, the $V_T$–f characteristic of the variable frequency oscillator 211 changes from A to C. In accordance with this change in the characteristic due to a temperature drop, the DC voltage compensating unit 213 changes the DC voltage value from $V_{TA}$ to $V_{TC}$, whereby the operating point is moved from $P_A$ to $P_C$. Accordingly, the center frequency $f_O$ of the variable frequency oscillator 211 becomes identical to that at the normal temperature.

In this case, as the DC component $V_{TO}$ is reduced, the inclination of the $V_T$–f characteristic is increased so that the frequency deviation (modulation sensitivity Kv) for the frequency-modulation voltage increases. Hence, in parallel with control described above, the FM voltage amplitude compensating unit 212 reduces the amplitude of the variation $v_T$ of the frequency-modulation voltage $V_T$, as represented by a dot-and-dash line in FIG. 33, as the temperature is reduced. As a result, even at a low temperature, the oscillation frequency of the variable frequency oscillator 211 cyclically varies in a triangular form at the same center frequency and frequency deviation $\Delta$f as those at the normal temperature.

Figure 35:
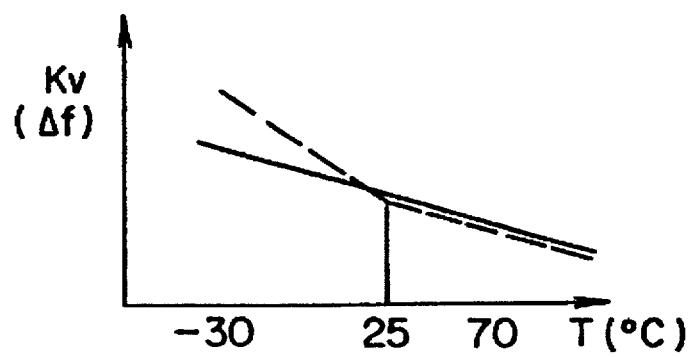
FIG. 35 is a graph exemplifying a T-Kv (temperature vs. modulation sensitivity) characteristic in the FM-CW radar apparatus according to the fifth embodiment.

When the operating point moves in such a manner that the center frequency of the variable frequency oscillator 211 is held identical to that at the normal temperature regardless of variations in ambient temperature, the relationship between the ambient temperature and modulation sensitivity Kv becomes substantially linear as represented by a solid line in FIG. 35.

Furthermore, as shown in FIG. 31, the transmitting unit 214 has a harmonic amplifier 214a and a transmitting antenna 214b, and the receiving unit 215 has a receiving antenna 215a, a harmonic amplifier 215b, a mixer 215c, and a demodulator 215d.

In the transmitting unit 214, the harmonic amplifier 214a amplifies the frequency-modulated signal received from the oscillating unit 211b, and the transmitting antenna 214b transmits the frequency-modulated signal received from the harmonic amplifier 214a toward an object as a transmission signal.

On the other hand, in the receiving unit 215, the receiving antenna 215a receives a reflected wave signal which is the transmission signal transmitted from the transmitting unit 214 and reflected by the object, the harmonic amplifier 215b amplifies the reflected wave signal (received signal) received at the receiving antenna 215a, the mixer 215c mixes the reflected wave signal and the transmission signal thereby to output a beat wave signal of both signals, and the demodulator 215d demodulates the beat frequency fb (=fr±fd) of the beat wave signal and outputs the thus demodulated signal.

The signal processing unit 216 calculates the distance R to and the relative velocity vr with respect to the object using aforesaid Eqs. (5)' to (7)'.

As described above, in the FM-CW radar apparatus according to the present embodiment, the DC voltage compensating unit 213 changes the voltage value of DC component $V_{TO}$ of the frequency-modulation voltage in accordance with the ambient temperature, and the FM voltage amplitude compensating unit 212b increases/decreases the amplitude of the frequency-modulation voltage $V_T$ as the ambient temperature rises/drops. Accordingly, the center frequency $f_O$ of the variable frequency oscillator 211 can be maintained constant even when the ambient temperature fluctuates above or below the normal temperature. Furthermore, the frequency deviation (modulation sensitivity Kv) can be maintained constant, and thus the distance/relative velocity can be measured accurately regardless of fluctuations in the ambient temperature.

The FM voltage amplitude compensating unit 212b will now be described in detail.

Figure 36:
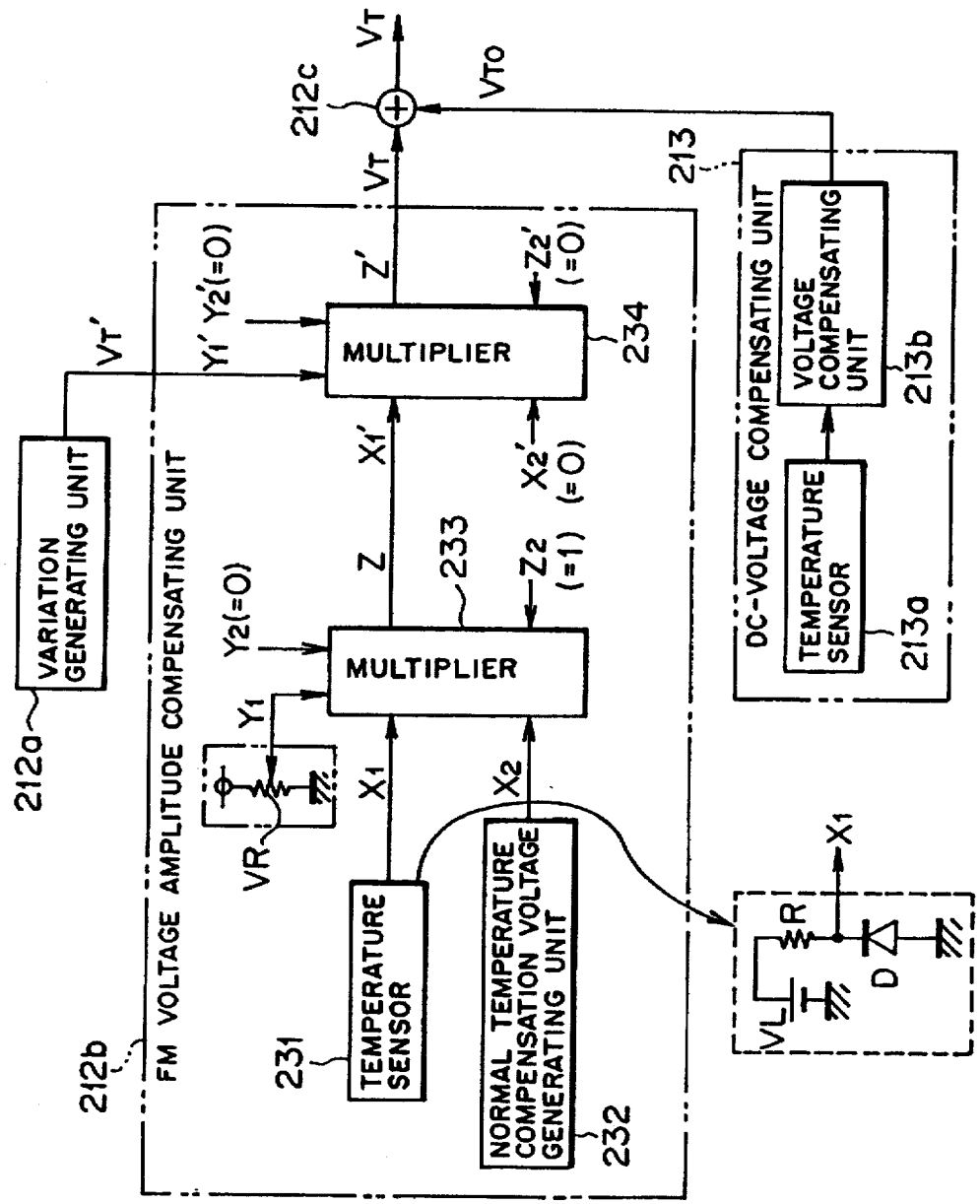
FIG. 36 is a block diagram showing the construction of a frequency-modulation voltage amplitude compensating unit in the FM-CW radar apparatus according to the fifth embodiment.

FIG. 36 is a block diagram showing the construction of the FM voltage amplitude compensating unit 212b. In FIG. 36, the same portions as in FIG. 31 are denoted by common reference numerals. In the FM voltage amplitude compensating unit 212b, reference numeral 231 denotes a temperature sensor which outputs a voltage signal $X_1$ having a magnitude corresponding to ambient temperature T. The voltage signal $X_1$ is expressed as follows:

$$X_1 = f(T) = aT + b,$$

where a and b are individually a real number. In the temperature sensor 231, for example, as shown in FIG. 36, a diode D whose reverse voltage changes with temperature and a resistor R are connected to a power source VL in series, whereby the voltage signal $X_1$ is outputted from the cathode of the diode. In this arrangement, the voltage signal $X_1$ is expressed as follows:

$$X_1 = -2.3(mV/° C.) \cdot (T-25)(° C.) + 0.60 \ (V).$$

Reference numeral 232 denotes a normal temperature compensation voltage generating unit, which outputs normal temperature compensation voltage $X_2$ expressed by $$X_2 = a \cdot 25 + b.$$

Reference numeral 233 denotes an analog multiplier (first multiplier), which outputs a signal Z obtained by multiplying the difference between first and second inputs $X_1$ and $X_2$, i.e., $(X_1-X_2)$, and the difference between third and fourth inputs $Y_1$ and $Y_2$, i.e., $(Y_1-Y_2)$, together and then adding the thus obtained product to fifth input $Z_2$. That is, the multiplier 233 outputs Z expressed by $$Z = (X_1-X_2) \cdot (Y_1-Y_2) + Z_2. \tag{13}$$

Accordingly, with $Y_2=0$ and $Z_2=1$, the output Z is expressed as follows:

$$Z = a(T-25) \cdot Y_1 + 1. \tag{14}$$

Also, reference numeral 234 denotes a multiplier (second multiplier) having the same structure as the multiplier 233. Accordingly, in the state in which the first input $X_1'=Z$, the second input $X_2'=0$, the third input $Y_1'=0$, the variation components $v_T'$ of the FM voltage, the fourth input $Y_2'=0$, and the fifth input $Z_2'=0$, the output Z' from the multiplier 234 is expressed as follows:

$$Z' = Z \cdot v_T' \text{ (triangular wave voltage)} = \{a(T-25) \cdot Y_1 + 1\} \cdot v_T' \tag{15}$$

where Z is the amplitude of the triangular wave voltage $v_T$. The amplitude becomes greater than that at the normal temperature when the ambient temperature is higher than 25° C., and becomes smaller than that at the normal temperature when the ambient temperature is lower than 25° C.

Accordingly, the volume (variable resistor) VR (third input $Y_1$ to the first multiplier 233) is adjusted only once at a predetermined high or low ambient temperature so as to render the frequency deviation (modulation sensitivity Kv) at the temperature equal to the frequency deviation (modulation sensitivity) at the normal temperature. As a result of the adjustment, because of the proportional relationship between the frequency deviation and the ambient temperature as shown in FIG. 35, the frequency deviation (modulation sensitivity Kv) of the variable frequency oscillator 211 at every temperature can be rendered substantially equal to the frequency deviation (modulation sensitivity) at the normal temperature. Thus, the distance to and the relative velocity with respect to the object can be measured highly accurately at every temperature.

Figure 37:
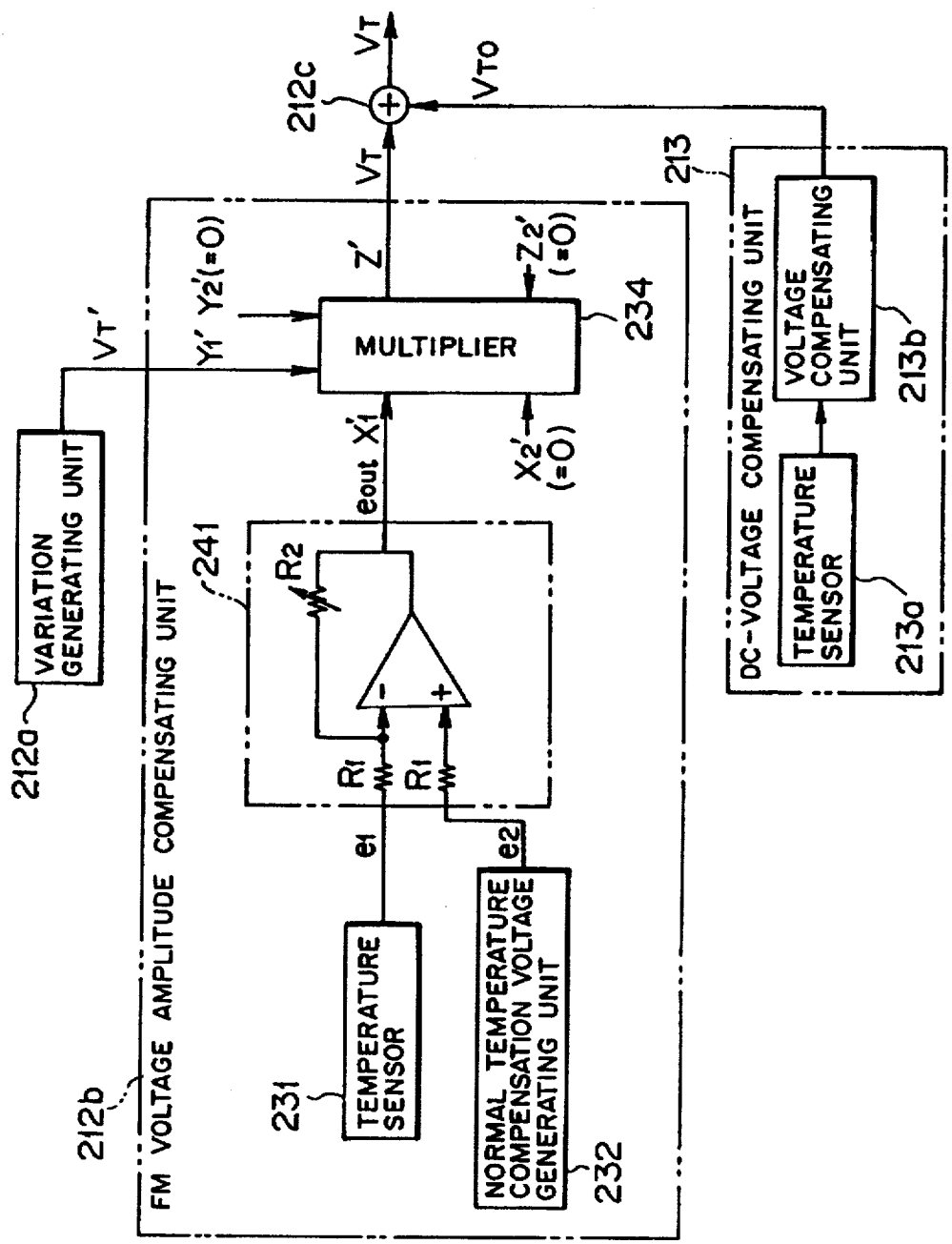
FIG. 37 is a block diagram showing a first modification of the frequency-modulation voltage amplitude compensating unit according to the fifth embodiment.

(f-1) First modification of the FM voltage amplitude compensating unit 212b:

FIG. 37 is a block diagram showing a first modification of the FM voltage amplitude compensating unit 212b according to the fifth embodiment. In FIG. 37, the same portions as in FIG. 36 are denoted by common reference numerals. The FM voltage amplitude compensating unit 212b according to the present modification is different from that shown in FIG. 36 in that an operation amplifier is used in place of the first multiplier 233 to output a voltage signal equivalent to that expressed by Eq. (14).

In FIG. 37, reference numeral 241 denotes an operational amplifier which outputs a signal obtained by multiplying information representing the difference between the ambient temperature T and the normal temperature (for example, 25° C.) by a predetermined amplitude adjustment value. The operational amplifier 241 is in the form of an analog adder, and the output voltage $e_{out}$ therefrom is expressed as follows:

$$e_{out} = (-R_2/R_1) \cdot e_1 + (1+R_2/R_1) \cdot e_2, \tag{16}$$

wherein $$e_1 = -k(T-25) + e_0.$$

The output voltage $e_{out}$ can be rewritten as follows:

$$e_{out} = (R_2/R_1) \cdot k(T-25) - (R_2/R_1) \cdot e_0 + (1+R_2/R_1) \cdot e_2, \tag{17}$$

When the resistances $R_1$, $R_2$ are selected so as to satisfy the following relationship:

$$-(R_2/R_1) \cdot e_0 + (1+R_2/R_1) \cdot e_2 = 1,$$

Eq. (17) can be rearranged as follows:

$$e_{out} = (R_2/R_1) \cdot k(T-25) + 1. \tag{18}$$

Thus, Eq. (18) assumes the same form as Eq. (14).

Accordingly, also in the present modification, the ratio $R_2/R_1$ is adjusted only once at a predetermined high or low ambient temperature so as to render the frequency deviation (modulation sensitivity Kv) at that temperature equal to the frequency deviation (modulation sensitivity) at the normal temperature. As a result of the adjustment, because of the proportional relationship between the frequency deviation and the ambient temperature as shown in FIG. 35, the frequency deviation (modulation sensitivity Kv) of the variable frequency oscillator 211 at every temperature can be rendered substantially equal to the frequency deviation (modulation sensitivity) at the normal temperature. Thus, the distance to and the relative velocity with respect to the object can be measured highly accurately at every temperature.

Figure 38:
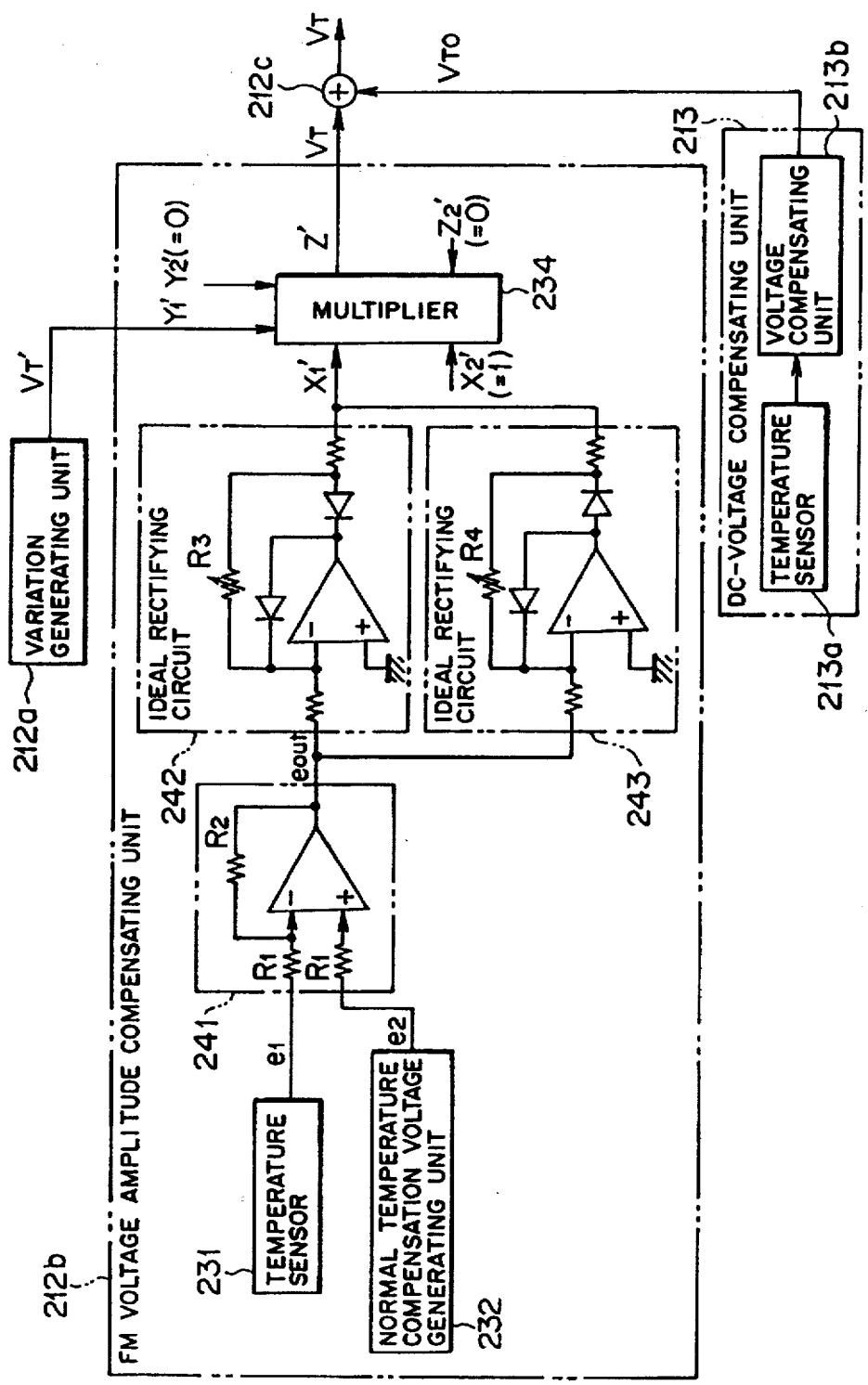
FIG. 38 is a block diagram showing a second modification of the frequency-modulation voltage amplitude compensating unit according to the fifth embodiment.

(f-2) Second modification of the FM voltage amplitude compensating unit 212b:

FIG. 38 is a block diagram showing a second modification of the FM voltage amplitude compensating unit 212b of the fifth embodiment. In FIG. 38, the same portions as in FIG. 37 are denoted by common reference numerals. The FM voltage amplitude compensating unit 212b according to the present modification is different from the first modification described above in that ideal rectifying circuits (amplitude adjusting signal generating units) 242 and 243 each formed by an operational amplifier are provided between the analog adder (voltage signal generating unit) 241 formed by an operational amplifier and the multiplier 234.

The ideal rectifying circuit 242 inversely amplifies only positive output voltage $e_{out}$ from the adder 241 and outputs "0" when output voltage $e_{out}$ is negative. The ideal rectifying circuit 243 inversely amplifies only negative output voltage $e_{out}$ from the adder 241 and outputs "0" when output voltage $e_{out}$ is positive.

As in the first modification, the output voltage $e_{out}$ from the adder 241 is expressed as follows:

$$e_{out} = (-R_2/R_1) \cdot e_1 + (1+R_2/R_1) \cdot e_2,$$

wherein $$e_1 = -k(T-25) + e_0.$$

The output voltage $e_{out}$ can be rewritten as follows:

$$e_{out} = (R_2/R_1) \cdot k(T-25) - (R_2/R_1) \cdot e_0 + (1+R_2/R_1) \cdot e_2.$$

When the resistances $R_1$, $R_2$ are selected so as to satisfy the following relationship:

$$-(R_2/R_1) \cdot e_0 + (1+R_2/R_1) \cdot e_2 = 0,$$

the above equation of $e_{out}$ can be rearranged as follows:

$$e_{out} = (R_2/R_1) \cdot k(T-25). \quad (19)$$

That is, the output voltage $e_{out}$ becomes positive at a high temperature and becomes negative at a low temperature. Accordingly, the ideal rectifying circuit 242 inversely amplifies the output voltage $e_{out}$ at a high temperature, and the ideal rectifying circuit 243 inversely amplifies the output voltage $e_{out}$, thereby generating two kinds of voltage signals (amplitude adjusting signals). The gain of the ideal rectifying circuits 242 and 243 can be changed by adjusting the resistors $R_3$ and $R_4$, respectively.

Furthermore, in the state in which the synthetic output signal $X_1'$ of the ideal rectifying circuits 242 and 243 being inputted to the first input terminal of the multiplier 234 and in which the second input $X_2'=1$, the third input $Y_1'$=the variation $v_T'$ of the frequency-modulation voltage, the fourth input $Y_2'=0$, and the fifth input $Z_2'=0$, the output $Z'$ is expressed as follows:

$$Z' = (X_1' - X_2') Y_1' \quad (20)$$
$$= (1 - X_2') \cdot v_T' \text{ (triangular wave voltage)}.$$

Accordingly, the resistor $R_3$ of the ideal rectifying circuit 242 is adjusted only once at a high temperature to change output $X_2'$ thereby to render the frequency deviation (modulation sensitivity Kv) at the temperature equal to the frequency deviation (modulation sensitivity) at the normal temperature. Also, the resistor $R_4$ of the ideal rectifying circuit 243 is adjusted only once at a low temperature to change output $X_2'$ thereby to render the frequency deviation (modulation sensitivity Kv) at the temperature equal to the frequency deviation (modulation sensitivity) at the normal temperature.

By making the adjustment at two points, i.e. at a high temperature and a low temperature, for example, even when the high temperature side and the low temperature side are different in the proportional relationship between the frequency deviation and the ambient temperature as represented by a dashed line in FIG. 35, the frequency deviation (modulation sensitivity Kv) of the variable frequency oscillator 211 at every temperature can be rendered substantially equal to the frequency deviation (modulation sensitivity) at the normal temperature. Thus, the distance to and the relative velocity with respect to the object can be measured highly accurately at every temperature.

Figure 39:
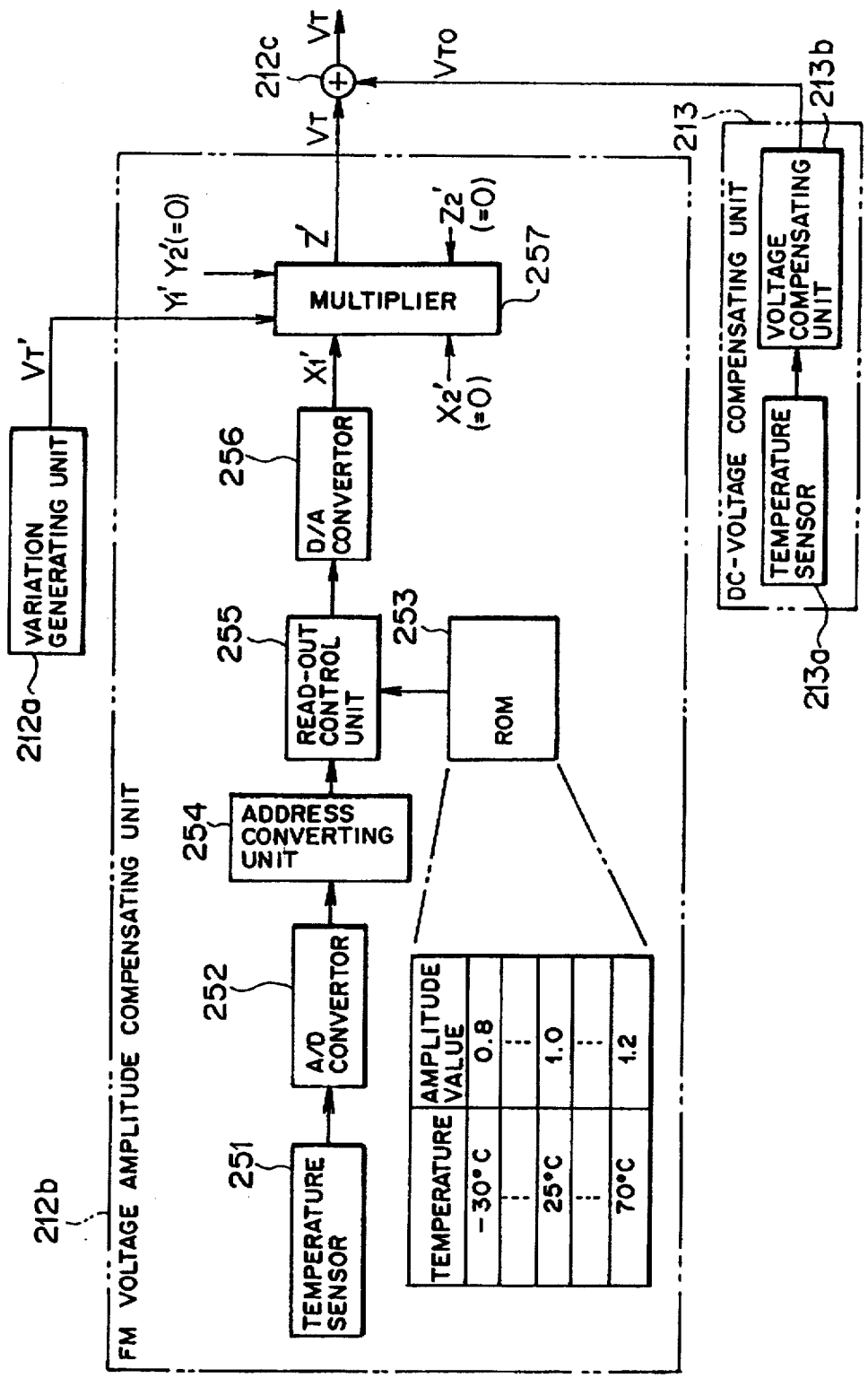
FIG. 39 is a block diagram showing a third modification of the frequency-modulation voltage amplitude compensating unit according to the fifth embodiment.

(f-3) Third modification of the FM voltage amplitude compensating unit 212b:

FIG. 39 is a block diagram showing a third modification of the FM voltage amplitude compensating unit 212b according to the fifth embodiment. In FIG. 39, the same portions as in FIG. 31 are denoted by common reference numerals.

In the FM voltage amplitude compensating unit 212b, reference numeral 251 denotes a temperature sensor, 252 denotes an A/D converter, 253 denotes a memory (ROM), 254 denotes an address converting unit, 255 denotes a read-out control unit, 256 denotes a D/A converter, and 257 denotes a multiplier.

The temperature sensor 251 outputs a voltage signal having a magnitude corresponding to a present ambient temperature. The A/D converter 252 carries out A/D (analog-to-digital) conversion on an output from the temperature sensor 251. The memory 253 stores the correspondence between the ambient temperatures and amplitudes of the frequency-modulation voltage. The address converting unit 254 converts the present ambient temperature to a ROM address.

The read-out control unit 255 reads an amplitude value corresponding to the present ambient temperature from the memory 253 and outputs the read value. The D/A converter 256 converts a digital amplitude value outputted from the read-out control unit 255 to an analog value. The multiplier 257 carries out a multiplication process on an output from the D/A converter 256 and the variation $v_T'$ of the frequency-modulation voltage.

As described earlier, the inclinations of the $V_T$–f characteristics A, B, and C at operating points $P_A$, $P_B$, and $P_C$ for respective ambient temperatures (see FIG. 33) differ from each other. As a result, the magnitude of the frequency deviation Δf (modulation sensitivity Kv) for frequency-modulation voltage $V_T$ varies with the ambient temperature. That is, even when the frequency-modulation voltage $V_T$ having the same amplitude is inputted to the variable frequency oscillator 211, the frequency deviation Δf of the variable frequency oscillator 211 depends on the ambient temperature. Thus, the amplitude of frequency-modulation voltage $V_T$ which gives the same frequency deviation Δf as that at the normal temperature was previously obtained for each ambient temperature and stored in the memory 253.

The multiplier 257, similar to the multiplier 234 shown in FIG. 36, outputs a signal Z obtained by multiplying the difference between the first and second inputs $X_1'$ and $X_2'$, i.e., $(X_1-X_2)$, and the difference between the third and fourth inputs $Y_1'$ and $Y_2'$, i.e., $(Y_1'-Y_2')$, together and then adding the thus obtained product to the fifth input $Z_2'$. Accordingly, in a state in which the first input $X_1'$=the output from the memory 253, the second input $X_2'=0$, the third input $Y_1'$=the variation $v_T'$ of the frequency-modulation voltage, the fourth input $Y_2'=0$, and the fifth input $Z_2'=0$, the output $Z'$ from the multiplier 257 is expressed as follows:

$$Z' = X_1' \cdot v_T' \text{ (triangular wave voltage)}. \quad (21)$$

As seen from Eq. (21), the output (amplitude) $X_1'$ from the memory 253 is the amplitude of the variation of the frequency-modulation voltage. Furthermore, the memory 253 stores the amplitude of the frequency-modulation voltage $V_T$ which gives the same frequency deviation Δf as that at the normal temperature for each ambient temperature. Accordingly, by using the FM voltage amplitude compensating unit 212b according to the present modification with the FM-CW radar apparatus, the center frequency and frequency deviation of the variable frequency oscillator 211 can be rendered fixed at individual ambient temperatures. Thus, the distance to and the relative velocity with respect to the object can be measured highly accurately at every temperature.

Figure 40:
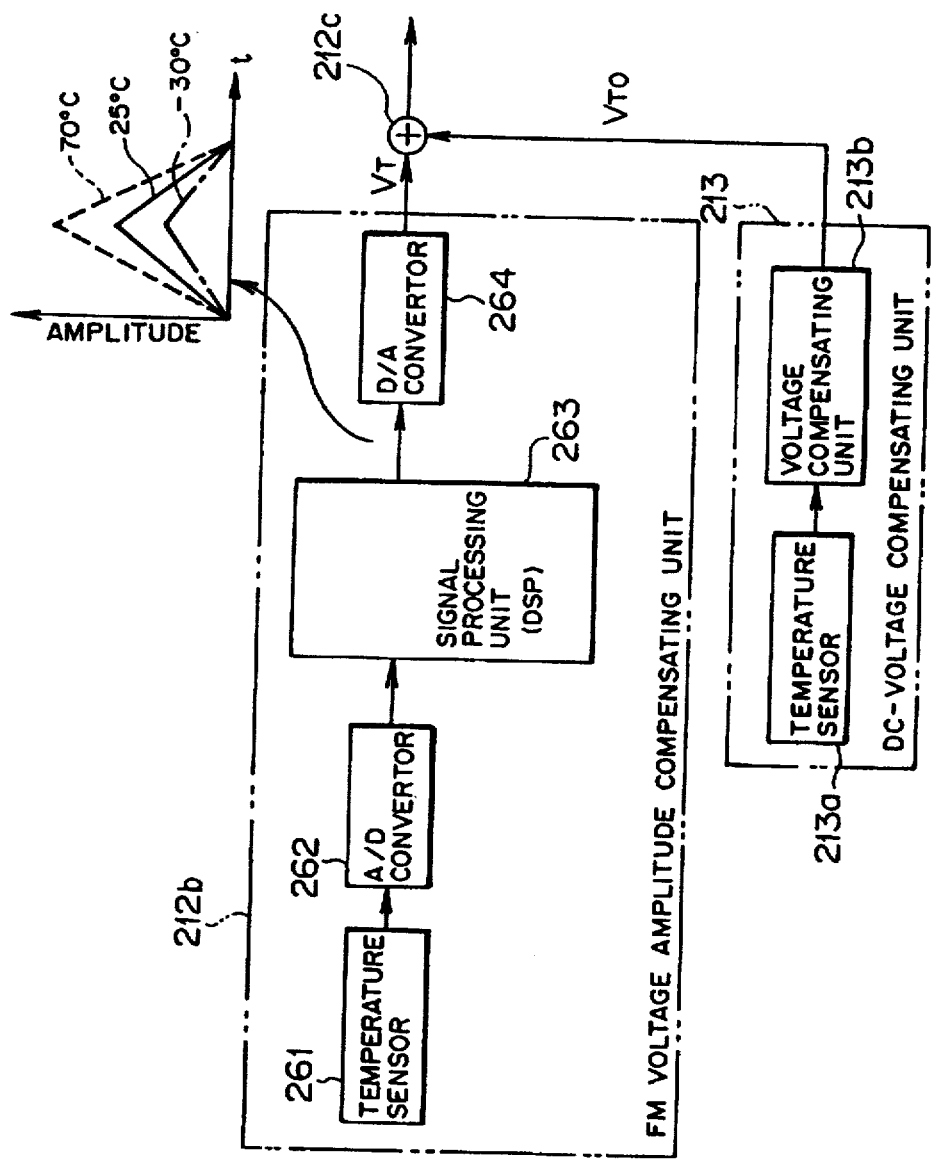
FIG. 40 is a block diagram showing a fourth modification of the frequency-modulation voltage amplitude compensating unit according to the fifth embodiment.

(f-4) Fourth modification of the FM voltage amplitude compensating unit 212b:

FIG. 40 is a block diagram showing a fourth modification of the FM voltage amplitude compensating unit 212b according to the fifth embodiment. In the FM voltage amplitude compensating unit 212b shown in FIG. 40, reference numeral 261 denotes a temperature sensor, 262 denotes an A/D converter, 263 denotes a signal processing unit (DSP), and 264 denotes a D/A converter.

The temperature sensor 261 outputs a voltage signal having a magnitude corresponding to a present ambient temperature. The A/D converter 262 carries out A/D conversion on an analog output from the temperature sensor 261. The signal processing unit 263 digitally outputs a voltage signal in a triangular waveform having an amplitude corresponding to the ambient temperature and repeating at a predetermined frequency fm. In this case, the following data is previously set: (1) an amplitude value of frequency-modulation voltage $V_T$ which gives the same frequency deviation $\Delta f$ as that at the normal temperature for each ambient temperature and (2) the frequency fm of the frequency-modulation voltage $V_T$. Amplitude values (1) are stored in correspondence with temperatures in a memory (ROM) as described in the unit of the third modification.

The D/A converter 264 converts digital data outputted from the signal processing unit 263 to an analog voltage signal $v_T$.

In the FM voltage amplitude compensating unit 212b having the above-described structure, when the temperature sensor 261 detects a present ambient temperature, the signal processing unit 263 obtains an amplitude corresponding to the detected ambient temperature and outputs a triangular wave voltage having the thus obtained amplitude and the frequency fm in the form of a digital value. Receiving the digital data from the signal processing unit 263, the D/A converter 264 outputs the analog staircase voltage signal $v_T$.

Accordingly, the frequency deviation (modulation sensitivity Kv) at each ambient temperature can be rendered equal to the frequency deviation (modulation sensitivity) at the normal temperature. As a result, the distance to and the relative velocity with respect to the object can be measured highly accurately at every temperature.

In the present modification, the signal processing unit (DSP) 263 generates the voltage signal $v_T$ in a triangular waveform. However, for example, a similar voltage signal $v_T$ may be generated under programmed control of a microcomputer or the like. Also, for example, the following arrangement may be applicable: a voltage signal $v_T$ in a triangular waveform for a quarter period is sampled for each ambient temperature at a predetermined sampling cycle and the thus sampled data is stored in a memory, and stored data corresponding to the ambient temperature is read out from the memory and D/A converted thereby to generate the voltage signal $v_T$ in a triangular waveform.

(f-5) Methods of adjustment:

Before starting an actual measurement, the FM voltage amplitude compensating units 212b described above should be adjusted so that the frequency deviation (modulation sensitivity Kv) at each ambient temperature is equal to the frequency deviation (modulation sensitivity) at the normal temperature. The methods of this adjustment will now be described in detail.

Figure 41:
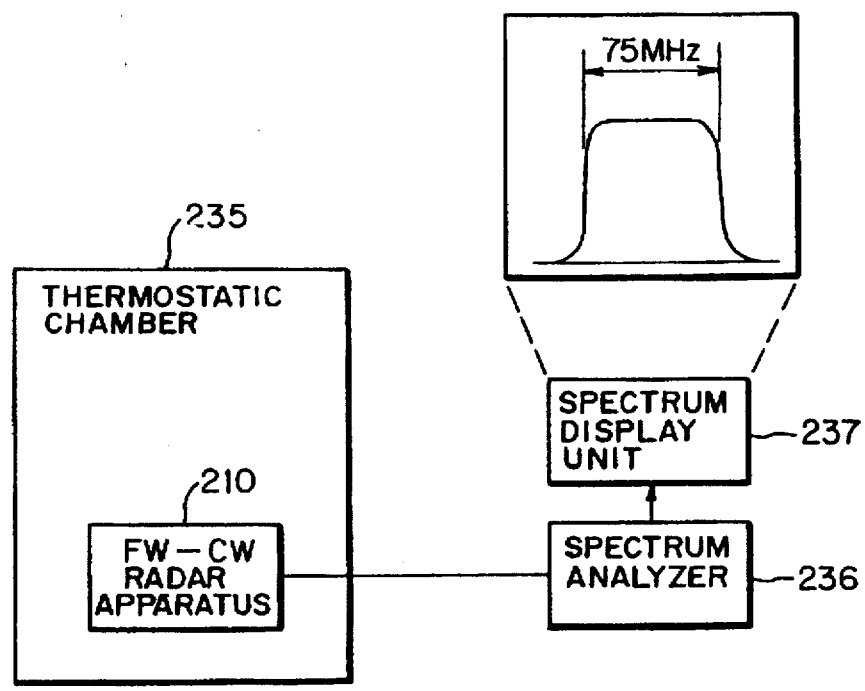
FIG. 41 is a block diagram showing a setup for adjusting a volume VR ($Y_1$) in the FM-CW radar apparatus according to the fifth embodiment.

(f-5a) Adjustment using a thermostatic chamber:

FIG. 41 is a block diagram for illustrating a method of adjusting the volume VR in the FM voltage amplitude compensating unit 212b according to the fifth embodiment shown in FIG. 36.

First, the FM-CW radar 210 is placed in a thermostatic chamber 235, and the variable frequency oscillator 211 is connected to a spectrum analyzer 236 located outside the thermostatic chamber 235, whereby the frequency characteristic of the variable frequency oscillator (see FIG. 31) in the FM-CW radar 210 can be displayed on a spectrum display unit 237.

In the above setup, the temperature in the thermostatic chamber 235 is set to, for example, +75° C. It is assumed that, the frequency deviation $\Delta f$ at the normal temperature is 75 MHz. In this case, the volume VR for adjusting third input $Y_1$ to the first multiplier 233 (see FIG. 36) is adjusted so as to bring the band width of the spectrum displayed on the spectrum display unit 237 to 75 MHz. When a band width of 75 MHz is attained, the adjustment is completed.

According to the method of adjustment described above, because of the proportional relationship between the frequency deviation and the ambient temperature as shown in FIG. 35, the frequency deviation (modulation sensitivity Kv) of the variable frequency oscillator 211 at every temperature can be rendered substantially equal to the frequency deviation (modulation sensitivity) at the normal temperature by a single adjustment. Thus, the distance to and the relative velocity with respect to the object can be measured highly accurately at every temperature.

The same setup as in FIG. 41 is applicable for adjustment of the volume $R_2$ in the first modification, adjustment of the volumes $R_3$ and $R_4$ in the second modification, and determination of an amplitude in the third and fourth modifications.

Figure 42:
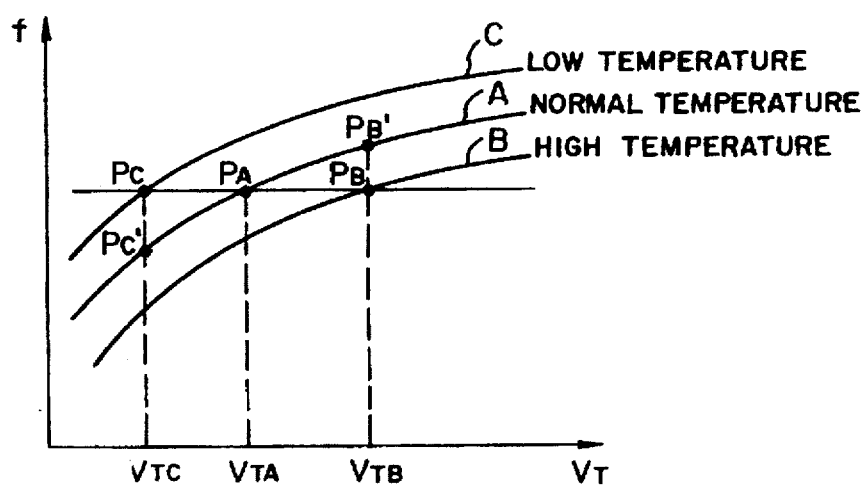
FIG. 42 is a graph for illustrating a method of adjusting the volume VR ($Y_1$)

(f-5b) Adjustment without using thermostatic chamber:

As shown in FIG. 42, $v_T$-f characteristics A, B, and C at the normal, high, and low temperatures, respectively, are so similar in shape as to coincide when translated and superimposed. Accordingly, the modulation sensitivity at the operating point $P_B$ on the $v_T$-f characteristic B at a high temperature is substantially equal to the modulation sensitivity at the operating point $P_B'$ on the $v_T$-f characteristic A at the normal temperature. Likewise, the modulation sensitivity at the operating point $P_C$ on the $v_T$-f characteristic C at a low temperature is substantially equal to the modulation sensitivity at the operating point $P_C'$ on the $v_T$-f characteristic A at the normal temperature.

Thus, the volume can be adjusted without using a thermostatic chamber, such that the operating point is shifted from $P_A'$ to $P_B'$ or $P_C'$ so as to make the frequency deviation at the operating point $P_B'$ or $P_C'$ equal to the frequency deviation (at the operating point $P_A$) at the normal temperature.

Figure 43:
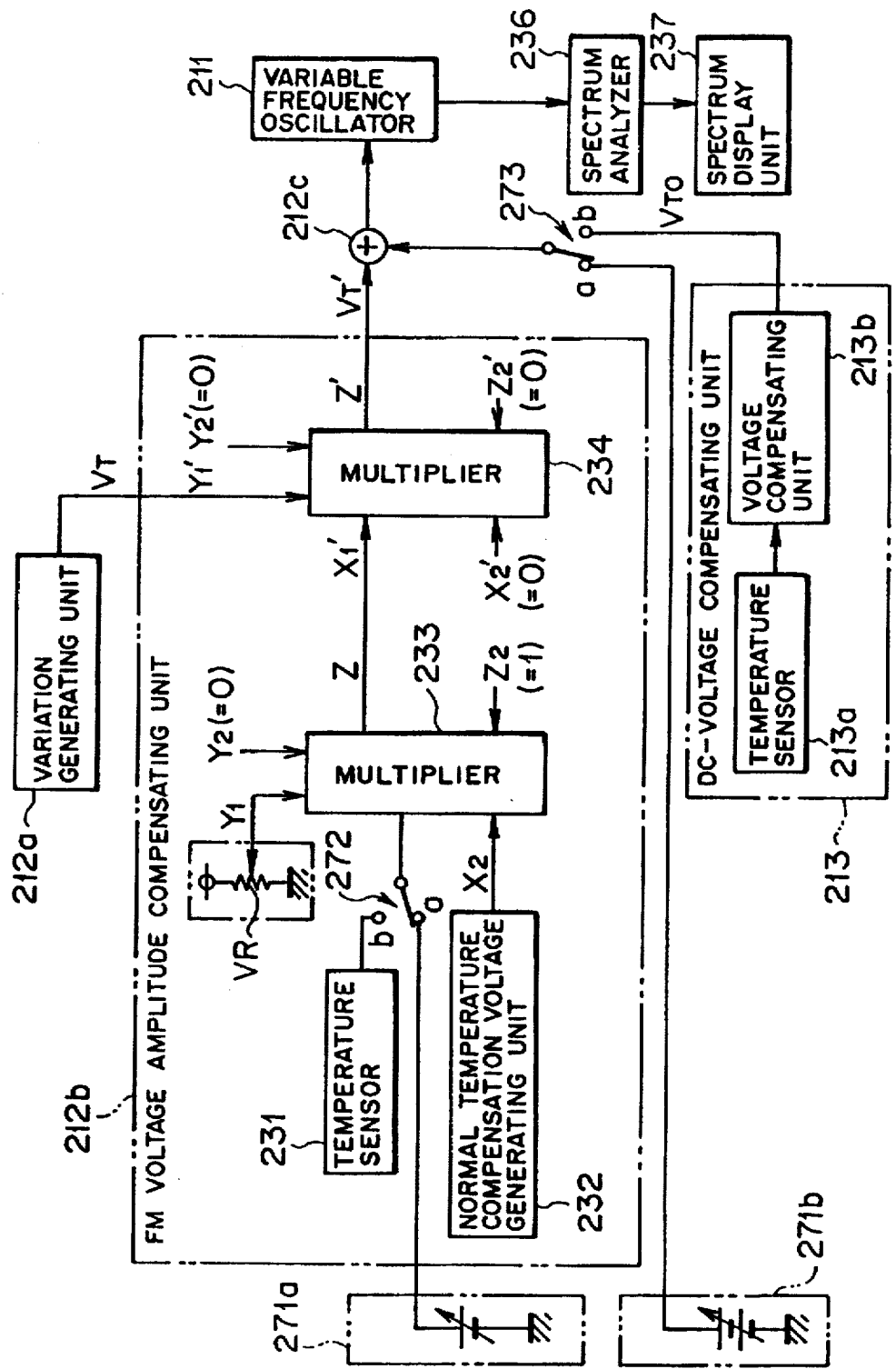
FIG. 43 is a block diagram showing another setup for adjusting a volume VR ($Y_1$) in the FM-CW radar apparatus according to the fifth embodiment.
Figure 44:
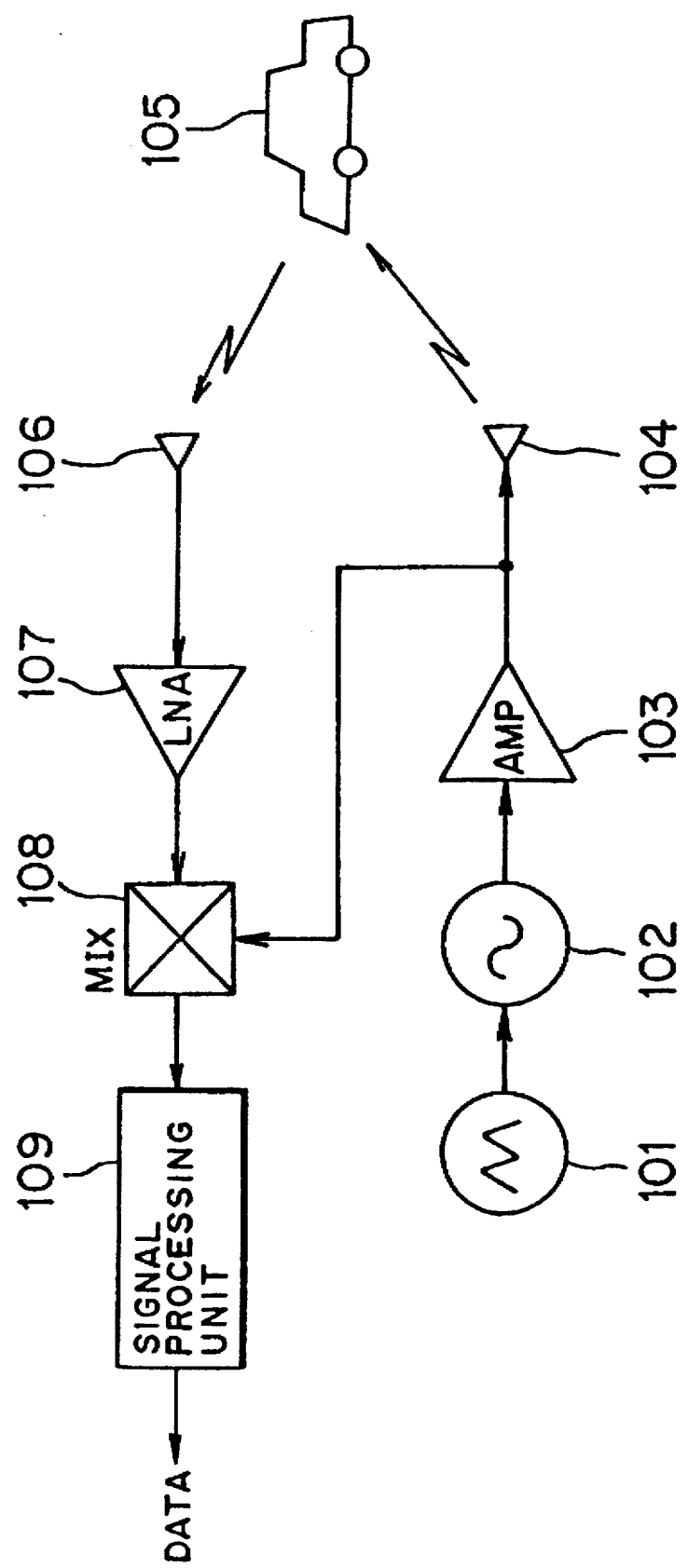
FIG. 44 is a block diagram showing the construction of a general FM-CW radar apparatus.

FIG. 43 is a block diagram showing a setup when the above method of adjustment is applied to the FM voltage amplitude compensating unit 212b shown in FIG. 36. In FIG. 43, the same portions as in FIG. 36 are denoted by common reference numerals.

In FIG. 43, reference numeral 271a denotes a first adjusting voltage generating unit for outputting the same voltage signal as an output from the temperature sensor 231 at an arbitrary ambient temperature. Reference numeral 271b denotes a second adjusting voltage generating unit for outputting the same voltage signal as an output from the DC voltage compensating unit 213 at a certain ambient temperature. Reference numeral 272 denotes a first switch for selecting either an output from the temperature sensor 231 or an output from the adjusting voltage generating unit 271a and inputting a selected signal to the multiplier 233. At adjustment, the voltage signal outputted from the adjusting voltage generating unit 271a is inputted to the multiplier 233, and at other than adjustment, the voltage signal outputted from the temperature sensor 231 is inputted to the multiplier 233.

Reference numeral 273 denotes a second switch for selecting either an output from the DC voltage compensating unit 213 or an output from the adjusting voltage generating unit 271b and inputting a selected signal to the synthesizing unit 212c. At adjustment, the voltage signal outputted from the adjusting voltage generating unit 271b is inputted to the synthesizing unit 212c, and at other than adjustment, the voltage signal outputted from the DC voltage compensating unit 213 is inputted to the synthesizing unit 212c.

Furthermore, at adjustment, the variable frequency oscillator 211 is connected to the spectrum analyzer 236 so as to display the frequency characteristic of the variable frequency oscillator 211 on the spectrum display unit 237. Next, the first and second switches 272, 273 are switched to the state as illustrated with a solid line. Then, the first adjusting voltage generating unit 271a is adjusted so as to output a voltage signal having the same magnitude as that of a voltage signal outputted from the temperature sensor 231, for example, at +75° C.

Likewise, the second adjusting voltage generating unit 271b is adjusted so as to output a voltage signal having the same magnitude as that of a voltage signal outputted from the DC voltage compensating unit 213b, for example, at +75° C.

In the above state, the volume VR for adjusting third input $Y_1$ to the first multiplier 233 is adjusted so as to bring the band width of the spectrum displayed on the spectrum display unit 237 to 75 MHz. When a band width of 75 MHz is attained, the adjustment is completed. Here, the frequency deviation Δf at the normal temperature is 75 MHz.

The method of adjustment described above provides an advantage that the volume ($Y_1$) can be adjusted under the normal temperature condition without using a thermostatic chamber thereby to simplify an adjusting work. Also, according to this method of adjustment, because of the proportional relationship between the frequency deviation and an ambient temperature, the frequency deviation (modulation sensitivity Kv) of the variable frequency oscillator 211 at every temperature can be rendered substantially equal to the frequency deviation (modulation sensitivity) at the normal temperature by a single adjustment. Thus, the distance to and the relative velocity with respect to the object can be measured highly accurately at every temperature.

Also, in this case, the same setup as in FIG. 43 is applicable for adjustment of the volume $R_2$ in the first modification, adjustment of the volumes $R_3$ and $R_4$ in the second modification, and determination of an amplitude value in the third and fourth modifications.

The above-mentioned variable frequency oscillator 211 in the FM-CW radar apparatus according to the present embodiment is equivalent to the voltage controlled oscillator 22 in the FM-CW radar apparatus according to the first to fourth embodiments. Accordingly, each of the FM voltage generating units 212b according to the fifth embodiment and the modifications thereof is applicable to the first to fourth embodiments. This further improves the accuracy of the radar apparatus.

While the present invention has been described with reference to embodiments, various modifications may be possible based on the spirit of the invention defined in the appended claims. Therefore, it should not be construed that these modifications are excluded from the scope of the present invention.

What is claims is:

1. A radar apparatus for detecting a distance/velocity comprising:

a transmitting system for transmitting a signal which is frequency modulated with a modulating signal having a predetermined recurrence frequency;

a receiving system for receiving a reflected wave signal, which is the modulated transmission signal transmitted from said transmitting system and reflected by an object, and which mixes the reflected wave signal and the modulated transmission signal from said transmitting system so as to detect a beat wave signal of the reflected wave signal and the modulated transmission signal;

a high-pass filter for filtering the beat wave signal detected in said receiving system so as to cut off modulation frequency components of the modulated transmission signal the orders of which are equal to or lower than a predetermined order; and a distance/velocity calculating unit which calculates a distance to said object and a relative velocity between said object and an observer based on frequency information in the beat wave signal which has been passed through said high-pass filter.

2. A radar apparatus for detecting a distance/velocity comprising:

an FM-CW radar apparatus having a transmitting system for transmitting a signal which is frequency-modulated with a modulating signal having a predetermined recurrence frequency, a receiving system for receiving a reflected wave signal, which is the modulated transmission signal transmitted from said transmitting system and reflected by an object, and which mixes the reflected wave signal and the modulated transmission signal from said transmitting system so as to detect a beat wave signal of the reflected wave signal and the modulated transmission signal, a high-pass filter for filtering the beat wave signal detected in said receiving system so as to cut off modulation frequency components of the modulated transmission signal the orders of which are equal to or lower than a predetermined order, and a distance/velocity calculating unit which calculates the distance to said object and the relative velocity between said object and an observer based on frequency information in the beat wave signal which has been passed through the high-pass filter, and a radar apparatus for short distance which is different in type from said FM-CW radar apparatus.

3. A radar apparatus for detecting a distance/velocity comprising:

a transmitting system for transmitting a signal which is frequency-modulated with a modulating signal having a predetermined recurrence frequency;

a receiving system for receiving a reflected wave signal, which is the modulated transmission signal transmitted from said transmitting system and reflected by an object, and which mixes the reflected wave signal and the modulated transmission signal from said transmitting system so as to detect a beat wave signal of the reflected wave signal and the modulated transmission signal;

a distance/velocity calculating unit which calculates a distance to said object and a relative velocity between said object and an observer based on frequency information in the beat wave signal which has been detected in the receiving system; and storage means for storing FM/AM conversion noise information which is outputted in the state that the reflected wave signal from said object is not received, wherein said distance/velocity calculating unit removes the FM/AM conversion noise information stored in the storage means from frequency information in the beat wave signal before calculating the distance to said object and the relative velocity between said object and said observer based on frequency information in the beat wave signal.

4. A radar apparatus for detecting a distance/velocity according to claim 3, wherein said transmitting system and said receiving system are provided with a transmission/reception signal cutoff means for stopping the transmission/reception of a signal to/from the outside, and wherein FM/AM conversion noise information is stored in said storage means in a state in which the transmission/reception of a signal to/from the outside is stopped, and the distance and the relative velocity are calculated with the FM/AM conversion noise information taken into consideration in a state in which the transmission/reception of a signal to/from the outside is established.

5. A radar apparatus for detecting a distance/velocity according to claim 4, wherein said transmission/reception signal cutoff means is composed of switches provided in said transmitting system and said receiving system, respectively, and wherein FM/AM conversion noise information is stored in said storage means in a state in which at least the switch provided in said receiving system is off, and the distance and the relative velocity are calculated with the FM/AM conversion noise information taken into consideration in a state in which both the switches are on.

6. A radar apparatus for detecting a distance/velocity according to claim 4, wherein said transmission/reception signal cutoff means is composed of attenuators provided in said transmitting system and said receiving system, respectively, and wherein FM/AM conversion noise information is stored in said storage means in a state in which at least the attenuator provided in said receiving system is in a state for attenuating signals, and the distance and the relative velocity are calculated with the FM/AM conversion noise information taken into consideration in a state in which both the attenuators do not attenuate signals.

7. A radar apparatus for detecting a distance/velocity according to claim 4, wherein said transmission/reception signal cutoff means is composed of changeover switches, each switchable to an antenna side or a terminator side, provided in said transmitting system and said receiving system, respectively, and wherein FM/AM conversion noise information is stored in said storage means in a state in which at least the changeover switch provided in said receiving system is switched to the terminator side, and the distance and the relative velocity are calculated with the FM/AM conversion noise information taken into consideration in a state in which both the changeover switches are switched to the antenna side.

8. A radar apparatus for detecting a distance/velocity comprising:

a transmitting system for transmitting a signal which is frequency-modulated with a modulating signal having a predetermined recurrence frequency;

a receiving system for receiving a reflected wave signal, which is the modulated transmission signal transmitted from said transmitting system and reflected by an object, and which mixes the reflected wave signal and the modulated transmission signal from said transmitting system so as to detect a beat wave signal of the reflected wave signal and the modulated transmission signal; and a distance/velocity calculating unit which calculates a distance to said object and a relative velocity between said object and an observer based on frequency information in the beat wave signal which has been detected in the receiving system, wherein said distance/velocity calculating unit removes modulation frequency components of the modulated transmission signal from frequency information in the beat wave signal before calculating the distance to said object and the relative velocity between said object and said observer based on frequency information in the beat wave signal.

9. A radar apparatus for detecting a distance/velocity according to claim 8, wherein said transmitting system has a structure to transmit a signal which is frequency-modulated with a predetermined modulating signal selected from a plurality of modulating signals having different recurrence frequencies.

10. A radar apparatus for detecting a distance/velocity according to claim 8, wherein said transmitting system has a structure to change the amount of frequency deviation of the modulated transmission signal.

11. A radar apparatus for detecting a distance/velocity according to claim 8, wherein said transmitting system has a structure to change the center frequency of the modulated transmission signal.

12. A radar apparatus for detecting a distance/velocity according to claim 8, wherein said distance/velocity calculating unit uses past data in calculating the distance to said object and the relative velocity between said object and said observer based on frequency information in the beat wave signal which is detected by said receiving system.

13. A radar apparatus for detecting a distance/velocity according to claim 12, wherein said distance/velocity calculating unit uses, as said past data, information about a distance and a relative velocity which was obtained in the last calculation.

14. A radar apparatus for detecting a distance/velocity according to claim 12, wherein said distance/velocity calculating unit uses, as said past data, information about a distance and a relative velocity which was obtained in the last calculation and information about another distance and another relative velocity which was obtained in the calculation before the last calculation.

15. A radar apparatus for detecting a distance/velocity according to claim 8, wherein signals having a predetermined signal level or higher are prevented from being subjected to an information removing process when said distance/velocity calculating unit calculates the distance to said object and the relative velocity between said object and said observer based on frequency information in the beat wave signal which is detected by said receiving system.

16. A radar apparatus for detecting a distance/velocity comprising:

a variable frequency oscillator capable of changing its oscillation frequency in accordance with an input signal;

a modulating signal generating unit for generating a modulating signal having a predetermined recurrence frequency and for outputting the modulating signal to said variable frequency oscillator;

a DC voltage compensating unit for compensating a DC voltage component of the modulating signal in accordance with an ambient temperature;

an amplitude compensating unit for compensating an amplitude of the modulating signal in accordance with ambient temperature;

a transmitting unit for transmitting the frequency-modulated signal outputted from said variable frequency oscillator toward an object;

a receiving unit for receiving a reflected wave signal, which is the modulated transmission signal transmitted from said transmitting unit and reflected by the object, and which mixes the reflected wave signal and the modulated transmission signal from said transmitting unit so as to detect a beat wave signal of the reflected wave signal and the modulated transmission signal; and a distance/velocity calculating unit for calculating a distance to and a relative velocity with respect to said object based on frequency information in the beat wave signal which has been detected by said receiving unit.

17. A radar apparatus for detecting a distance/velocity according to claim 16, wherein said amplitude compensating unit comprising:

a first multiplier for performing multiplication on information representing a difference between an ambient temperature and a normal temperature and an amplitude adjustment value used for adjusting the amplitude of the modulating signal, thereby generating a signal for adjusting the amplitude of the modulating signal; and a second multiplier for performing multiplication on the modulating signal and the amplitude adjusting signal, thereby compensating the amplitude of the modulating signal in accordance with the ambient temperature.

18. A radar apparatus for detecting a distance/velocity according to claim 16, wherein said amplitude compensating unit comprising:

an operational amplifier for outputting a signal obtained by multiplying information representing a difference between an ambient temperature and a normal temperature by a predetermined amplitude adjustment value for adjusting the amplitude of the modulating signal, as a signal for adjusting the amplitude of the modulating signal; and a multiplier for performing multiplication on the modulating signal and the amplitude adjusting signal from said operational amplifier, thereby compensating the amplitude of the modulating signal in accordance with the ambient temperature.

19. A radar apparatus for detecting a distance/velocity according to claim 16, wherein said amplitude compensating unit comprising:

a voltage signal generating unit for outputting a voltage signal having an amplitude corresponding to information representing a difference between an ambient temperature and a normal temperature;

an amplitude adjusting signal generating unit for generating two kinds of amplitude adjustment value of the modulating signal by multiplying the voltage signal by a first amplitude adjustment value when the voltage signal is positive, and for multiplying the voltage signal by a second amplitude adjustment value when the voltage signal is negative; and a multiplier for performing multiplication on the modulating signal and the amplitude adjusting signal from said amplitude adjusting signal generating unit, thereby compensating the amplitude of the modulating signal in accordance with the ambient temperature.

20. A radar apparatus for detecting a distance/velocity according to claim 16, wherein said amplitude compensating unit comprising:

a memory for storing the correspondence between different ambient temperature and an amplitude value Of the modulating signal at the predetermined ambient temperatures;

a read-out control unit for reading out an amplitude value of the modulating signal corresponding to a present ambient temperature from said memory and for outputting the thus read amplitude value as an amplitude adjusting signal for the modulating signal; and a multiplier for performing multiplication on the modulating signal and the amplitude adjusting signal from said read-out control unit, thereby compensating the amplitude of the modulating signal in accordance with the ambient temperature.

21. A radar apparatus for detecting a distance/velocity according to claim 16, wherein said amplitude compensating unit comprising:

a memory for storing data which have been obtained by sampling, at predetermined intervals, a plurality of modulating signals having respective amplitudes corresponding to different ambient temperatures, wherein a predetermined modulating signal corresponding to a predetermined ambient temperature is read from said memory at the predetermined time interval, and the read modulating signal is outputted as a modulating signal whose amplitude is compensated in accordance with the ambient temperature.

22. A radar apparatus for detecting a distance/velocity according to claim 16, wherein said amplitude compensating unit comprising:

a signal processing unit which outputs, at predetermined intervals, a modulating signal having an amplitude value corresponding to an ambient temperature, wherein the thus outputted digital value is used as a modulating signal whose amplitude is compensated in accordance with the ambient temperature.

23. A radar apparatus for detecting a distance/velocity according to claim 16, wherein said amplitude compensating unit comprising:

a volume for adjusting the amplitude of the modulating signal, wherein said volume is adjusted with a higher or lower temperature so that the frequency deviation of the modulated transmission signal becomes equal to the amplitude corresponding to a normal temperature.

24. A radar apparatus for detecting a distance/velocity according to claim 16, wherein under the normal temperature condition, the amplitude of the modulating signal is adjusted at an arbitrary ambient temperature thereby to render the frequency deviation at said ambient temperature equal to the frequency deviation at a normal temperature.

* * * * *

UNITED STATES PATENT AND TRADEMARK OFFICE
CERTIFICATE OF CORRECTION

PATENT NO. : 5,677,695
DATED : October 14, 1997
INVENTOR(S) : Suzuki et al.

It is certified that error appears in the above-identified patent and that said Letters Patent is hereby corrected as shown below:

Column 2, line 56, delete "$\Delta F \cdot fm \cdot$" and insert -- $\Delta F \cdot fm \cdot t$ -- therefor.

Column 3, line 21, delete "therefore".

Column 5, line 24, before "cost" insert --the--.

Column 7, line 23, delete "lower" and insert --low-- therefor.

UNITED STATES PATENT AND TRADEMARK OFFICE
CERTIFICATE OF CORRECTION

PATENT NO. : 5,677,695
DATED : October 14, 1997
INVENTOR(S) : Suzuki et al.

Page 2 of 7

It is certified that error appears in the above-identified patent and that said Letters Patent is hereby corrected as shown below:

Column 8, line 22, delete "a".

Column 8, line 23, delete "small power and a" and insert --low power requirements and-- therefor.

Column 13, line 17, delete "end" and insert --and-- therefor.

Column 13, line 49, delete "therefore".

UNITED STATES PATENT AND TRADEMARK OFFICE
CERTIFICATE OF CORRECTION

PATENT NO. : 5,677,695
DATED : October 14, 1997
INVENTOR(S) : Suzuki et al.

It is certified that error appears in the above-identified patent and that said Letters Patent is hereby corrected as shown below:

Column 16, line 57, delete "a".

Column 17, line 55, before "generated" insert --thus--.

Column 19, line 5, before "ambient" insert --the--.

Column 19, line 24, before "ambient" insert --the--.

Column 19, line 30, delete "the"(first occurrence).

UNITED STATES PATENT AND TRADEMARK OFFICE
CERTIFICATE OF CORRECTION

PATENT NO. : 5,677,695
DATED : October 14, 1997
INVENTOR(S) : Suzuki et al.

It is certified that error appears in the above-identified patent and that said Letters Patent is hereby corrected as shown below:

Column 22, line 54, delete "a".

Column 23, line 49, delete "apparatus" and insert -- apparatuses-- therefor.

Column 23, line 66, delete "(FSW)" and insert -- (SW)-- therefor.

Column 24, line 26, delete "Shored" and insert -- stored-- therefor.

UNITED STATES PATENT AND TRADEMARK OFFICE
CERTIFICATE OF CORRECTION

PATENT NO. : 5,677,695
DATED : October 14, 1997
INVENTOR(S) : Suzuki et al.

It is certified that error appears in the above-identified patent and that said Letters Patent is hereby corrected as shown below:

Column 26, line 1, before "thus" insert --the--.

Column 27, line 20, delete "cadistaning" and insert --calculating-- therefor.

Column 27, line 53, delete "Shored" and insert --stored-- therefor.

Column 28, line 60, delete "a".

UNITED STATES PATENT AND TRADEMARK OFFICE
CERTIFICATE OF CORRECTION

PATENT NO. : 5,677,695
DATED : October 14, 1997
INVENTOR(S) : Suzuki et al.

It is certified that error appears in the above-identified patent and that said Letters Patent is hereby corrected as shown below:

Column 33, line 52, delete "was obtained in the" and insert --the vehicle 25 which-- therefor.

Column 33, line 59, after "minute" insert --in--.

Column 34, line 5, delete "$V_{1 \cdot \Delta t}$" and insert --$V_1 \cdot \Delta t$-- therefor.

Column 34, line 21, delete "At" and insert --$\Delta t$-- therefor.

UNITED STATES PATENT AND TRADEMARK OFFICE
CERTIFICATE OF CORRECTION

PATENT NO. : 5,677,695
DATED : October 14, 1997
INVENTOR(S) : Suzuki et al.

It is certified that error appears in the above-identified patent and that said Letters Patent is hereby corrected as shown below:

Column 34, line 22, delete "loss a" and insert --a loss-- therefor.

Column 39, line 7, before "ambient" insert --the--.

Column 39, line 43, delete "0,". (second occurrence)

Column 40, line 38, delete "$e_{out}(R_2/R_1)$" and insert --$e_{out}=(R_2/R_1)$-- therefor.

Claims, Column 50, line 10, delete "Of" and insert --of-- therefor.

Signed and Sealed this

Tenth Day of November 1998

BRUCE LEHMAN

Attest:

Attesting Officer

Commissioner of Patents and Trademarks